United States Patent
Yeh et al.

(10) Patent No.: US 12,342,223 B2
(45) Date of Patent: Jun. 24, 2025

(54) RESILIENT RADIO RESOURCE PROVISIONING FOR NETWORK SLICING

(71) Applicant: INTEL CORPORATION, Santa Clara, CA (US)

(72) Inventors: Shu-ping Yeh, Campbell, CA (US); Jingwen Bai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 17/561,948

(22) Filed: Dec. 25, 2021

(65) Prior Publication Data

US 2022/0124560 A1    Apr. 21, 2022

(51) Int. Cl.
*H04W 24/10* (2009.01)
*H04W 24/02* (2009.01)
*H04W 24/04* (2009.01)
*H04W 28/24* (2009.01)
*H04W 28/26* (2009.01)
*H04W 48/18* (2009.01)

(52) U.S. Cl.
CPC ........... *H04W 28/24* (2013.01); *H04W 24/02* (2013.01); *H04W 24/04* (2013.01); *H04W 24/10* (2013.01); *H04W 28/26* (2013.01); *H04W 48/18* (2013.01)

(58) Field of Classification Search
CPC ..... H04W 28/24; H04W 24/02; H04W 24/04; H04W 24/10; H04W 28/26; H04W 48/18; H04W 28/18; H04L 41/5009; H04L 41/5025; H04L 41/5054
See application file for complete search history.

(56) References Cited

U.S. PATENT DOCUMENTS

2021/0320850 A1* 10/2021 Young ............... H04L 41/5012
2023/0180017 A1*  6/2023 Gadalin ............. H04W 16/22
                                                     370/328

OTHER PUBLICATIONS

Chia-Yu Chang, "Cloudification and Slicing in 5G Radio Access Network", Networking and Internet Architecture [cs.NI], Sorbonne Université, 2018, NNT: 2018SORUS293, HAL id: tel-02501244, version 1, 227 pages (Mar. 6, 2020).
Coronado et al., "Zero Touch Management: A Survey of Network Automation Solutions for 5G and 6G Networks", IEEE Communications Survey s & Tutorials, vol. 24, No. 4, Fourth Quarter, pp. 2535-2578, 44 pages, (2022).
Lillicrap et al., "Continuous Control With Deep Reinforcement Learning", arXiv:1509.02971v6 [cs.LG], London, U.K., 14 pages (Jul. 5, 2019).

(Continued)

*Primary Examiner* — Chuong A Ngo
(74) *Attorney, Agent, or Firm* — Essential Patents Group, LLP; Christopher K. Gagne

(57) ABSTRACT

The present disclosure provides a resilient (radio) access network ((R)AN) slicing framework encompassing a resource planning engine and distributed dynamic slice-aware scheduling modules at one or more network access nodes, edge compute nodes, or cloud computing service. The resilient (R)AN slicing framework includes resource planning and slice-aware scheduling, as well as signaling exchanges for provisioning resilient (R)AN slicing. The intelligent (R)AN slicing framework can realize resource isolation in a more efficient and agile manner than existing network slicing technologies. Other embodiments may be described and/or claimed.

25 Claims, 13 Drawing Sheets

(56) References Cited

OTHER PUBLICATIONS

Langford et al., "The Epoch-Greedy Algorithm for Multi-armed Bandits with Side Information", Advances in Neural Information Processing Systems (NIPS), vol. 20, 8 pages (2007), https://papers.nips.cc/paper/2007/file/4b04a686b0ad13dce35fa99fa4161c65-Paper.pdf.
Konda et al., "Actor-Critic Algorithms", Advances in Neural Information Processing Systems (NIPS), vol. 12, pp. 1008-1014 (2000).
Konda, "Actor-Critic Algorithms", MIT PhD Thesis, 147 pages (Jun. 2002).
Toro Icarte et al., "Reward Machines: Exploiting Reward Function Structure in Reinforcement Learning", arXiv:2010.03950v1 [cs.LG], 31 pages (Oct. 6, 2020).
Dalal et al., "Safe Exploration in Continuous Action Spaces", arXiv:1801.08757v1, 9 pages (Jan. 26, 2018).
Wirth et al., "Model-Free Preference-Based Reinforcement Learning", Proceedings of the Thirtieth Association for the Advancement of Artificial Intelligence (AAAI-16), Germany, pp. 2222-2228 (Mar. 2, 2016), https://www.aaai.org/ocs/index.php/AAAI/AAAI16/paper/viewFile/12247/11865.
Agrawal, "Reinforcement Learning: Lecture Notes, Spring 2019", Columbia University IEOR 8100, 104 pages (2019).
Bengio et al., "Learning Long-Term Dependencies with Gradient Descent is Difficult", IEEE Transactions on Neural Networks, vol. 5, No. 2, pp. 157-166 (Mar. 1994).
Bengio et al., "Representation Learning: A Review and New Perspectives", arXiv:1206.5538v3 [cs.LG], 30 pages (Apr. 23, 2014).
"3rd Generation Partnership Project; Technical Specification Group Radio Access Network; NG-RAN; Architecture description (Release 16)", 3GPP TS 38.401 V16.6.0, 79 pages (Jul. 1, 2021).
"O-RAN Operations and Maintenance Interface Specification", O-RAN.WG1.O1-Interface.0-v04.00, O-RAN Alliance, 66 pages (Nov. 2020).
"O-RAN Operations and Maintenance Architecture", O-RAN.WG1.OAM-Architecture-v04.00 2020, O-RAN Alliance, 54 pages (Nov. 2020).
"O-RAN Architecture Description", O-RAN.WG1.O-RAN-Architecture-Description-v04.00, O-RAN Alliance, 33 pages (Mar. 2021).
"O-RAN Working Group 3, Near-Real-time RAN Intelligent Controller, E2 Application Protocol (E2AP)", O-RAN.WG3.E2AP-v01.01, O-RAN Alliance, 84 pages (Jul. 2020).
"O-RAN Fronthaul Working Group Control, User and Synchronization Plane Specification", O-RAN.WG4.CUS.0-v06.00, O-RAN Alliance, 298 pages (Mar. 2021).
O-Ran Alliance, "O-RAN Fronthaul Working Group Control, User and Synchronization Plane Specification", O-RAN.WG4.CUS.0-v06.00, O-RAN Alliance, 298 pages (Mar. 2021).
O-Ran Alliance, "Cloud Architecture and Deployment Scenarios for O-RAN Virtualized RAN", O-RAN.WG6.CAD-v02.01, O-RAN Alliance, 52 pages (Jul. 2020).
"O-RAN Working Group 3 Near-Real-time RAN Intelligent Controller E2 Service Model (E2SM) KPM", ORAN-WG3.E2SM-KPM-v01.00.00, O-RAN Alliance, 44 pages (Feb. 2020).
"O-RAN Working Group 3 Near-Real-time RAN Intelligent Controller E2 Service Model (E2SM), RAN Function Network Interface (NI)", ORAN-WG3.E2SM-NI-v01.00.00, O-RAN Alliance, 44 pages (Feb. 2020).
"O-RAN Working Group 3 Near-Real-time RAN Intelligent Controller", ORAN-WG3.E2SM-v01.00.00, O-RAN Alliance, 27 pages (Feb. 2020).
Kok-Lim Alvin Yau et al., "Application of Reinforcement Learning in Cognitive Radio Networks: Models and Algorithms", 2014, 24 pages, The Scientific World Journal, vol. 2014, Article ID 209810.
Volodymyr Mnih et al, "Human-level control through deep reinforcement learning", Feb. 26, 2015, 13 pages, vol. 518.
Julien Perez et al, "Utility-based Reinforcement Learning for Reactive Grids", May 2008, 10 pages, The 5th IEEE International Conference on Autonomic Computing, Chicago, USA.
Miguel Perez-Enciso et al, "A Guide for Using Deep Learning for Complex Trait Genomic Prediction", Jul. 20, 2019, 19 pages.
Max Pumperla et a., "Deep Learning and the Game of Go", 2019, 22 pages.
David Silver et al., "Deterministic Policy Gradient Algorithms", 2014, 9 pages, Proceedings of the 31st International Conference on Machine Learning, Beijing, China, 2014. Jmlr: W&Cp vol. 32.
Richard S. Sutton et al., "Reinforcement Learning: An Introduction", Nov. 5, 2017, 445 pages, London, England.
Csaba Szepesvari, "Algorithms for Reinforcement Learning", Jun. 9, 2009, 98 pages.
Yunhao Tang, "Introduction to Deep Learning with Tensorflow", Feb. 25, 2019, 153 pages, Department of EOR, Columbia University.
Huasen Wu et al.," Adaptive Exploration-Exploitation Tradeoff for Opportunistic Bandits", Nov. 30, 2018, 18 pages, arXiv:1709.04004v2 [cs.LG].
"3rd Generation Partnership Project; Technical Specification Group Services and System Aspects; System architecture for the 5G System (5GS); Stage 2 (Release 17)", 3GPP TS 23.501 v17.3.0, 559 pages (Dec. 23, 2021).
"3rd Generation Partnership Project; Technical Specification Group Services and System Aspects; Management and orchestration; Concepts, use cases and requirements (Release 17)" 3GPP TS 28.530 v17.2.0, 37 pages (Dec. 23, 2021).
"3rd Generation Partnership Project; Technical Specification Group Services and System Aspects; Management and orchestration; Performance assurance (Release 16)", 3GPP TS 28.550 v16.8.0, 85 pages (Sep. 23, 2021).
"3rd Generation Partnership Project; Technical Specification Group Services and System Aspects; Telecommunication management; Performance Management (PM); Concept and requirements (Release 16)", 3GPP TS 32.401 v16.0.0, 29 pages (Jul. 10, 2020).
"3rd Generation Partnership Project; Technical Specification Group Services and System Aspects; Telecommunication management; Subscriber and equipment trace; Trace concepts and requirements (Release 17)", 3GPP TS 32.421V17.3.0, 49 pages (Dec. 23, 2021).
"Zero-touch network and Service Management (ZSM); Reference Architecture", ETSI GS ZSM 002 V1.1.1, 80 pages (Aug. 2019).
X. Geng et al., "5G End-to-end Network Slice Mapping from the view of Transport Network", IETF, draft-geng-teas-network-slice-mapping-04, 19 pages (Oct. 25, 2021), https://www.ietf.org/archive/id/draft-geng-teas-network-slice-mapping-04.html.
A. Farrel et al., "Framework for IETF Network Slices", IETF, draft-ietf-teas-ietf-network-slices-05, 40 pages (Oct. 25, 2021), https://www.ietf.org/archive/id/draft-ietf-teas-ietf-network-slices-05.txt.
mnavarro, "Architecture", ONAP Developer Wiki, 4 pages (Jul. 26, 2019; retrieved on Dec. 23, 2021), https://wiki.onap.org/display/DW/Architecture.

* cited by examiner

RESILIENT RADIO RESOURCE PROVISIONING FOR NETWORK SLICING

TECHNICAL FIELD

Embodiments described herein generally relate to edge computing, network communication, communication system implementations, and artificial intelligence (AI) and machine learning (ML), and in particular, to AI/ML techniques for managing traffic in multi-access communications networks.

BACKGROUND

In order to fulfill diverse communication requirements for different industry segments, mobile network operators (MNOs) have adopted network slicing, which allows multiple logical and virtualized networks to run on a common physical infrastructure. Network slicing requires careful design to ensure each network slice fulfills their negotiated service level agreements (SLAs) and to provision network resources (e.g., radio resource, etc.) in a resource efficient manner. In addition, network slices should be resilient to changes in the network, such as traffic dynamics, wireless signal quality fluctuations, and even network failure events.

There are naïve network slicing resource management approaches that allocate dedicated radio resource for a network slice. However, the naïve network slicing resource management approaches tend to over-provision (i.e., waste) network and/or radio resources for network slices. In addition, naïve network slicing resource management approaches cannot provide good performance guarantees for network reliability. At present, there are no existing resource management solutions to ensure resilient network slicing provisioning.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
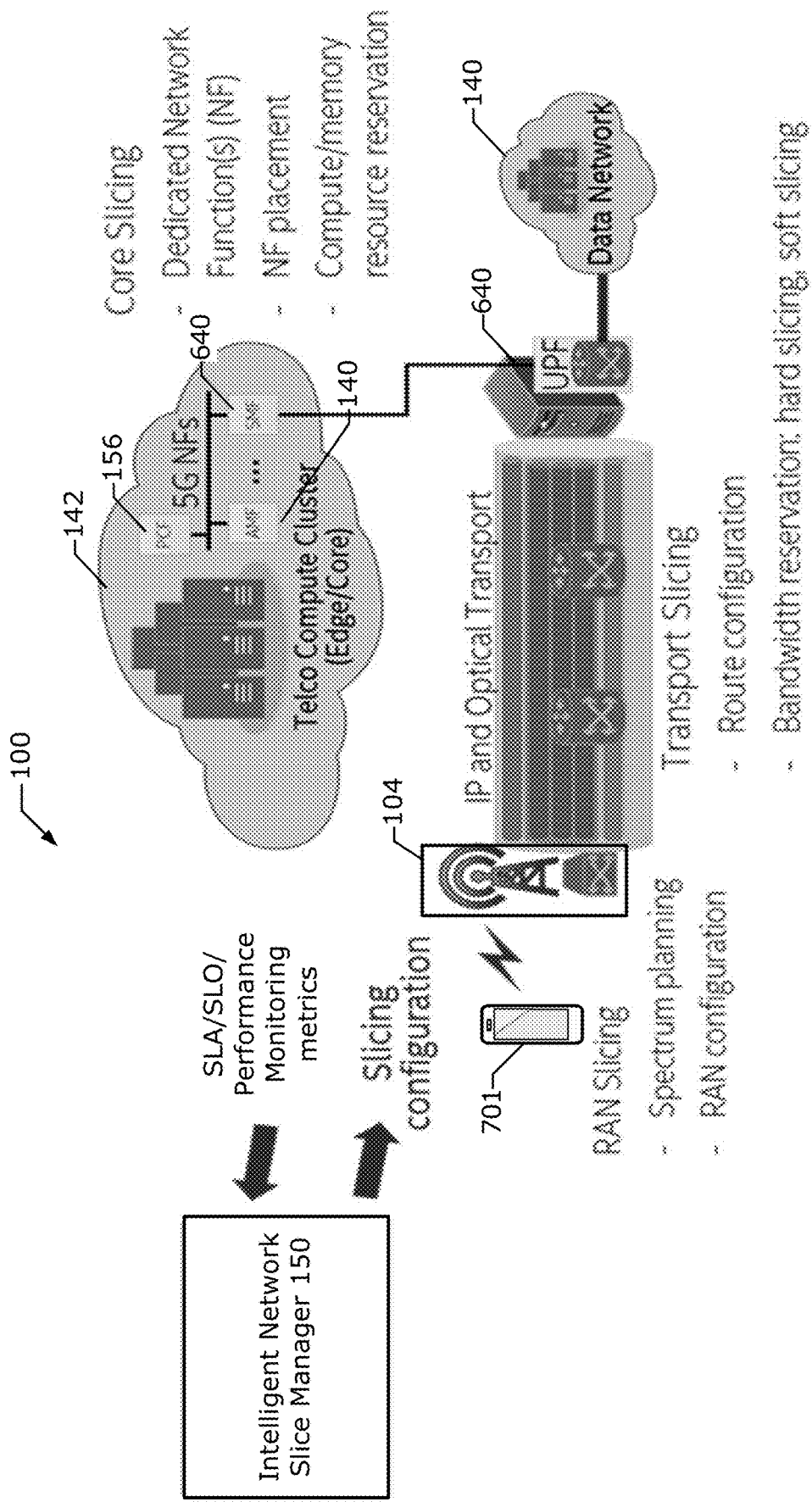
FIG. 1 depicts an example network slicing network architecture according to various embodiments.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

1. NETWORK SLICING MANAGEMENT ASPECTS

Edge computing technologies (ECTs) are emerging technologies that provide intelligence at the network's edge to address the need of latency-sensitive applications, such as gaming, autonomous driving, and factory automation, and the like. One such emerging ECT is ETSI Multi-access Edge Computing (MEC) (see e.g., [MEC]). ECTs offer a more efficient compute-offload model by placing distributed computing and storage resources in proximity to data providers and consumers. As more and more client devices (e.g., UEs 921, 911 of FIG. 9) are equipped with multiple radio interfaces, and can access multiple radio access networks (RANs) (see e.g., RANs including one or more NANs 931-933 of FIG. 9) using multiple types of radio access technologies (RATs) (e.g., 5G/NR, LTE, WiFi, LoRa, etc.). There has been increasing interest to establish multiple concurrent connections between multi-radio devices and the network for enhanced bandwidth and reliability.

A network slice is a logical network topology including a set of nodes, and connections between the set of nodes, using a set of shared or dedicated set of compute and/or network resources that are used to satisfy one or more SLAs and/or service level objectives (SLOs). As examples, an SLA may define or specify a type of service to be provided (e.g., a description, policy specification, or other data structure of the type of service and any additional details of type of service to be provided such as operation and maintenance of networking equipment, connection bandwidth to be provided, etc.); the service's desired performance level, especially its reliability and responsiveness (e.g., a reliable service will be the one that suffers minimum disruption in a specific amount of time and is available at almost all times; a service with good responsiveness will perform the desired action promptly after the customer requests it); monitoring process and service level reporting (e.g., a description, policy specification, or other data structure of how performance levels are supervised and monitored; this process involves gathering different type of statistics, how frequently these statistics will be collected and how they will be accessed by the customers); steps for reporting issues with the service (e.g., a description, policy specification, or other data structure of how and where to report detected problems and the order in which details about detected issues have to be reported, a time range in which the problems will be looked into and when the issues will be resolved); and/or response and issue resolution time-frame (e.g., a description, policy specification, or other data structure of a response time-frame is the time period by which the service provider will start the investigation of the issue. Issue resolution time-frame is the time period by which the current service issue will be resolved and fixed.); and/or repercussions for service provider not meeting its commitment (e.g., a description, policy specification, or other data structure of consequences or actions to be taken if the service provider is not able to meet the requirements as stated in SLA. These consequences may include customer's right to terminate the contract or ask for a refund for losses incurred by the customer due to failure of service.

Additionally or alternatively, a network slice may combine the connectivity resource requirements and associated network behaviors (e.g., bandwidth, latency, jitter, network functions (NFs), etc.) with other resource behaviors (e.g., compute and storage availability). For purposes of the present disclosure, a network slice may be independent of the (radio) access technologies ((R)ATs) used in the underlay network. Additionally or alternatively, an individual network slice may be sliced into multiple network slices (e.g., "sub-network slices" or "sub-slices"), which may be combined hierarchically and/or combined sequentially so that various different networks can each be sliced and the network slices placed into a sequence to provide an end-to-end (e2e) service (see e.g., [TS23501]).

Network slicing creates independent logical and/or virtual channels with characteristics and capabilities tailored to different application, service, user, and/or network requirements while sharing a common network infrastructure and/or virtualization infrastructure. Software Defined Networking (SDN), Network Function Virtualization (NFV), orchestration, analytics, and automation, allow mobile network operators (MNOs) to create network slices that can support specific instances, applications, services, users (or sets of users), and/or networks. Network slices can span multiple network domains, including access, core, and transport, and be deployed across MNOs and/or other service providers. Each network slice is specified with a pre-negotiated SLAs that defines the resource constraints and e2e network performance requirements for the slice. An SLA may be defined or otherwise specified in terms of one or more SLOs, which in turn, may be defined or otherwise specified in terms of one or more service level indicators (SLIs). Provisioning for a network slice involves resource configuration for various parts of the network (e.g., as illustrated in FIG. 1) in order to meet the service requirements (e.g., SLAs, SLOs, etc.).

Existing network slicing orchestration and/or management systems assume that network slices are technology-agnostic, where network slice realization is selected based upon multiple considerations including its service requirements and the capabilities of the underlying network. Additionally, the existing network slicing orchestration systems also assumes that the underlying network is capable of changing the configurations of the network devices on demand through, for example, in-band signaling or via controller(s) and fulfilling all or some of SLOs and/or service level expectations (SLEs) to all of the traffic in the slice or to specific flows. These assumptions make it difficult to provide reliable and/or resilient network slices.

The present disclosure provides a resilient (radio) access network ((R)AN) slicing framework encompassing a resource planning engine and distributed dynamic slice-aware scheduling modules at one or more network access nodes (NANs) (e.g., base stations (BS), access points (APs), distributed units (DUs), etc.), edge compute nodes, and/or cloud computing clusters. The resilient (R)AN slicing framework includes resource planning and slice-aware scheduling, as well as signaling exchanges for provisioning resilient (R)AN slicing. The signaling exchanges for provisioning resilient (R)AN slicing can include, for example, signaling and/or message exchanges between one or more NANs and one or more edge compute nodes. Such signaling and/or message exchanges (including message formats and the like) can be specified by suitable network management API and/or standards or specification such as 3GPP standards (e.g., [SA6Edge], [T523501], etc.), ETSI standards (e.g., [MEC]), Open RAN (O-RAN) (see e.g., [O-RAN]), Intel® Smart Edge Open framework (e.g., [ISEO]), and/or any other suitable specifications/standards. The intelligent (R)AN slicing framework can realize resource isolation in a more efficient and agile manner than existing network slicing technologies. In addition, by incorporating reliability target in slice provisioning process, better service guarantees can be achieved with more efficient resource allocation than can be provided by existing solutions.

FIG. 1 depicts an example network slicing network architecture 100 according to various embodiments. The embodiments herein involve, inter alia, (R)AN slicing. In the (R)AN 104, a (R)AN slice is part of a network slice created and/or deployed to provide appropriate resources at the (R)AN 104 for application and/or service requirements (e.g., SLAs, SLOs, etc.). Depending on implementation, use case, and/or SLAs, some or all aspects of a (R)AN slice can be shared with other (R)AN slices, or dedicated/exclusive to a particular MNO or set of subscribers.

The network slicing network architecture 100 includes an Intelligent Network Slice Manager (INSM) 150 (also referred to as "slice manager 150", "slice-aware scheduler 150", "resource planning engine 150", or the like), which collects network performance measurements/metrics and updates network configurations according to app/service requirements for network slices and observation of network performance. The INSM 150 allocates radio resources as per slice requirements and/or predetermined or negotiated SLAs. This includes an initial deployment and for recovery purposes. Additionally or alternatively, different network slices can be grouped according to resiliency levels and/or priority levels. To serve multiple service consumers and/or multiple slices, INSM 150 includes or operates one or more sophisticated scheduling functions to meet competing and conflicting needs of different slice consumers, subscribers, deployment scenarios, and/or use cases such as, for example, enhanced mobile broadband (eMBB), ultra-reliable low latency communications (URLLC), industrial Internet of Things (IIoT), and/or the like. In one example, the INSM 150 may provide differentiated handling of data traffic or traffic flows by creating or instantiating different user plane and/or control plane functions to serve individual slices in a dedicated fashion.

The INSM 150 may encompass one or more (or a collection of) network functions (NFs), such as a Network Slice Admission Control Function (NSACF), Network Slice-specific and SNPN Authentication and Authorization Function (NSSAAF), Network Slice Selection Function (NSSF), Network Slice Management Function (NSMF) or Network Slice Subnet Management Function (NSSMF) defined in 3GPP standards/specifications. Additionally or alternatively, the INSM 150 may encompass one or more (or a collection of) other network slice functions such as an IETF Network Slice service provider, IETF Network Slice Controller (NSC), and/or a 5G E2E Network Slice Orchestrator as discussed in Geng et al., "5G End-to-end Network Slice Mapping from the view of Transport Network", IETF Network Working Group, draft-geng-teas-network-slice-mapping-04 (25 Oct. 2021) ("[IETF-Geng]") and Farrel et al., "Framework for IETF Network Slices", IETF Network Working Group, draft-ietf-teas-ietf-network-slices-05 (25 Oct. 2021) ("[IETF-Geng]"), the contents of each of which are hereby incorporated by reference in their entirety.

In some implementations, the INSM 150 is deployed at the (R)AN 104 (e.g., in a central unit (CU) of a CU/DU split architecture (see e.g., [TS38401])), in a network access node (NAN) within (e.g., at a Distributed Unit (DU) of a CU/DU split architecture (see e.g., [TS38401])), or the like. In some implementations, the INSM 150 is deployed at an edge compute node (e.g., edge compute node 936 in FIG. 9). For example, some or all of the functionalities of the INSM 150 can be implemented as one or multiple xApps located at Near-Real-Time (RT) RAN Intelligent Controller (RIC) and/or one or multiple rApps at Non-RT RIC in O-RAN framework (see e.g., [O-RAN]). Additionally or alternatively, the INSM 150 can be implement as an edge application (app) such as a MEC app operating in a MEC host (see e.g., [MEC]), an Edge Application Server (EAS) and/or Edge Configuration Server (ECS) in a 3GPP edge computing framework (see e.g., [SA6Edge]), or as a management function based on Zero-touch System Management (ZSM) architecture (see e.g., ETSI GS ZSM 002 v1.1.1 (2019-08) ("[ZSM002]"). Additionally or alternatively, the INSM 150 can be implement as an ONAP module in the Linux Foundation® Open Network Automation Platform (ONAP) (see e.g., "Open Network Automation Platform: Architecture Overview", available at: https://docs.onap.org/en/latest/guides/onap-developer/architecture/onap-architecture.html#architecture-overview). The INSM 150 concepts described in this disclosure can be applied to all aforementioned frameworks.

Figure 7:
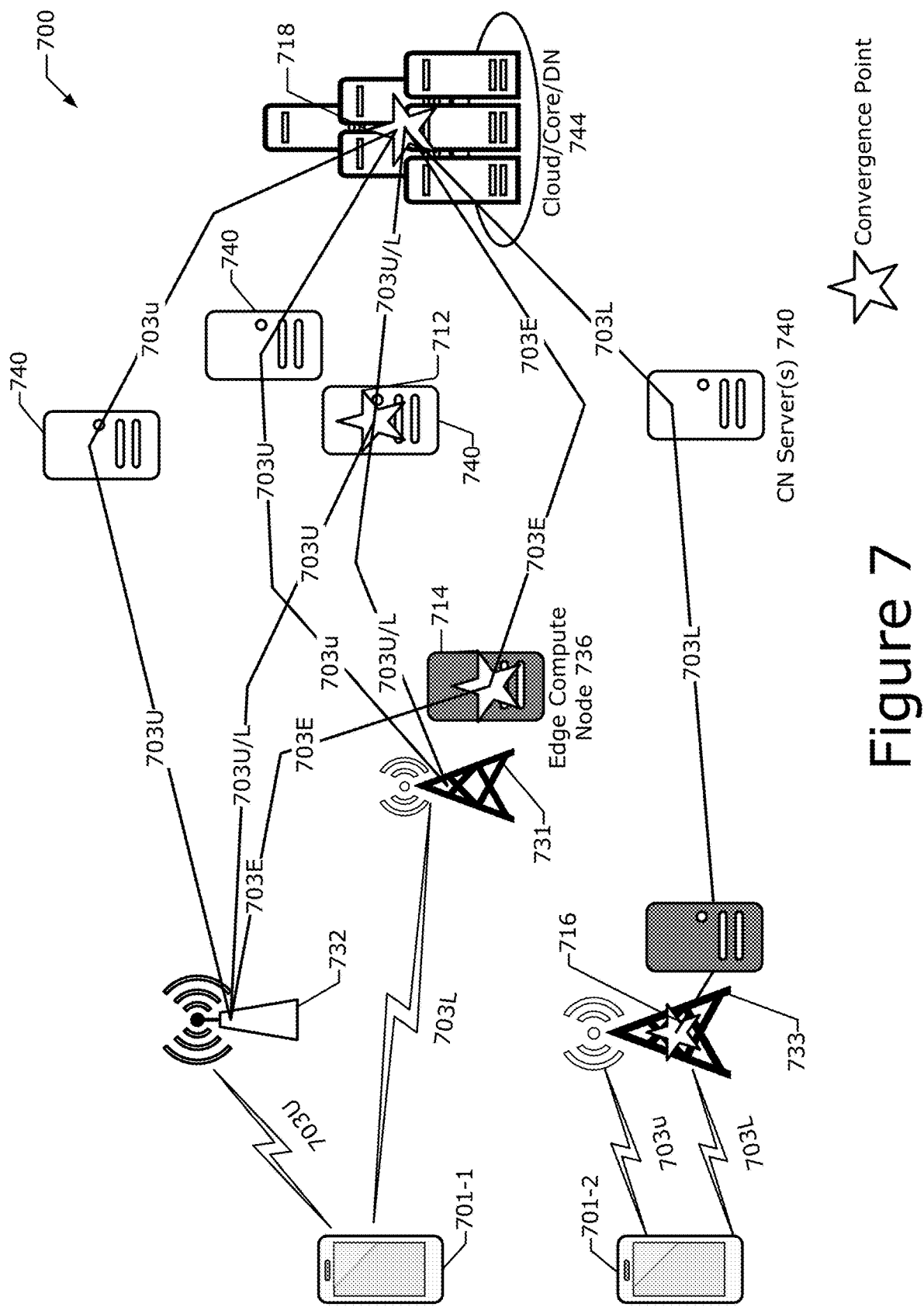
FIG. 7 depicts an example Multi-RAT network with different convergence architectures.
Figure 9:
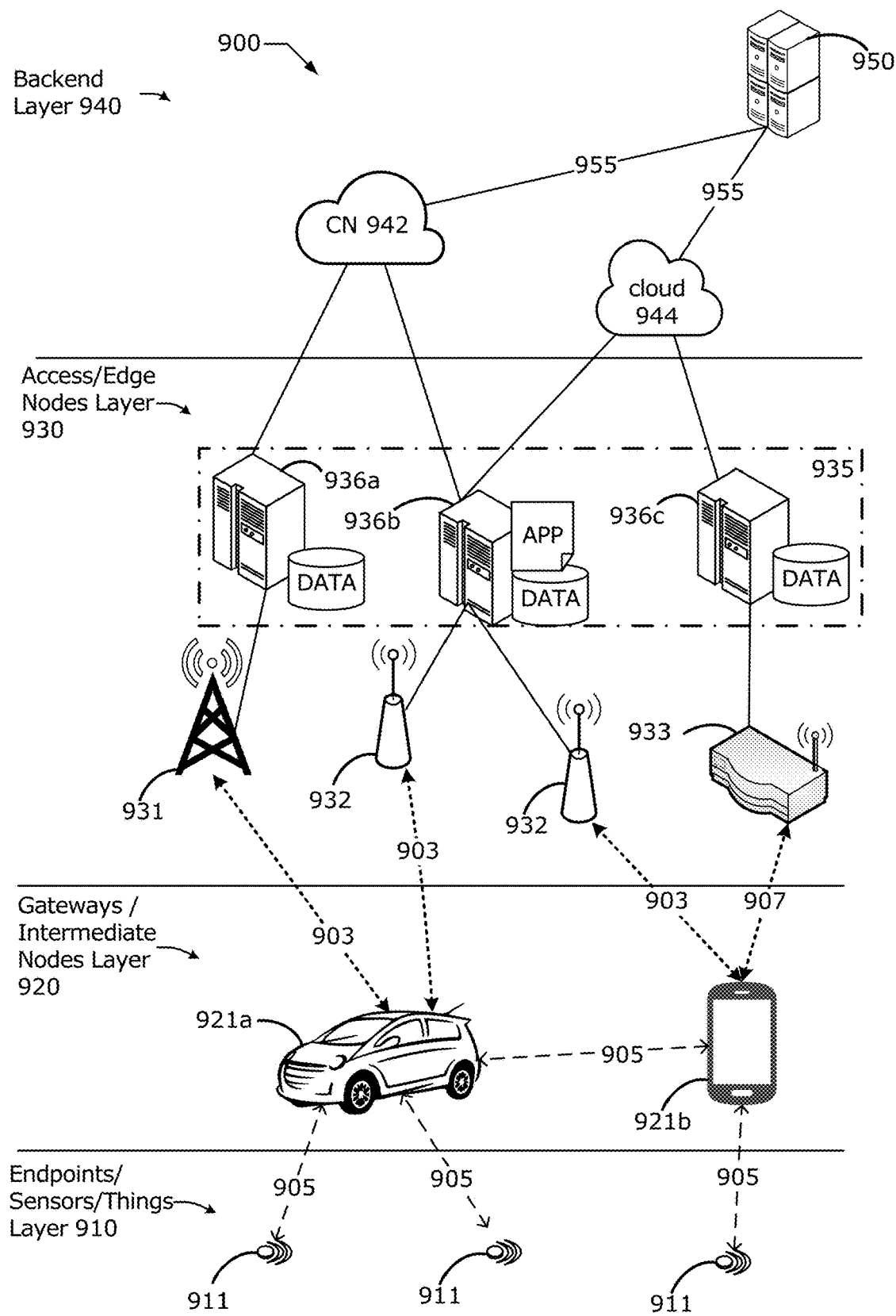
FIG. 9 illustrates an example edge computing environment.

The network slicing network architecture 100 also includes compute node 701 capable of accessing one or multiple (R)ANs 104, each of which may include one or more (R)AN nodes (e.g., NANs 731-733, 931-933 discussed infra with respect to FIGS. 7 and 9). The compute node 701 may be the same or similar as UEs 921, 911 of FIG. 9. The network slicing network architecture 100 also includes a core network (CN) 142 which may be the same or similar as CN 942 discussed infra, which includes various 5G NFs including Access and Mobility Management Function (AMF) 144, a Policy Control Function (PCF) 156, and a Session Management Function (SMF) 146, which is/are communicatively coupled with a user plane function (UPF) 148. Additional aspects of CN 142, 942 are discussed in more detail infra with respect to FIG. 9. The UPF 148 is communicatively coupled with a data network (DN) 140 and the (R)AN 104.

The AMF 144 allows other functions of the CN 142 to communicate with the user equipment (UE) 701 and the (R)AN 731-733 and to subscribe to notifications about mobility events with respect to the UE 701. The AMF 144 is also responsible for registration management (e.g., for registering UE 701), connection management, reachability management, mobility management, lawful interception of AMF-related events, and access authentication and authorization. The AMF 144 provides transport for SM messages between the UE 701 and the SMF 146, and acts as a transparent proxy for routing SM messages. AMF 144 also provides transport for SMS messages between UE 701 and an SMSF. AMF 144 interacts with the AUSF and the UE 701 to perform various security anchor and context management functions. Furthermore, AMF 144 is a termination point of a RAN-CP interface, which includes the N2 reference point between the (R)AN 731-733 and the AMF 144. The AMF 144 is also a termination point of NAS (N1) signaling, and performs NAS ciphering and integrity protection.

AMF 144 also supports NAS signaling with the UE 701 over an N3IWF interface. The N3IWF provides access to untrusted entities. N3IWF may be a termination point for the N2 interface between the (R)AN 104 and the AMF 144 for the control plane, and may be a termination point for the N3 reference point between the (R)AN 104 and the UPF 148 for the user plane. As such, the AMF 144 handles N2 signaling from the SMF 146 and the AMF 144 for PDU sessions and QoS, encapsulate/de-encapsulate packets for IPSec and N3 tunneling, marks N3 user-plane packets in the uplink, and enforces QoS corresponding to N3 packet marking taking into account QoS requirements associated with such marking received over N2. N3IWF may also relay UL and DL control-plane NAS signaling between the UE 701 and AMF 144 via an N1 reference point between the UE 701 and the AMF 144, and relay uplink and downlink user-plane packets between the UE 701 and UPF 148. The N3IWF also provides mechanisms for IPsec tunnel establishment with the UE 701. The AMF 144 may exhibit an Namf service-based interface, and may be a termination point for an N14 reference point between two AMFs 144 and an N17 reference point between the AMF 144 and a 5G-EIR (not shown by FIG. 1).

The SMF 146 is responsible for session management (SM) (e.g., session establishment, tunnel management between UPF 148 and (R)AN 104); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 144 over N2 to (R)AN 104; and determining SSC mode of a session. SM refers to management of a PDU session, and a PDU session or "session" refers to a PDU connectivity service that provides or enables the exchange of PDUs between the UE 701 and the DN 140.

The PCF 156 provides policy rules to control plane functions to enforce them, and may also support unified policy framework to govern network behavior. The PCF 156 may also implement a front end to access subscription information relevant for policy decisions in a UDR of a UDM. In addition to communicating with functions over reference points as shown, the PCF 156 exhibit an Npcf service-based interface.

The CN 142 may enable edge computing by selecting operator/3rd party services to be geographically close to a point that the UE 701 is attached to the network. This may reduce latency and load on the network. In edge computing implementations, the CN 142 may select a UPF 148 close to the UE 701 and execute traffic steering from the UPF 148 to DN 140 via the N6 interface. This may be based on the UE subscription data, UE location, and information provided by an application function (AF), which allows the AF to influence UPF (re)selection and traffic routing.

The data network (DN) 140 may represent various network operator services, Internet access, or third party services that may be provided by one or more servers including, for example, application (app)/content servers. The DN 140 may be an operator external public, a private PDN, or an intra-operator packet data network, for example, for provision of IMS services. In this embodiment, the app server can be coupled to an IMS via an S-CSCF or the I-CSCF. In some implementations, the DN 140 may represent one or more local area DNs (LADNs), which are DNs 140 (or DN names (DNNs)) that is/are accessible by a UE 701 in one or more specific areas. Outside of these specific areas, the UE 701 is not able to access the LADN/DN 140.

The UPF 148 acts as an anchor point for intra-RAT and inter-RAT mobility, an external PDU session point of interconnect to data network 140, and a branching point to support multi-homed PDU session. The UPF 148 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 148 may include an uplink classifier to support routing traffic flows to a data network. The UPF 148 also uses network instances and/or network slice instances for traffic detection and routing purposes, for example, for routing data flows/traffic between the DN 140 and the (R)AN 104 and/or UE 701.

The network slicing network architecture 100 includes core, transport, and (R)AN configuration options. The core configurations and/or slicing options include dedicated network functions (NFs), NF placement and/or deployment, and compute and/or memory resource reservation. The transport configurations and/or slicing options include route configuration, bandwidth reservation, hard and/or soft slicing, and tunneling configurations. The (R)AN configurations and/or slicing options include spectrum planning, (R)AN configuration, radio resource allocation and configurations, and the like Ultra-resiliency is an important requirement for networks such as next generation 6G network. Network operators can configure network resources to create network slices with ultra-resilient characteristics. Desired properties for (ultra-) resilient network slices include reliable data transmission (e.g., including transmission with very low packet drop rate and/or guarantee of timely packet delivery); high service availability (e.g., subscribed users can always connect to the network slice service in the slice coverage area); minimum or zero service interruption (e.g., subscribed users should not experience service interruption during handover (HO) or network component failure events); and relatively consistent quality of service (QoS) (e.g., ultra-resilient network slice can offer SLAs with more stringent QoS requirements. Some SLAs may even demand consistent e2e user experience such as, for example, consistent data rate, deterministic latency, etc. In various embodiments, the INSM 150 addresses the following aspects of resilient network slice management problems: network configurations to provide resilient network slices.

1.1. Network Configuration Strategies for Resilient Network Slices

Figure 2:
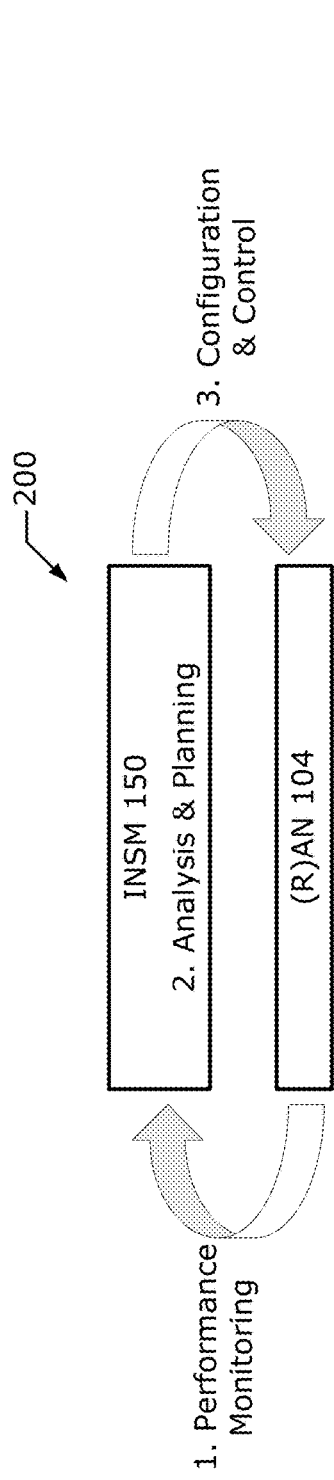
FIG. 2 depicts an example network slice management workflow according to various embodiments.

FIG. 2 shows a workflow 200 for managing an active network slice instances according to various embodiments. The workflow 200 may be used by the INSM 150 to offer an ultra-resilient network slice. In the workflow 200, the INSM 150 monitors reliability related (R)AN performance metrics and/or the (R)AN 104 provides performance monitoring data to the INSM 150 (step 1). The INSM 150 performs analysis and planning based on the performance monitoring data (step 2) using one or more analysis and/or planning algorithms including AI/ML models. The INSM 150 provides new or updated configuration and control data (or control actions) to the (R)AN 104 (step 3). The slice configurations and/or control data/actions are based on outputs of the analysis/planning algorithms. The workflow 200 may repeat as necessary.

In various embodiments, virtual resource isolation for network slicing at the (R)AN level can be realized by adopting one or more of the following configuration options: assigning dedicated network elements, NFs, and/or virtual NFs (VNFs) to a slice, providing relatively advanced (R)AN configurations for a slice, and allocating dedicated or prioritized radio resources for a slice while sharing common physical infrastructure with other traffic.

In some implementations, assigning dedicated network elements, NFs, and/or virtual NFs (VNFs) includes, for example, reserving (exclusively) for an individual slice one or more radio unit (RUs), one or more distributed units (DUs), one or more centralized unit (CU) user plane (UP) functions, one or more CU control plane (CP) functions, one or more core network NFs, and/or one or more core network slices/instances. The reservation or assignment of the dedicated network elements, NFs, and/or VNFs may be for a predetermined or configured period of time.

Additionally or alternatively, providing advanced (R)AN configurations for a slice may include, for example, providing/provisioning a bandwidth part (BWP) configuration suitable for a specific type of traffic (e.g., eMBB traffic, URLLC traffic, etc.), providing/provisioning a beam configuration to boost capacity and/or to ensure better coverage, and/or the like.

Additionally or alternatively, the dedicated or prioritized radio resources for the individual slice can include reserving a set of resource blocks (RBs), physical RBs (PRBs), virtual RBs (VRBs), channel access times/periods, and/or other like units of radio resources. These resources may be specified or allocated to a particular type of traffic according to the priority levels, QoS treatment, and/or the like.

The following discussion provides the (R)AN metrics to be monitored and control/configuration actions for offering resilient network slices. Analysis and planning schemes to determine proper configuration/control decisions to ensure reliability are also provided infra.

1.1.1. RAN Performance Monitoring

Existing 3GPP framework(s) for (R)AN metric collection, including performance management (see e.g., 3GPP TS 28.550 v16.8.0 (2021 Sep. 23) ("[TS28550]"), 3GPP TS 28.530 v17.2.0 (2021 Dec. 23) ("[TS28530]"), and 3GPP TS 32.401 v16.0.0 (2020 Jul. 10) ("[TS32401]"), the contents of each of which are hereby incorporated by reference in their entireties), tracing and UE measurements collected via minimization of drive test (see e.g., 3GPP TS 32.421 v17.3.0 (2021 Dec. 23) ("[TS32421]"), 3GPP TS 37.320 v16.6.0 (2021 Sep. 29) ("[TS37320]"). In addition, O-RAN E2 signaling (see e.g., [O-RAN]) and proprietary signaling can also be used to collect RAN measurements. Examples of the (R)AN measurements that can be collected for assessing SLA violation risk for an (ultra-)resilient network slices include data transmission reliability metrics, service continuity reliability metrics, network condition metrics, and UE condition metrics.

Data transmission reliability metrics include, for example, transport block error rate (e.g., physical layer transmission failure probability), packet loss rate (e.g., ratio of packets that are not successfully delivered), and/or packet drop rate (e.g., ratio of packets dropped due to traffic load, traffic management).

Service continuity reliability metrics include, for example, radio link failure (RLF) rate and/or HO failure (HOF) rate. Additionally or alternatively, the service continuity reliability metrics include traces of reference signal received power (RSRP), reference signal received quality (RSRQ), signal-to-interference-and-noise (SINR) level, and/or beam direction prior to RLF. Additionally or alternatively, the service continuity reliability metrics include traces of RSRP, RSRQ, SINR and/or beam direction prior to HOF.

Network condition metrics include, for example, radio resource utilization level, number of radio resource control (RRC) connections, a number of RRC connection failures, number of protocol data unit (PDU) sessions, PDU session establishment failure rate, data volume (e.g., total, per slice and per QoS class traffic loading), and/or latency (e.g., average packet delay for all packets, per slice or per QoS class).

UE condition metrics include, for example, wireless channel quality (e.g., reference signal received power (RSRP), reference signal received quality (RSRQ), received signal strength indication (RSSI), channel quality indicator (CQI), and/or the like).

If UE location information is available, measurements from UE can further be correlated with location information to create traces that can be used to predict reliability performance based on UE moving trajectory.

1.1.2. Configuration and Control Actions for Resilient Network Slice

In various embodiments, to realize an resilient or ultra-resilient network/(R)AN slicing at the (R)AN 104, the INSM 150 can configure reliability enhancement rules for (R)AN functions and/or core network NFs based on the (R)AN performance observations. In some implementations, each instance of an ultra-resilient slice can be configured with one or multiple back-up NANs 731-733, 931-933. Here, an "instance" may refer to a process, a thread, an object, a database entity/element, a user, an application (app) instance, a session, a service (or set of services), a data flow/traffic flow, a connection or link (e.g., links 703, interconnect (IX) 1156, etc.), a system or device (e.g., compute nodes 701, 911, 921, NANs 731-733, 931-933, edge compute node 736, 936, server(s) 740, and/or any other device such as those discussed herein), and/or any other like entity. Examples of such implementations are shown and described with respect to FIGS. 3a-3b.

Figure 3A:
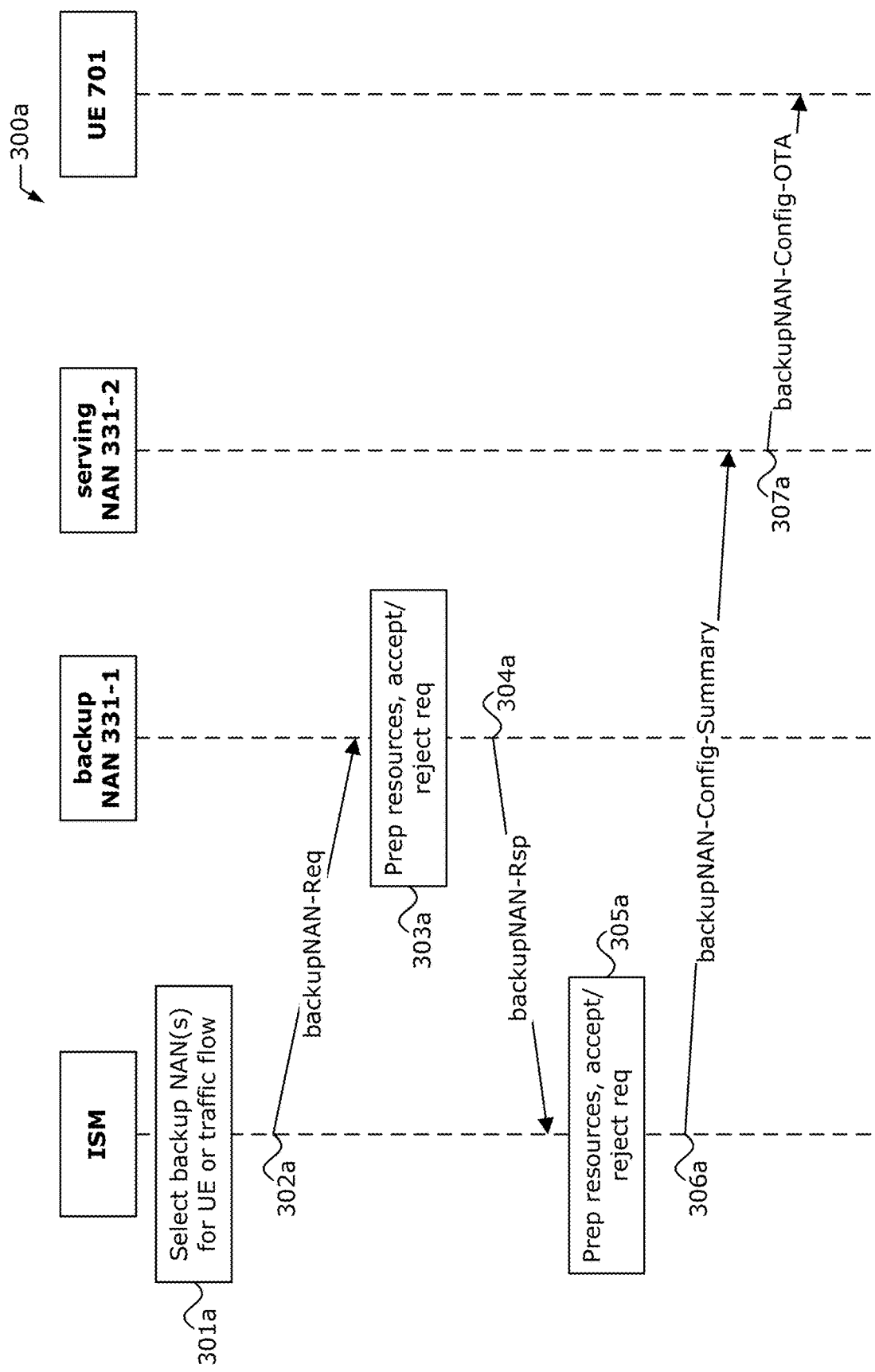
FIGS. 3a and 3b depict examples back-up network access node configuration procedures according to various embodiments.
Figure 3B:
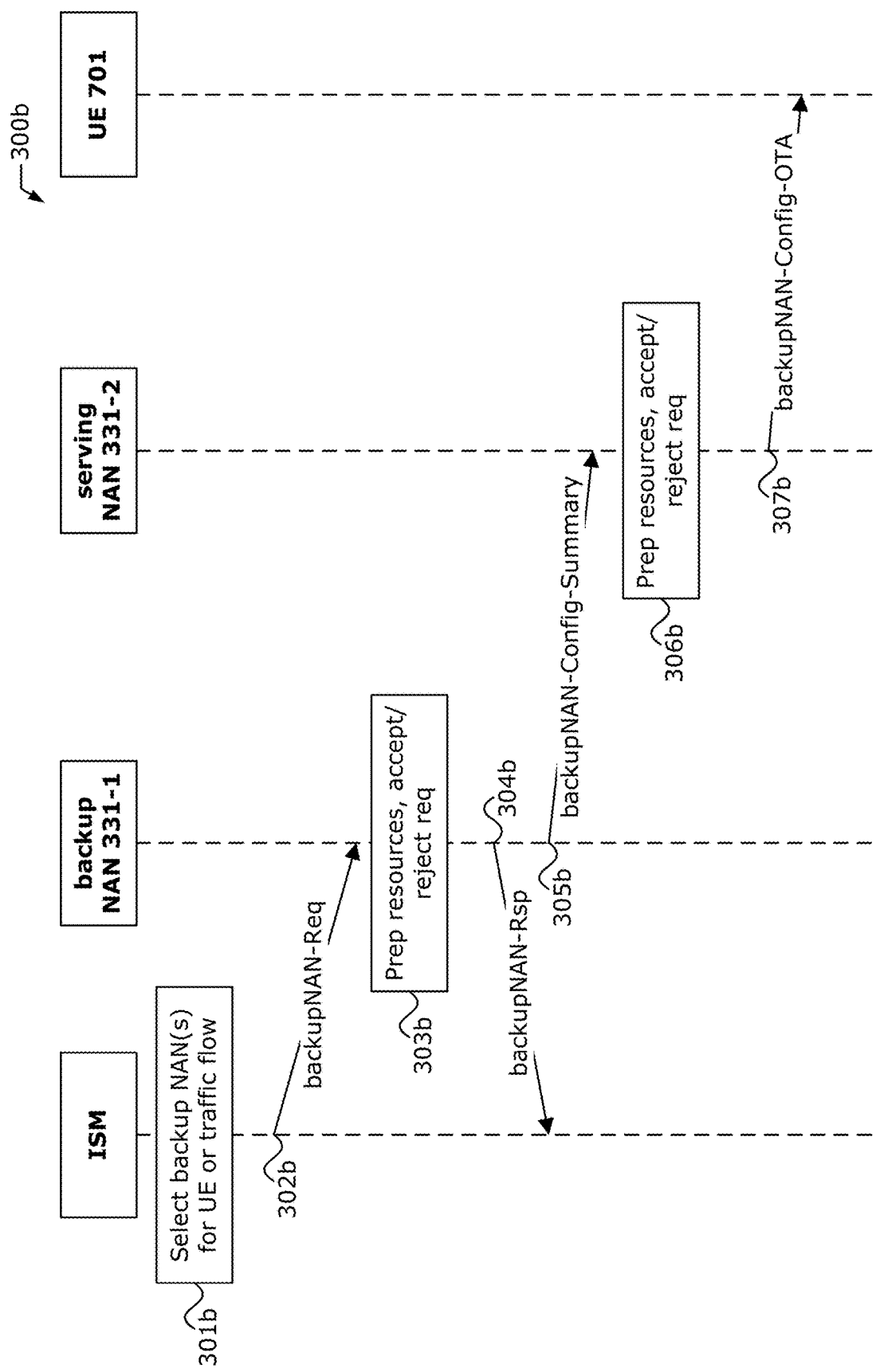

FIG. 3a depicts a first example Back-up NAN configuration procedure 300a, and FIG. 3b depicts a second example Back-up NAN configuration procedure 300b. The NANs 331 in FIGS. 3a and 3b may be the same as any of the NANs 731-733, 931-933.

In each procedure 300a and 300b, the INSM 150 determines one or more back-up NANs for an individual slice or an instance (301a, 301b), and then sends a backup request message (BackupNAN-Req) to request a candidate backup NAN 331-1 to provide backup support (302a, 302b). The backup support may include different aspects for providing network services when a serving NAN 331-2 fails, experiences overload, or is otherwise unable to provide adequate services to the instance. The backup NAN 331-1 assesses whether it has sufficient resource(s) to provide the back-up support (303a, 303b) and sends a backup response message (BackupBS-Rsp) to respond to the INSM 150 whether the backup request is accepted or rejected (304a, 304b). The BackupBS-Rsp message can contain configurations for special support the backup NAN 331-1 can provide, such as prioritized RACH channel configuration to support fast HO for the UE, synchronization preamble information, and/or other system information.

In procedure 300a, the INSM 150 can collect the special configurations from all candidate backup NANs 331-1, and generates a backup configuration message or a summary report (BackupNAN-Config-Summary) (305a), and sends the summary report to the serving NAN 331-2 (306a) for the UE 701, and the serving NAN 331-2 forwards or otherwise provides the summary report (BackupNAN-Config-Summary) to the UE 701 (307a).

In procedure 300b, the backup NAN 331-1 directly sends the summary report (BackupNAN-Config-Summary) to the serving NAN 331-2 (305b) for the UE 701. The serving NAN 331-2 prepares a message (BackupNAN-Config) containing configurations for the special support it will offer to the UE 701 (306b). After receiving the configurations from Back-up NAN(s) 331-1, the serving NAN 331-2 can send an over-the-air (OTA) signaling (BackupNAN-Config-OTA) containing the backup NAN 331-1 configurations to the UE 701 (307b).

In some implementations, the backup NAN 331-1 can part of the same (R)AN 104 as the serving NAN 331-2. In one example, the backup NAN 331-1 and the serving NAN 331-2 may both be DUs belonging to, or otherwise associated with a same CU in an NG-RAN 104. In another example, the backup NAN 331-1 and the serving NAN 331-2 may be WiFi APs connected to a same gateway appliance, within a same building, within some predefined geographic area, and/or part of a same WLAN (e.g., an enterprise network or the like).

In some implementations, the backup NAN 331-1 is part of a different (R)AN 104 than the serving NAN 331-2. In one example, the backup NAN 331-1 can be a gNB belonging to a first NG-RAN 104 and the serving NAN 331-2 can be a gNB belonging to a second NG-RAN 104. In another example, the backup NAN 331-1 can be a DU belonging to a first CU and/or first NG-RAN 104 and the serving NAN 331-2 can be another DU belonging to a second CU and/or second NG-RAN 104. In another example, the backup NAN 331-1 and the serving NAN 331-2 may be WiFi APs connected to different gateway appliances, within different buildings, deployed at different geographic areas, and/or part of different WLANs (e.g., an enterprise network vs. a public network, or the like).

In some implementations, the backup NAN 331-1 implements a same RAT (or sub-RAT) as the serving NAN 331. For example, both the backup NAN 331-1 and the serving NAN 331-2 can operate according to 3GPP NR/5G, 3GPP LTE, WiMAX, WiFi, and so forth.

In some implementations, the backup NAN 331-1 implements a different RAT (or sub-RAT) than the serving NAN 331-2. In one example, the backup NAN 331-1 can be a gNB belonging to a NG-RAN 104 and the serving NAN 331-2 can be an eNB belonging to a EUTRAN 104. In another example, the backup NAN 331-1 can operate a cellular RAT (e.g., 3GPP LTE, 3GPP 5G/NR, WiMAX, etc.) and the serving NAN 331-2 can operate a WLAN RAT (e.g., WiFi, etc.) or a personal area network (PAN) RAT (e.g., Bluetooth, ZigBee, or any other PAN RAT such as those discussed herein). In another example, the backup NAN 331-1 can be a gNB or a DU belonging to a CU and/or NG-RAN 104 operating in a first frequency band or frequency spectrum, and the serving NAN 331-2 can be another gNB or another DU belonging to another CU and/or NG-RAN 104 operating in a second frequency band or frequency spectrum. In another example, the backup NAN 331-1 and the serving NAN 331-2 may be WiFi APs operating in different frequency bands or frequency spectrums, or operating as part of different network service providers.

In some implementations, there can be multiple backup NANs 331-1. For example, the BackupNAN-Config can specify a primary backup NAN 331-1 and one or more secondary backup NANs 331-1. Additionally or alternatively, the BackupNAN-Config can specify individual backup NANs 331-1 according to a determined rank or priority. The ranks/priority levels can be based on the collected performance metrics/measurements and/or some predefined or configured policies (e.g., indicating preferred networks, RATs, and/or other criteria/parameters/rules).

The backup NAN(s) 331-1 can be used to provide various reliability enhancement support. As examples, a backup NAN 331-1 can serve as a target NAN 331 for fast HO and/or serve as a secondary anchor NAN 331 for dual connectivity (DC).

When serving as a target NAN 331 for fast HO, the X message includes various HO parameters of the backup NAN 331-1 so that the serving NAN 331-2 and the UE 701 can perform various HO procedures/tasks when one or more trigger conditions occur. This allows the serving NAN 331-2 and the UE 701 to perform the HO faster than existing HO techniques because the serving NAN 331-2 and the UE 701 do not have to perform exchange HO-related signaling as the HO configuration/parameters are already stored at the serving NAN 331-2 and the UE 701. In this way, the UE 701 can quickly re-establish a connection to the backup NAN 331-1 based on the configurations sent in BackupNAN-Config-OTA message (307b) (e.g., quickly synchronize to the backup NAN 331-1 using the synchronization preamble information and complete the RACH procedure using prioritized RACH channel). For a UE 701 supporting dual-protocol HO, zero-interruption HO can be achieved by maintaining two control channels, one with current serving NAN 331-2 and the other with the target BS. With backup NAN 331-1 configuration, the UE 701 can connect to target NAN 331 faster and reduce the time required to maintain dual connection, thus saving power. Additionally or alternatively, the INSM 150 can configure proactive data forwarding (e.g., the CN 142 forwards additional copy of downlink traffic flow to backup NAN 331-1 so that, when HO occurs, data is readily available at target NAN 331 to be sent to UE 701).

When serving as a secondary anchor NAN 331 for DC, data traffic can be sent over either the serving cell or over the secondary cell(s) or split over multiple paths. Reliability can be improved by selecting the most reliable path for data transmission or sending duplicated copy of packets over multiple paths. Network coding can be further applied to packets sent over multiple paths to provide extra reliability gain.

Besides backup NAN 331-1, the INSM 150 can also configure other types of HO enhancements. For example, based on slice priority and SLA, the INSM 150 can carefully choose a target NAN 331 that can best support the SLA, with the lowest chance of connection failure, or with the lowest expected connection interruption time. Additionally or alternatively, the NAN 331 can configure different random access channel (RACH) priorities for different slices to reduce connection reestablishment time for high priority slices. The prioritized RACH access information can be sent in broadcasted system information from the target NAN 331 or in HO command message from original serving NAN 331-2.

Additionally or alternatively, the INSM 150 can configure other reliability enhancement actions for traffic flows belong to the (ultra-)resilient network slice. In one example, the INSM 150 can configure a traffic flow to be sent with a lower target packet error rate (PER) (e.g., PER≤$10^{-5}$) when selecting modulation-and-coding scheme for transmission. In another example, the INSM 150 can configure a traffic flow to be sent with packet duplication via carrier aggregation. Additionally or alternatively, the INSM 150 can reserve dedicated network elements/functions or radio resources for traffic flows belong to an (ultra-)resilient slice to ensure isolation from other traffic to minimize the risk of service interruption due to congestion or queueing.

Since wireless spectrum resource is scarce, careful planning is used to achieve the isolation required for realizing network slicing while maintaining efficient radio utilization. In various embodiments, intelligent radio reservation/prioritization working together with slice-aware MAC scheduler is used to achieve efficient radio isolation for slicing. Aspects described in U.S. Provisional App. No. 63/219,631 filed on 8 Jul. 2021 ("['631]"), which is hereby incorporated by reference in its entirety, can be adjusted to include reliability metrics in optimization.

1.2. Analysis and Planning for Resilient Network Slicing

Based on the collected performance metrics/measurements, different algorithms and/or mechanisms can be designed to determine how to configure actions described in section 1.1. In embodiments, these algorithms and/or mechanisms include resource allocation and slice-aware scheduling and/or a reinforcement learning (RL) framework as discussed infra.

1.2.1. Resource Allocation and Slice-Aware Scheduling for Slices with Reliability Requirements The algorithms described in ['936] and ['631] can be combined for resource allocation for slices requiring high reliability and perform slice-aware scheduling to ensure traffic for high priority slices are sent earlier to minimize latency violation. Algorithms described in ['936] can be used to compute a network coding rate requirement and how packets should be distributed over multiple paths. The network coding rate is the ratio of incoming packets to network coded packets for each network coding group. Based on the traffic distribution rules generated from delay-optimal reliability traffic distribution optimizer (RTDO) or resource-optimal RTDO as shown by FIG. 4, the INSM 150 can estimate the required resource to be reserved to serve traffic for high reliability flows.

Figure 4:
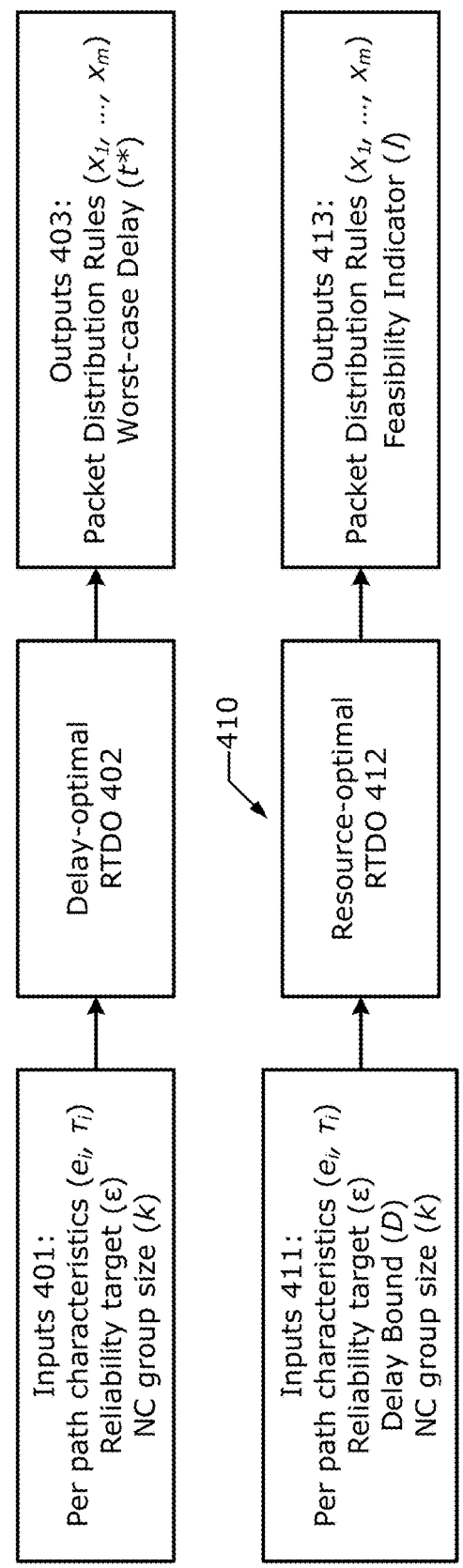
FIG. 4 depicts example reliability traffic distribution optimizers according to various embodiments.

FIG. 4 depicts an example delay-optimal traffic distribution strategy framework 400 according to various embodiments. The framework 400 includes the delay-optimal RTDO 402 that obtains or otherwise accesses inputs 401, processes the inputs 401, and produces outputs 403. The INSM 150 may include or operate the delay-optimal RTDO 402. The inputs 401 include per path characteristics ($e_i, \tau_i$), reliability target $\epsilon$ (e.g., where failure rate $F(x) \leq \epsilon$), and NC group size k. The outputs 403 include packet distribution rule(s) ($x_1, \ldots, x_m$) and a worst-case delay t*. The packet distribution rule(s) may also be referred to as traffic distribution strategies or the like.

The per path characteristics include an erasure probability $e_i$ for transmitting the reliability data flow over the $i^{th}$ path, and delay characteristic(s) $\tau_i$ where $\tau_1(x)$ is a delay characteristic function that calculates the expected time required for sending x packets of the reliability flow over path i. The delay characteristic function $\tau_1(x)$ can be derived through prior knowledge regarding RAT configurations as well as RAN measurements such as signal strength, data rate, per packet delay statistics, and/or any other measurement(s) such as those discussed herein. Also, the delay characteristic function $\tau_i(x)$ can reflect the impact from resource sharing with other traffic flows. The impact from resource sharing with other traffic flows may be based on, for example, potential queueing from other flows with the same or higher QoS priority, resource reservation level for other traffic flows, maximum radio resource(s) that can be allocated for reliability traffic, and/or the like. This disclosure focuses on admission control mechanisms for single reliability flow. When performing admission control for multiple reliability flows, one potential approach is to adjust the delay profile (characteristic) function $\tau_i(x)$ according to a multi-flow resource sharing factor and then adopt mechanisms described herein for admission control.

The worst-case latency t* is a maximum amount of latency or delay (or a minumum latency or delay bound) for delivering packets of a reliability flow over one or multiple paths to a destination that meets the reliability target E (e.g., a probability more than 1–$\epsilon$ that the latency for successfully receiving packets is below the worst-case latency t*). In this implementation, the delay-optimal RTDO 402 optimizes the various network coding parameters (e.g., inputs 401) and a traffic distribution strategy (e.g., the number of encoded packets $x_1$ to $x_m$ to be sent over each of paths 1 to m) to minimize the worst-case latency t* for reliability target $\epsilon$. In other words, the RTDO 402 determines a combination of network paths 830, and the number of packets to be sent over each of the network paths 830 in the combination, that has a most optimal (e.g., minimum) worst-case latency t* in comparison to various other combinations of the network paths 830 (and combinations of different numbers of encoded packets to be sent over the network paths 830).

The delay-optimal RTDO 402 may determine the worst-case latency t* using any suitable optimization techniques such as those discussed in Neely, "Opportunistic Scheduling with Worst Case Delay Guarantees in Single and Multi-Hop Networks", 2011 *Proceedings IEEE INFOCOM*, pp. 1728-1736 (10 Apr. 2011), Fan et al., "Cross-Layer Control with Worst Case Delay Guarantees in Multihop Wireless Networks", J. of Electrical and Computer Engineering, vol. 2016, Article ID 5762851, Hindawi Publishing Corp. (10 Oct. 2016), the contents of each of which are hereby incorporated by reference in their entireties.

For a traffic flow with given reliability target $\epsilon$, different burst size results in different packet distribution rules $(x_1, \ldots, x_m)$ and worst-case latency t*. In this example, the burst size is equal to the NC group size k. A mapping function between burst size and the corresponding worst-case delay (t*) can be constructed for each reliability data flow: t*(k; $\epsilon$, e, $\tau$). This mapping function can be used to determine the criteria for admission control. The maximum supportable burst size function within a delay bound d can be defined as shown by equation (1-1).

$$k_{max}(d; \varepsilon, e, \tau) = \max_{t^*(k;\varepsilon,e,\tau) \leq d} k \qquad (1\text{-}1)$$

In equation (1-1), $k_{max}$ is the maximum supportable burst size function, d is the delay bound, $\varepsilon$ is the reliability target, e is a collection of erasure probabilities of each path 830, and $\tau$ is a collection of delay characteristics of each path 830.

Different admission control strategies can be used for different types of traffic arrival patterns. In a first example admission control strategy, the REE 842 and/or INSM 150 can support bursty-arrival reliability traffic with fixed burst size and a minimum inter-burst interval. For this admission control strategy, the maximum supportable burst size is $k_{max}(D; \varepsilon, e, \tau)$ and the inter-burst interval for burst of size k should be no smaller than t*(k; $\varepsilon$, e, $\tau$). In this example, D is the delay bound for each burst of the reliability flow.

If the REE 842 and/or INSM 150 supports automatic burst detection enhancement, MA-TM 846 and/or INSM 150 may provide the complete admissible (burst size, periodicity) pairs: (k, t* (k; $\varepsilon$, e, $\tau$)), k=1~$k_{max}$(D), to the app layer through a suitable API (e.g., a new or existing MEC API and/or the like). The app (e.g., REE 842, MA-TM 846, and/or INSM 150) generates a reliability burst of size smaller than $k_{max}$(D). The admissible (burst size, periodicity) pairs provides traffic pacing constraint for reliability flow traffic arrival: a new burst will only be generated after an interval of t*(k; $\varepsilon$, e, $\tau$) succeeding the first packet of the last data burst of size k.

Additionally or alternatively, the delay-optimal RTDO 402 can produce another output 403 indicating an interleaving factor $F_{interleave}$(k; $\varepsilon$, e, $\tau$). When independence between transmission opportunities cannot be guaranteed, one traffic distribution strategy is to interleave other burst(s) or non-reliability packets to ensure all network coded packets belonged to the same burst are individually sent with independent erasure probability. For this type of implementation, the REE 842 and/or INSM 150 can at most admit $F_{interleave}$(k; $\varepsilon$, e, $\tau$) number of bursts of size k within an interval of t*(k; $\varepsilon$, e, $\tau$).

In a second example admission control strategy, the REE 842 and/or INSM 150 can support periodic-arrival reliability flow (e.g., deterministic traffic flows in factory automation). In this admission control strategy, the REE 842 and/or INSM 150 determines whether to admit a periodic-arrival reliability flow based on its arrival period, $T_s$, and burst size, k. If the arrival period $T_s$ is longer than the delay bound D, the maximum admissible burst size is $k_{max}$(D). If the arrival period $T_s$ is shorter than the delay bound D, the maximum admissible burst size becomes $k_{max}(T_s)$. In these examples, the delay bound D is the delay bound for each burst of the reliability flow.

Additionally or alternatively, the MA-TM 846 and/or INSM 150 may provide the complete admissible (burst size, periodicity) pairs: (k, t*(k; $\varepsilon$, e, $\tau$)), k=1~$k_{max}$(D), to the app layer through a suitable API (e.g., a new or existing MEC API and/or other signaling/messaging). The app (e.g., REE 842, MA-TM 846, and/or INSM 150) may then determine the burst size and arrival periodicity such that $T_s \geq$ t*(k; $\varepsilon$, e, $\tau$). For example, the app (e.g., REE 842, MA-TM 846, and/or INSM 150) may choose the configuration achieving the maximum supportable data rate according to equation (1-2).

$$R_{max} = \max_{k=1 \sim k_{max}(D)} \frac{k \cdot PktSize}{t^*(k; \varepsilon, e, \tau)} \qquad (1\text{-}2)$$

In equation (1-2), PktSize denotes the packet size in bits, by selecting $$k = \arg\max_{k'=1 \sim k_{max}(D)} \frac{k' \cdot PktSize}{t^*(k'; \varepsilon, e, \tau)} \text{ and } T_s = t^*(k; \varepsilon, e, \tau).$$

In a third example admission control strategy, the REE 842/MA-TM 846 and/or INSM 150 may adopt a more conservative admission control strategy that can be used for any type of arrival pattern. For example, the REE 842/MA-TM 846 and/or INSM 150 can set the maximum supportable incoming data rate according to equation (1-3).

$$\frac{k_{max}\left(\frac{D}{2}\right) \cdot PktSize}{\frac{D}{2}} \qquad (1\text{-}3)$$

Additionally or alternatively, the REE 842/MA-TM 846 and/or INSM 150 can set the maximum burst size for leaky-bucket or token-bucket traffic pacing control to be $k_1$, where $$0 < k_1 < k_{max}\left(\frac{D}{2}\right),$$

and set the leaky-bucket or token-bucket rate according to equation (1-4).

$$\frac{\left(k_{max}\left(\frac{D}{2}\right) - k_1\right) \cdot PktSize}{\frac{D}{2}} \quad (1\text{-}4)$$

In both equations (1-3) and (1-4), D is the delay bound for each packet of the reliability flow.

FIG. 4 also depicts an example resource-optimal traffic distribution strategy framework 410. The framework 410 includes a resource-optimal RTDO 412 that obtains or otherwise accesses inputs 411, processes the inputs 411, and produces outputs 413. The INSM 150 may include or operate the resource-optimal RTDO 412. The inputs 411 includes per path characteristics ($e_i$, $\tau_i$), reliability target $\epsilon$ (e.g., where a failure rate $F(x) < \epsilon$), a delay bound D, and NC group size (k). The outputs 413 include packet distribution rule(s) ($x_1, \ldots, x_m$) and a feasibility indicator (l). The packet distribution rule(s) may also be referred to as traffic distribution strategies or the like.

For a given delay bound D, the REE 842 and/or INSM 150 may adopt a resource-optimal strategy while encoding and distributing a reliability traffic flow. Instead of searching for the delay optimal distribution (as is the case with the RTDO 402), the resource-optimal RTDO 412 solves for a most resource efficient traffic distribution strategy for distributing the encoded packets n among the set of paths 830. Here, the most resource efficient traffic distribution strategy may include, for example, optimizing traffic distribution for a minimal amount spectrum resource usage that can meet both the reliability target $\epsilon$ and delay bound D constraints for a given set up of per path characteristics and NC group size. For example, by prioritizing a lower erasure rate link, fewer redundancy is required for reliability guarantee and more spectrum resources become available for other traffic flows. Example implementations of the resource-optimal RTDO 412 can include any suitable search space search algorithm such as those discussed herein.

In various implementations, the resource-optimal RTDO 412 optimizes the various reliability and latency parameters (e.g., inputs 411) to determine the feasibility l and a traffic distribution strategy (e.g., the number of encoded packets $x_1$ to $x_m$ to be sent over each of paths 1 to m) that has a most optimal resource usage among various other candidate traffic distribution strategies. In other words, the RTDO 412 determines a combination of network paths 830, and the number of packets to be sent over each of the network paths 830 in the combination of network paths 830, that has a most optimal (e.g., minimum) resource usage in comparison to various other combinations of the network paths 830 (and combinations of different numbers of encoded packets to be sent over the network paths 830).

If there is a feasible solution that satisfies the reliability and delay target, the resource-optimal RTDO 412 outputs a feasibility indicator l with a value of 'True'. If there is no feasible solution that satisfies the reliability and delay target, the resource-optimal RTDO 412 outputs a feasibility indicator l with a value of 'False'. Additionally or alternatively, the feasibility indicator l may indicate or include a value indicative of the feasibility of the solution to satisfy the reliability and delay target (e.g., a value from 0 to 1 or 0% to 100%). The outputs 413 from the resource-optimal RTDO 412 can be used by the MA-TM 846 to perform admission control and network slicing resource reservation for reliability flows.

When establishing a reliability traffic flow, attributes of the reliability flow, including the reliability target $\epsilon$, the delay bound D, burst size k, and lower bound of inter-burst interval $T_s$, are provided to the REE 842/MA-TM 846. The REE 842/MA-TM 846 utilizes the resource-optimal RTDO 412 to check the feasibility of the reliability flow. If there is no feasible packet distribution for the reliability target E and/or latency target (e.g., l='False', or l is less than a predetermined or configured feasibility threshold), the establishment of the reliability flow will be rejected. Additionally or alternatively, if the inter-burst interval $T_s$ is smaller than the delay bound D, an additional radio resource availability check may be performed, including one or both of the following approaches. In a first approach, the delay bound D input 412 to the resource-optimal RTDO 412 is changed to the lower bound of inter-burst interval $T_s$ and the REE 842/MA-TM 846 admits the reliability flow if there exists a feasible packet distribution (e.g., l='True, or l is greater than or equal to a predetermined or configured feasibility threshold). In a second approach, for each path i (e.g., each path 830), the resource-optimal RTDO 412 checks if the maximum number of encoded packets that can be sent over path i with a duration equal to $T_s$ is larger than the output of packet distribution rule $x_i$; the reliability flow is admitted if all paths i (e.g., each path 830) pass this test.

In some implementations, there may be a predefined or configured upper limit or threshold for the amount of resources that can be allocated to a reliability flow for a path i (e.g., path i can at most allocate y% of resources for a reliability flow, where y% is the realiability flow resource allocation limit/threshold). If there is a realiability flow resource allocation limit/threshold for one or more paths 830, the admission control function of the REE 842/MA-TM 846/INSM 150 performs an additional check on whether delivering $x_i$ packets over path i exceeds the realiability flow resource allocation limit/threshold (e.g., utilizes more than y% of radio resources) during a period that is a lower one of the lower bound of the inter-burst interval $T_s$ and the delay bound D (e.g., $\min(T_s, D)$). If the admission control function determines that delivering the $x_i$ packets over the path i exceeds the threshold/limit, the admission control function does not admit the traffic to flow over path i.

The output 413 of packet distribution rules $\{x_i\}$, can also be used to indicate the network resources that should be reserved for transmission of the reliability flow. In one example implementation, a static resource slicing strategy can include: for every $T_s$ interval, the network slicing resource management function of the REE 842/MA-TM 846/INSM 150 reserves at least enough resources to support transmission of $x_i$ packets of the reliability flow over path i. Additionally or alternatively, the output of packet distribution rules $\{x_i\}$ can be used to control traffic pacing of other flows to ensure that there are enough resources to support transmission of $x_i$ packets of the reliability flow over path i.

According to various embodiments, the packet distribution rule(s) and traffic load estimate(s) (e.g., outputs 403 and/or 413) can be used together to estimate the amount of radio resources to be reserved for each link. In one example, the average traffic load for the reliability data flow is $\lambda_i$ bps, then the INSM 150 can reserve a portion of radio resource for this reliability data flow on link i using equation (2-1):

$$RB_{pp} = \min\left(\frac{x_i \cdot \lambda_i}{k \cdot R_i} \cdot \alpha, 1\right) \quad (2\text{-}1)$$

In equation (2-1), $RB_{pp}$ is the prioritized portion of a resource block (RB) (or a set of RBs), min( ) is a minimization function that selects a minimum value between the provided arguments, $R_i$ is the data rate for link i and $\alpha$ is a predetermined overprovisioning factor for reliability traffic flow, k is a size of a set of packets or number of packets in the set of packets (e.g., NC group size, burst size, etc.). Here, the measured data rate can become smaller than $R_i$, which means that the our allocated RB(s) will not be sufficient to actually support the traffic load and the latency will increased. Depending on the confidence level of the rate estimate, a scaling factor $\alpha$ is set to provide some margin (or flexibility) into the RB allocation.

If the reliability traffic arrival pattern is periodic with data burst size B and periodicity T, then the reservation strategy can be, for every period T, to reserve a link l according to equation (2-2).

$$Rt_l = \min\left(\frac{x_i \cdot B}{k \cdot R_i} \cdot \alpha, T\right) \quad (2\text{-}2)$$

In equation (2-2), $Rt_l$ is the reservation time for a link l. Equation (2-2) may be used for time-domain based RATs, and equation (2-1) may be used for frequency-domain based RATs. The INSM 150 provides the radio resource reservation value from equation (2-1) or equation (2-2) to link i of a serving NAN, and the NAN will perform slice-aware scheduling, for example, as described in ['631] to ensure SLA.

1.2.2. Reinforcement Learning Based Slice Configuration

A reinforcement learning (RL) model can be developed to derive a proper resilient network slicing configuration policy by interacting with the RAN environment to explore the performance of different reliability enhancement settings.

Figure 5A:
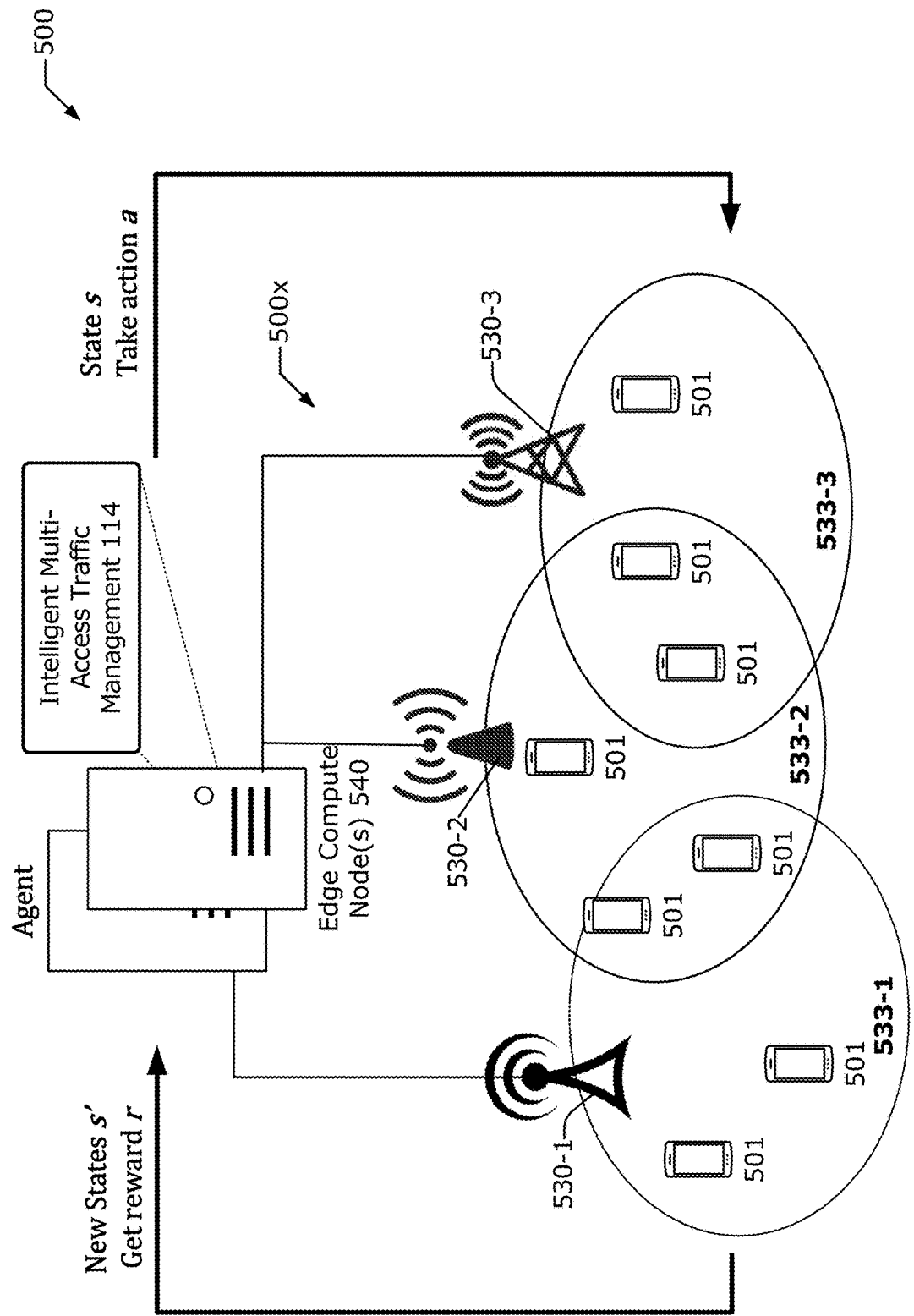
FIGS. 5a, 5b, and 5c show example model-free deep reinforcement learning framework for multi-access traffic management (DRL-MTM) architecture.
Figure 5B:
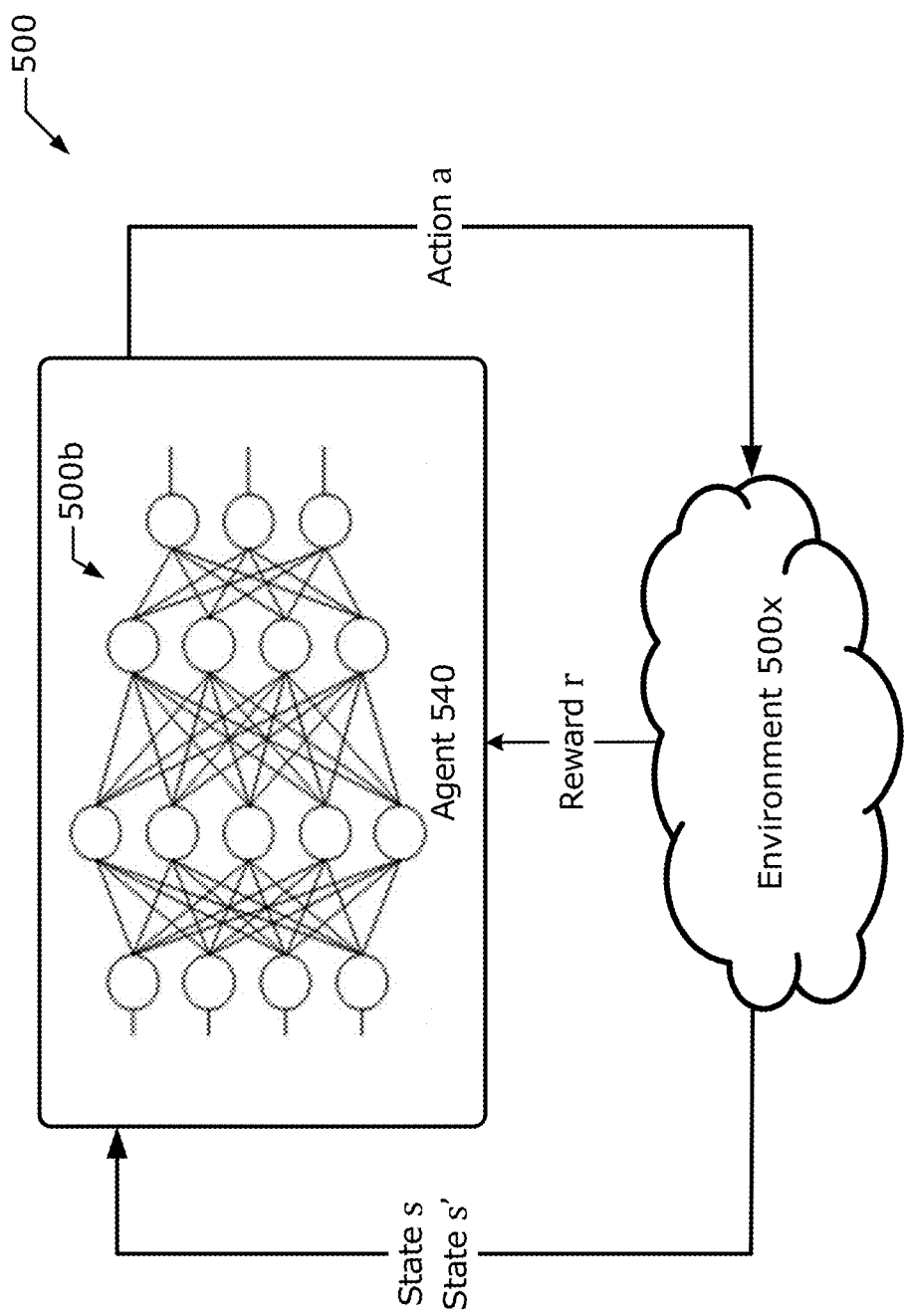
Figure 5C:
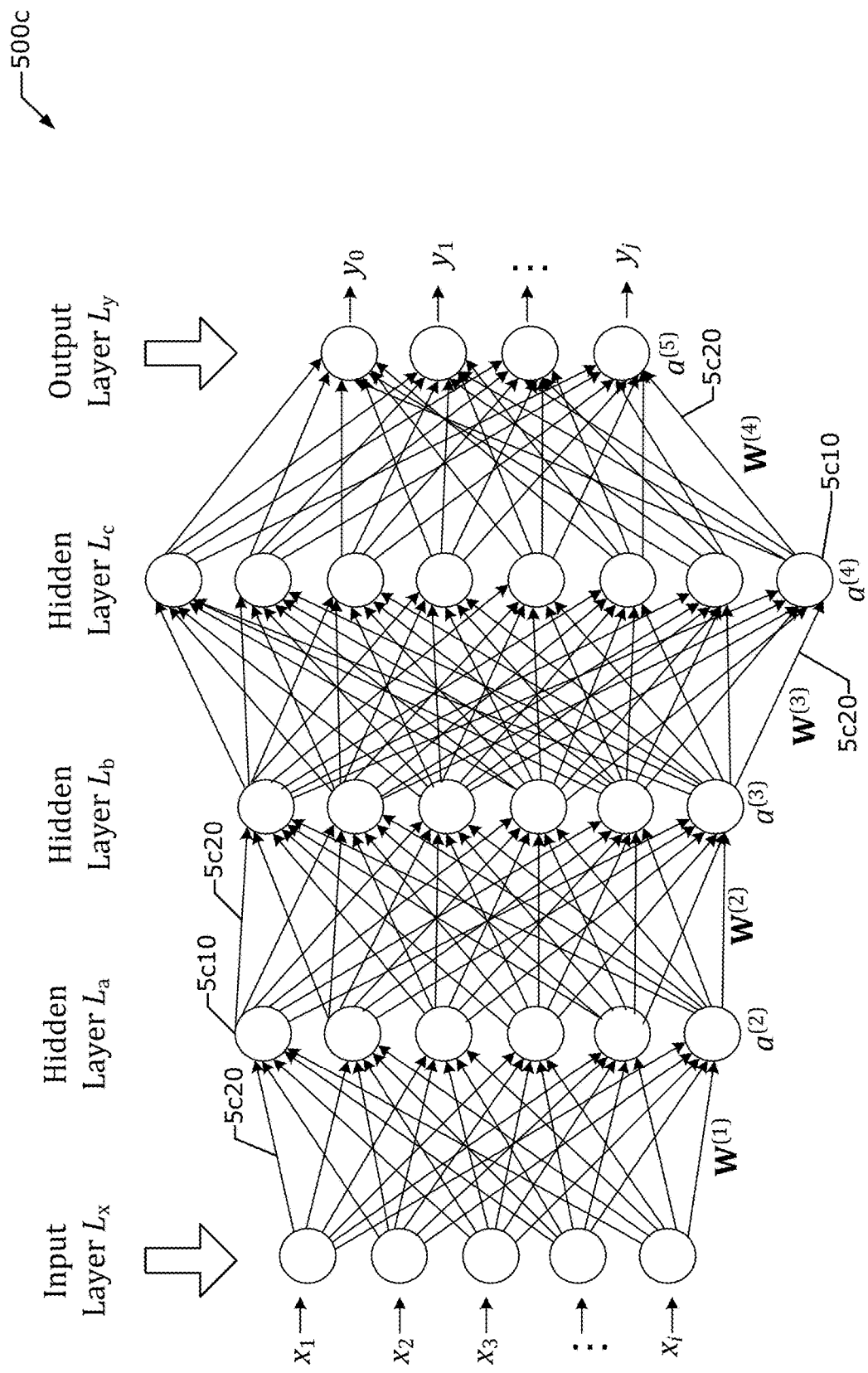

FIGS. 5a, 5b, and 5c depict a model-free deep reinforcement learning framework for multi-access traffic management (DRL-MTM) 500. In FIG. 5a, an edge compute node 540 acts, or operates, a DRL-MTM agent, which may be referred herein to as "agent 540". The edge compute node 540 operates an intelligent multi-access traffic management entity/element (iMTM) 514 for performing various multi-access management tasks/operations as discussed herein. The edge compute node 540 may correspond to the edge compute node 936 of FIG. 9.

The environment that the Agent 540 interacts with is a multi-access network 500x where there are UEs 501 with multiple radio interfaces are capable of connecting with multiple RANs including one or more RAN nodes 530-1, 530-2, and 530-3 (collectively referred to as "RAN nodes 530" or "RANs 530") having respective coverage areas 533-1, 533-2, and 533-3 (collectively referred to as "coverage areas 533" or "coverage area 533") one or more of which utilize different radio access technologies (RATs). The RAN nodes 530 in FIG. 5a may correspond to one or more of the NANs 931-933 of FIG. 9 discussed infra, and the UEs 501 may correspond to the UEs 921a and 921b and/or IoT devices 910 of FIG. 9.

For RL, within an episode, the agent 540 is faced with a state s of its environment 500x. Based on the current state s of the environment 500x, the agent 540 selects an action $\alpha$. After choosing an action $\alpha$, the agent 540 obtains a new (next) state s'. The next state s' depends on both the chosen action $\alpha$ and observations of the environment 500x based on the performed action $\alpha$. The action $\alpha$ is the agent's 540 methods, operations, tasks, etc., that allows the agent 540 to interact with, and change the environment 500x, and thus, transfer between states s. In FIG. 5a, the agent 540 obtains or identifies a state s based on observations from the UEs 501 and/or RANs/RAN nodes 530 about environment 500x, and determines the action $\alpha$ based on the state s. For example, the agent 540 will obtain observation data based on various measurements and/or contextual data, determines a state of the environment (state s) based on the obtained observation data, and then selects/determines operational parameters and/or traffic management strategies (action $\alpha$) based on the state s. After implementing and/or performing the action $\alpha$, the agent 540 will obtain new observation data (next state s') and then selects new operational parameters and/or traffic management strategies (e.g., a next action $\alpha'$). In some implementations, during an initial state, conventional predetermined rules can be used for traffic management and the RL model can be applied at the later stage (e.g., after an initial batch of observation data is collected).

In the example of FIG. 5a, the agent 540 is shown collecting observation data from one or more RANs/RAN nodes 530 and one or more UEs 501. Additionally or alternatively, core network functions may provide performance indicators to the agent 540, which may be used to determine the state of the environment 500x. In addition to collecting observations from UEs 501, RANs/RAN nodes 530, and core network functions, the agent 540 can collect observation data from other edge compute nodes 540 collocated with other RANs/RAN nodes 530 (not shown by FIG. 5a) to expand the coverage area for traffic management learning. Such collection may be useful for joint traffic management for a wider coverage area among multiple edge compute nodes 540, where each participating edge compute nodes 540 can again share their observation data for future episodes, epochs, or iterations of the RL learning/inference determination. In these implementations, the agent 540 and/or a representation network (see e.g., ['743]) can be trained with observation data obtained from the other UEs 501, RANs/RAN nodes 530, and core network functions covered/served by the other edge compute nodes 540. Additionally or alternatively, various edge compute nodes 540 can share feature outputs from their agents 540 and/or a representation networks (see e.g., ['743]), and a global agent or representation network can be trained to extract the impact from respective UEs 501, RANs/RAN nodes 530, etc., served by different edge compute nodes 540.

Additionally, the behavior (e.g., traffic management strategies, operations, etc.) of each element/entity in the environment 500x is part of the environment 500x that the agent 540 learns to navigate. To improve its performance, the agent 540 is provided with feedback on whether the agent 540 is achieving its objective (e.g., improving network conditions, conserving network and/or computing resources, etc.); this feedback is in the form of a reward r, which is a numerical score representative of meeting a goal. Every action $\alpha$ performed by the agent 540 yields a reward r. The agent 540 alters its behavior to increase the amount of reward it accumulates. A collection of one or more states, one or more actions, and one or more rewards may be referred to as experience data. A single data structure can be used to contain the experience data (e.g., an experience buffer or replay buffer such as those discussed infra).

In some implementations, the decision of which action α to choose is based on a policy π, which provides guidance on the optimal action(s) to take in a certain state with the goal of maximizing the total rewards. Each state is associated with a value function V(s), which predicts the expected amount of future reward(s) that can be received in a given state by acting on the corresponding policy. The "return" on an action is a future reward that the agent may obtain after performance of that action. The future reward or return can be calculated as a total sum of discounted rewards going forward. An optimal value function produces a maximum return, and an optimal policy achieves optimal value functions. In some implementations, the policy π is a mapping from a state s to one or more probabilities of selecting each possible action α given that state s. The reward r is a numerical value received by the agent 540 from the environment as a direct response to the agent's 540 actions α. The agent 540 attempts to maximize the overall reward it receives during an epoch or episode (an episode being all states that come in between an initial-state and a terminal-state), and so rewards r are the motivation the agent 540 needs in order to act in a desired manner. All actions yield rewards r, which can be roughly divided to three types, including positive rewards that emphasize a desired action, negative rewards that deemphasize a particular action, and zero rewards which indicates a neutral action.

Performance of the action α involves instructing the UEs 501 and/or RANs/RAN nodes 530 to perform various actions/tasks/operations. Based on those actions/tasks/operations, a new state s' based on observations is provided to the Agent 540 by the UEs 501 and/or RANs/RAN nodes 530. The observations may be various types of data, such as network-related data, signal measurements, etc., and/or various data such as those discussed herein.

Referring to FIG. 5b, the agent 540 (or the iMTM 514) is responsible for deciding the traffic steering/splitting strategy (e.g., Action α) for individual multi-access UEs 501 and/or RANs/RAN nodes 530 in multi-access environment 500x based on the observation collected from the environment 500x (state s). After performing the traffic steering/splitting strategy recommended by the agent 540 (e.g., Action α), a new observation (state s or state s') can be collected from the environment 500x and a reward r can be calculated according to an engineered reward function. In some implementations, the reward function may be an objective function. In some implementations, the reward function can be generated using a reward machine (RM) (an RM takes abstracted descriptions of the environment as input, and outputs one or more reward functions). The reward r can be provided by one or more network elements from enviroment 500x, generated by the edge compute node 540, and/or by some other element/entity.

A deep neural network (DNN) 500b may be used as the artificial brain of the agent 540 (or the iMTM 514) to handle very large and complicated observation spaces. The DNN 500b determines the traffic steering/splitting strategy (e.g., Action α) for individual multi-access UEs 501 and/or RANs/RAN nodes 530. The DRL-MTM 500 (or DNN 500b) learns to choose the best or most optimal traffic management strategies according to runtime statistics and without relying on any optimization models or pre-defined policies. Examples of the traffic management-related action space a may include traffic steering (e.g., select a RAT through which to route the traffic), traffic splitting (e.g., split the traffic across multiple RATs), and/or traffic sharing (e.g., sending traffic from multiple different flows over the same link/channel). In some implementations, the traffic sharing strategies may involve defining one radio link as a default link/connection to support multiple users and multiple different traffic flows. In some implementations, a reward function (e.g., for providing reward r) may be implemented as a utility function of the network QoS target (e.g., network throughput, packet delay, jitter, alpha-fairness, etc.). Here, the utility function produces a utility value representative the expected immediate reward r for taking an action α in some state s plus the sum of the long-term rewards over the rest of the agent's 540 lifetime, assuming the agent 540 acts using the a suitable (or optimal) policy π. In one implementation, the reward is calculated as a function of QoS measurements from all UEs 501, which may be expressed using the reward function (RF1), and an example per user utility function U(i, t) for a user i at time t can be expressed as utility function (UF1):

$$r_t = ?_i U(i, t) \quad \text{(RF1)}$$

$$U(i, t) = \frac{1}{\text{delay}(i, t)} \quad \text{(UF1)}$$

The long-term rewards may be calculated by summing all of the rewards produced over a period of time (or an entire episode). Additionally or alternatively, a performance threshold for a current ML model can be defined for cases when an observed state s indicates poor traffic performance. For example, if the observed performance is below a threshold, a previous ML model or a model-based traffic management algorithm that provided relatively good performance may be swapped in for the current ML model. The observation space, action space, and reward(s) in the DRL-MTM architecture 500a are discussed in ['743].

The RL frameworks developed for multi-access traffic management discussed herein and discussed in ['743] can be reused for providing and managing reliable network slices. In these embodiments, the INSM 150 acts as the agent 540 that determines the action α based on the state s. For reliable/resilient network slicing RL framework, the state s can include any of the performance metrics/measurements discussed herein (see e.g., section 1.1.1 supra). The action α for reliable/resilient network slicing includes the actions described in section 1.1.2 supra. Additionally or alternatively, the action α can also be a given set of predetermined reliability configurations and the action space is to choose one configuration from this predetermined set. The action α is the RAN configuration(s) discussed herein for a (R)AN/network slice based on the state s and reward r derived from the observations of the (R)AN performance metrics/measurements. In some implementations, determining the action α includes selecting a predetermined set of candidate configurations, and then the action space becomes a selection problem (or an optimization problem) to select the optimal configuration for a particular (R)AN slice and/or selecting optimal configurations for one or more (R)AN slices. For example, the set of configurations can include 10 different configuration options, and the agent 540 (INSM 150) determines the optimal configuration(s) based on the current observation of the network environment. Furthermore, the reward r for reliable/resilient network slicing includes network reliability metrics, such as a function of the data transmission reliability metrics and/or the service continuity reliability metrics described in section 1.1.1 supra.

FIG. 5c illustrates an example NN 500c, which may be suitable for use by one or more of the computing systems (or subsystems) of the various implementations discussed herein, implemented in part by a HW accelerator, and/or the like. NN 500c may correspond to the DNN 500b of FIG. 5b.

The NN 500c may be deep neural network (DNN) used as an artificial brain of a compute node or network of compute nodes to handle very large and complicated observation spaces. Additionally or alternatively, the NN 500c can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. NNs are usually used for supervised learning, but can be used for unsupervised learning and/or RL.

The NN 500c may encompass a variety of ML techniques where a collection of connected artificial neurons 5c10 that (loosely) model neurons in a biological brain that transmit signals to other neurons/nodes 5c10. The neurons 5c10 may also be referred to as nodes 5c10, processing elements (PEs) 5c10, or the like. The connections 5c20 (or edges 5c20) between the nodes 5c10 are (loosely) modeled on synapses of a biological brain and convey the signals between nodes 5c10. Note that not all neurons 5c10 and edges 5c20 are labeled in FIG. 5c for the sake of clarity.

Each neuron 5c10 has one or more inputs and produces an output, which can be sent to one or more other neurons 5c10 (the inputs and outputs may be referred to as "signals"). Inputs to the neurons 5c10 of the input layer $L_x$ can be feature values of a sample of external data (e.g., input variables $x_i$). The input variables $x_i$ can be set as a vector containing relevant data (e.g., observations, ML features, etc.). The inputs to hidden units 5c10 of the hidden layers $L_a$, $L_b$, and $L_c$ may be based on the outputs of other neurons 5c10. The outputs of the final output neurons 5c10 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 5c10 may have a threshold such that a signal is sent only if the aggregate signal crosses that threshold. A node 5c10 may include an activation function, which defines the output of that node 5c10 given an input or set of inputs. Additionally or alternatively, a node 5c10 may include a propagation function that computes the input to a neuron 5c10 from the outputs of its predecessor neurons 5c10 and their connections 5c20 as a weighted sum. A bias term can also be added to the result of the propagation function.

The NN 500c also includes connections 5c20, some of which provide the output of at least one neuron 5c10 as an input to at least another neuron 5c10. Each connection 5c20 may be assigned a weight that represents its relative importance. The weights may also be adjusted as learning proceeds. The weight increases or decreases the strength of the signal at a connection 5c20. The neurons 5c10 can be aggregated or grouped into one or more layers L where different layers L may perform different transformations on their inputs. In FIG. 5c, the NN 500c comprises an input layer $L_x$, one or more hidden layers $L_a$, $L_b$, and $L_c$, and an output layer $L_y$ (where a, b, c, x, and y may be numbers), where each layer L comprises one or more neurons 5c10. Signals travel from the first layer (e.g., the input layer $L_1$), to the last layer (e.g., the output layer $L_y$), possibly after traversing the hidden layers $L_a$, $L_b$, and $L_c$ multiple times. In FIG. 5c, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 5c, for simplicity of illustration, there are only three hidden layers $L_a$, $L_b$, and $L_c$ in the NN 500c, however, the NN 500c may include many more (or fewer) hidden layers $L_a$, $L_b$, and $L_c$ than are shown.

In addition, model-based resource allocation techniques described in section 1.2.1 supra can be used to determine guided exploration actions and to derive safety action specifications as described in ['743] and/or U.S. Provisional App. No. 63/165,011 filed on 23 Mar. 2021 ("['011]"), the contents of which are hereby incorporated by reference in its entirety.

Other information, such as UE moving trajectory, historical network traffic load, compute resource usage, power usage, etc., can also be incorporated into the AI/ML model to develop resilient RAN slicing configuration strategy. For example, when location information is available, RLF and HOF traces can be correlated with location information construct coverage map that can be used to predict potential outage. AI/ML tools can also be utilized to estimate network metrics crucial to reliability assurance, such as, blockage estimate, mobility estimate. These estimates can be the state inputs to the RL agent.

1.3. Network Slicing with Multiple Radio Access Technologies

The network slicing concept can be applied to multiple RATs and/or multi-access (MX) communication environments (see e.g., MX network 700 of FIG. 7). In this case, the INSM 150 can configure wireless infrastructure of different RATs to jointly utilizing multi-RATs to provide service for a network slice with SLA guarantee. In order to provision for a network slice, the INSM 150 collects 'slicing capability information' from infrastructure nodes of different RATs, as shown in by FIGS. 6a and 6b.

Figure 6A:
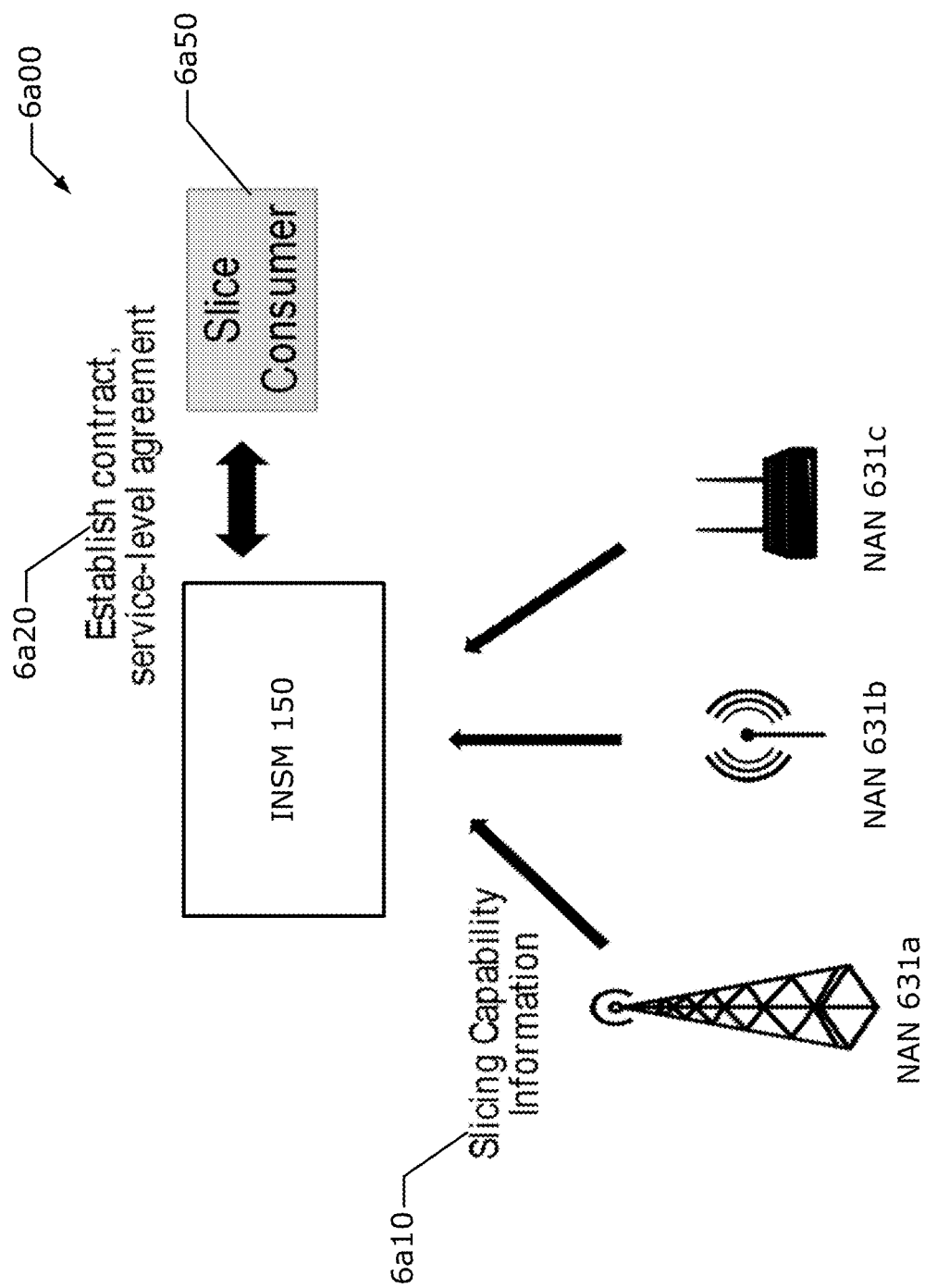
FIGS. 6a and 6b depict example network slicing in multi-access computing environments.

FIG. 6a shows an MX computing environment 6a)0 for network slicing prior to deployment of the network/(R)AN slice. In this example, the INSM 150 collections or otherwise obtains slicing capability information 6a10 from one or more NANs 631a, 631b, 631c. The NANs 631a, 631b, 631c may be part of the same or different RATs (or be associated with different sub-RATs). The INSM 150 uses the slicing capability information 6a10 to establish SLAs with a slice consumer 6a50.

The slicing capability information 6a10 can contain one or more of: maximum number of network slices that an infrastructure node (e.g., aNAN 631) can support; resource isolation levels; resource isolation methods; Quality of service (QoS) support (e.g., whether an infrastructure node support special QoS handling that can be used for SLA assurance); and/or other configuration options that can be used for SLA assurance (e.g., whether the infrastructure node support deterministic data transmission for time sensitive traffic).

The resource isolation level indicates an amount of resource isolation that can be provided to an individual network/(R)AN slice such as, complete isolation, partial isolation, isolation-priority levels associated with different resources, and the like. For example, the resource isolation level may indicate whether an infrastructure node (e.g., a NAN 631) can allocate dedicated resources that can only be used exclusively by an individual slice, whether the infrastructure node (e.g., a NAN 631) can reserve resources that a slice has higher priority to access, and/or whether the infrastructure node can restrict the maximum amount of resource that a network slice can use. The isolation methods include, for example, time-domain resource reservation, frequency-domain resource reservation, or cannot support any isolation at all.

During the initial slice provisioning phases, the INSM 150 can negotiate with the slice consumer 6a50 what kind of service level agreements (SLAs) 6a20 that the underlying RATs 631 can jointly support based on the slicing capability information collected from one or more access nodes 631a, 631b, 631c. With that information, the INSM 150 can establish the contract with the slice consumer 6a50. As mentioned previously, such a contract is already agreed-to. Since this example involves heterogeneous networking environment (e.g., MX communication environment), the slicing capability information 6a10 is collected and used to (re)establish the contract with the slice consumer 6a50.

Figure 6B:
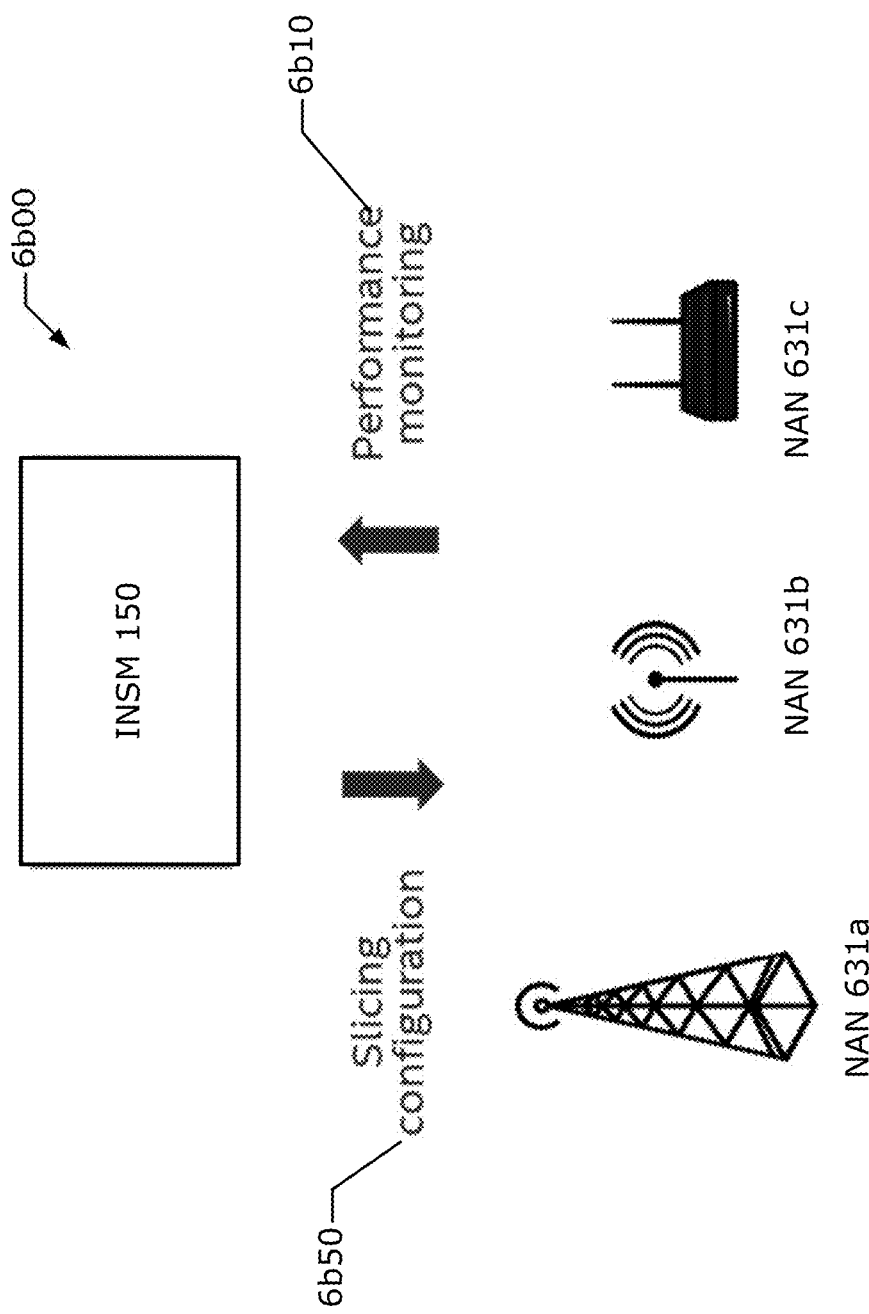

FIG. 6b depicts an MX environment 6b00 after a network/(R)AN slice is deployed/provisioned as a result of a negotiation between the INSM 150 and the slice consumer 6a50 in the MX computing environment 6a00. Here, the INSM 150 continues monitoring performance 6b10 (e.g., collecting performance measurements/metrics) from various RAN nodes 631 and updates slicing configurations 6b50 based on the real-time (or near-real-time) performance measurements 6b10. This monitoring and updating is performed according to the embodiments discussed herein.

In addition to the performance metrics/measurements discussed herein, the performance measurements/metrics 6a10, 6b10 can include additional metrics collected from NANs 631 employing WiFi RATs to provide reliable slicing for those RATs. Examples of these additional metrics include channel utilization level, average wait time for contention-based channel access, or busy/idle ratio of a WiFi band (e.g., indication of congestion/interference level of a WiFi network). When a WiFi network is too congested, the INSM 150 can instruct to steer reliable slice traffic to other RATs. These additional WiFi-related performance metrics may be useful for providing reliable slicing is because of WiFi's contention based access mechanisms, which can create some uncertainty about the interference and/or the interferer. To provide reliable service, indications of how busy a channel is can be important in order to determine, for example, if specific links/channels are too busy and/or whether to allocate more or less resources to specific slices. Additionally or alternatively, the slicing configurations 6b50 that can be used for WiFi and/or multi-RAT slicing include additional configuration parameters. Examples of these additional configuration parameters include configuring traffic belonging to a network/(R)AN slice to be transmitted over more than one RATs simultaneously; configuring traffic belonging to a network/(R)AN slice to only be transmitted over one predetermined or configured RAT (or sub-RAT); configuring traffic of a network/(R)AN slice to be sent over dedicated time slots or bandwidth configured for a particular RAT and/or NAN 631 (e.g., WiFi APs, etc.); and/or configuring traffic of a network/(R)AN slice to be sent with special contention window setting (e.g., configured with shorter contention window size to prioritize traffic belong to a slice).

1.4. Multi-Access Technology Aspects

FIG. 7 depicts an example multi-access (MX) network 700 with different convergence points. The MX network 700 includes compute nodes 701 (which may correspond to UEs 921, 911 of FIG. 9), which are computing systems/devices that are capable of obtaining services from the cloud system 744 (which may correspond to cloud 944 of FIG. 9), an edge computing service (which may correspond to edge network 935 of FIG. 9) including the edge compute node 736 (which may correspond to edge compute nodes 936 of FIG. 9), and/or a core network including core network (CN) server(s) 740 (which may correspond to CN 942 of FIG. 9, or individual NFs within the CN 942 of FIG. 9).

MX technology involves, for example, compute nodes 701 that have more than one radio interface that can access one or multiple (radio) access networks ((R)ANs) (e.g., including NANs 731, 732, 733) that may implement different (radio) access technologies ((R)ATs). The rise of ECTs inspires anew MX traffic convergence model (e.g., MX network 700) by placing a new MX convergence point at the edge, an intelligent traffic manager can distribute packets across multiple paths to achieve better quality-of-service (QoS).

The compute nodes 701 are capable of accessing such services using one or more radio access technologies (RATs), which may be the same or different than one another. The network access may include licensed access or unlicensed access. The licensed access is represented by a series of connections/links 703L (e.g., making up respective paths 703L) and the unlicensed access is represented by a series of connections/links 703U (e.g., making up respective paths 703U). The connections 703U/L may be used for either licensed or unlicensed access.

The edge compute node 736 is disposed at an edge of a corresponding access network (e.g., networks provided by NANs 731, 732, 733). The edge compute node 736 is co-located with network access node (NAN) 733 in FIG. 7 (which may be the same or similar as any of NANs 931, 932, 933 of FIG. 9). The edge compute node 736 provides computing resources and/or various services (e.g., computational task and/or workload offloading, cloud-computing capabilities, IT services, and other like resources and/or services as discussed herein) in relatively close proximity to network subscribers (e.g., compute nodes 701 also referred to as "UEs," "edge users," and/or the like). The virtualization infrastructure (VI) of edge compute node 736 provides virtualized environments and virtualized resources for the edge compute node 736, and the edge computing applications may run as VMs and/or application containers on top of the VI. Additionally or alternatively, the edge compute node 736 may be part of an edge cloud and/or an edge computing framework, such as those described herein.

When a compute node 701 has multiple radio interfaces (or multiple communication chips/circuitries), the compute node 701 can transmit and/or receive data through multiple paths. This means that there can be different multi-radio or multi-path convergence points 712, 714, 716, 718 to aggregate and/or distribute traffic between e2e communication link(s). According to various embodiments, when a compute node 701 has multiple radio interfaces, a new multi-radio convergence point 714 can take place at the edge of the network (e.g., at edge server 736 in FIG. 7) to offer multi-path traffic management for low latency communication as envisioned for 3GPP 5G/NR networks (see e.g., ['834], ['969]). With new intelligence enabled by edge-computing, multi-RAT deployments can be utilized more efficiently by cleverly distributing traffic to multiple network paths based on edge measurements.

Algorithms and techniques to optimally leverage such multi-link aggregation may boost both the peak rates as well as the area spectral efficiency in 3GPP NR/5G wireless networks. Smart UE to AP association strategies in multi-RAT HetNets has attracted significant interest from both academia and industry. Most of the work in this area, however, does not leverage UE multi-link aggregation capabilities, and do not account for dynamic distribution of traffic and resource allocation across multiple RATs.

There are multiple existing solutions to realize multi-radio convergence. As shown in FIG. 7, the convergence point 716 can be at the NAN 733 in FIG. 7, which may involve a WLAN access point (AP) or a small cell base station. The NAN 733 may operate according to LTE-WiFi Aggregation (LWA) (see e.g., Sirotkin, "LTE-WLAN Aggregation (LWA): Benefits and Deployment Considerations," Intel® White Paper, available at: http://www.intel.com/content/www/us/en/wireless-network/lte-wlan-aggregation-deployment-white-paper.html ("[Sirotkin]"), 3GPP TS 36.465 v15.0.0 (2018 Jun. 22), LTE-WLAN Radio Level Integration Using IPsec Tunnel (LWIP) (see e.g., 3GPP TS 36.361 v16.0.0 (2020 Jul. 24) ("[TS36361]")), and Multi-Radio Dual Connectivity (MR-DC) (see e.g., 3GPP TS 37.340 v 16.7.0 (2021 Sep. 27) ("[TS37340]"), at the TCP layer or application layer (see e.g., multi-path TCP (MPTCP) (see e.g., Ford et al, "TCP Extensions for Multipath Operation with Multiple Addresses", Internet Engineering Task Force (IETF) RFC 6824 (January 2013) and IETF Multipath TCP working group, available at: https://datatrackerietf.org/wg/mptcp/documents/ (collectively "[MPTCP]")) and/or Quick UDP (QUIC) (see e.g., Iyengar et al., "QUIC: A UDP-Based Multiplexed and Secure Transport", draft-ietf-quic-transport-27, Standards Track (21 Feb. 2020) ("[QUIC]"), and/or at arbitrary servers within the network via Generic MX (GMA) (see e.g., Zhu et al., "Generic Multi-Access (GMA) Convergence Encapsulation Protocols," IETF INTAREA/Network Working Group, version 12, draft-zhu-intarea-gma-12 (21 Oct. 2021) ("[GMA]"). 3GPP has also defined dual-connectivity solutions to support simultaneous connections to more than one cellular nodes such as LTE eNBs, NR gNBs, and the like (see e.g., [TS37340]).

Regarding strategies to distribute traffic across multiple radio paths, past solutions, such as those discussed in Singh et al., "Optimal Traffic Aggregation in Multi-RAT Heterogeneous Wireless Networks," 2016 *IEEE International Conference on Communications Workshops (ICC)*, Kuala Lumpur (2016) ("[Singh]"), focused on optimizing throughput performance for best-effort traffic only. The approach discussed in [Singh], focuses on multi-radio convergence at the RAN or access point (e.g., convergence point 716 in FIG. 7). Additionally, ['969] provides strategies to improve delay performance for delay-sensitive traffic. However, the solutions discussed in [Singh] and ['969] cannot provide reliability guarantee. Simple repetitive transmission of the same packet over multiple paths can improve reliability at the cost of inefficient radio resource usages. There is no prior work that provides guidelines for utilizing multi-path to achieve reliability target with efficient radio usage and minimum latency. Furthermore, network coding can be used to efficiently enhance reliability for end-to-end (e2e) network connectivity. However, the manner in which RAN information should be utilized for networking coding at the edge is not considered in such solutions.

The present disclosure adds reliability enhancements to the edge-based MX traffic manager discussed in ['969], which may include a reliability enhancement engine at edge MX/multipath traffic manager. The reliability enhancement engine identifies traffic flows requiring extra reliability support and performs admission control for flows demanding high reliability guarantees. Additionally or alternatively, the reliability enhancement engine calculates a coding rate (e.g., redundancy factor) and traffic distribution rules for flows identified for reliability enhancement, and then applies cross-access Network Coding (NC) on various traffic flows. Additionally or alternatively, the reliability enhancement engine handles MX acknowledgement (ACK) and traffic pacing (e.g., multiplexing with non-high-reliability traffic). The edge-based traffic management embodiments discussed herein provides extra reliability support while providing better worst-case delay guarantees and/or better resource utilization efficiency. The edge-based traffic management embodiments discussed herein enables more high reliability delay sensitive applications for ECTs. Additionally or alternatively, the reliability enhancement engine discussed herein may be implemented in or with the reinforcement learning (RL) traffic management framework discussed in U.S. application Ser. No. 17/484,743 filed on 24 Sep. 2021 ("['743]") and U.S. application Ser. No. 17/550,936 filed on 14 Dec. 2021 ("['936]"), the contents of each of which are hereby incorporated by reference in their entireties. The various traffic management techniques discussed herein can be used to realize edge/cloud RAN intelligence that can potentially offer unprecedented QoS improvements and enhancements. Specific implementations of the embodiments herein can be provided by various standards and/or specification such as 3GPP (including 3GPP SA6 EDGEAPP architecture), ETSI MEC, Open RAN (O-RAN) Alliance, OpenNESS, and/or the like. For example, message format and message exchange signaling between edge/cloud server and RAN nodes can be specified in such standards/specifications.

1.5. Multi-Access Traffic Manager (MA-TM) Aspects

Figure 8:
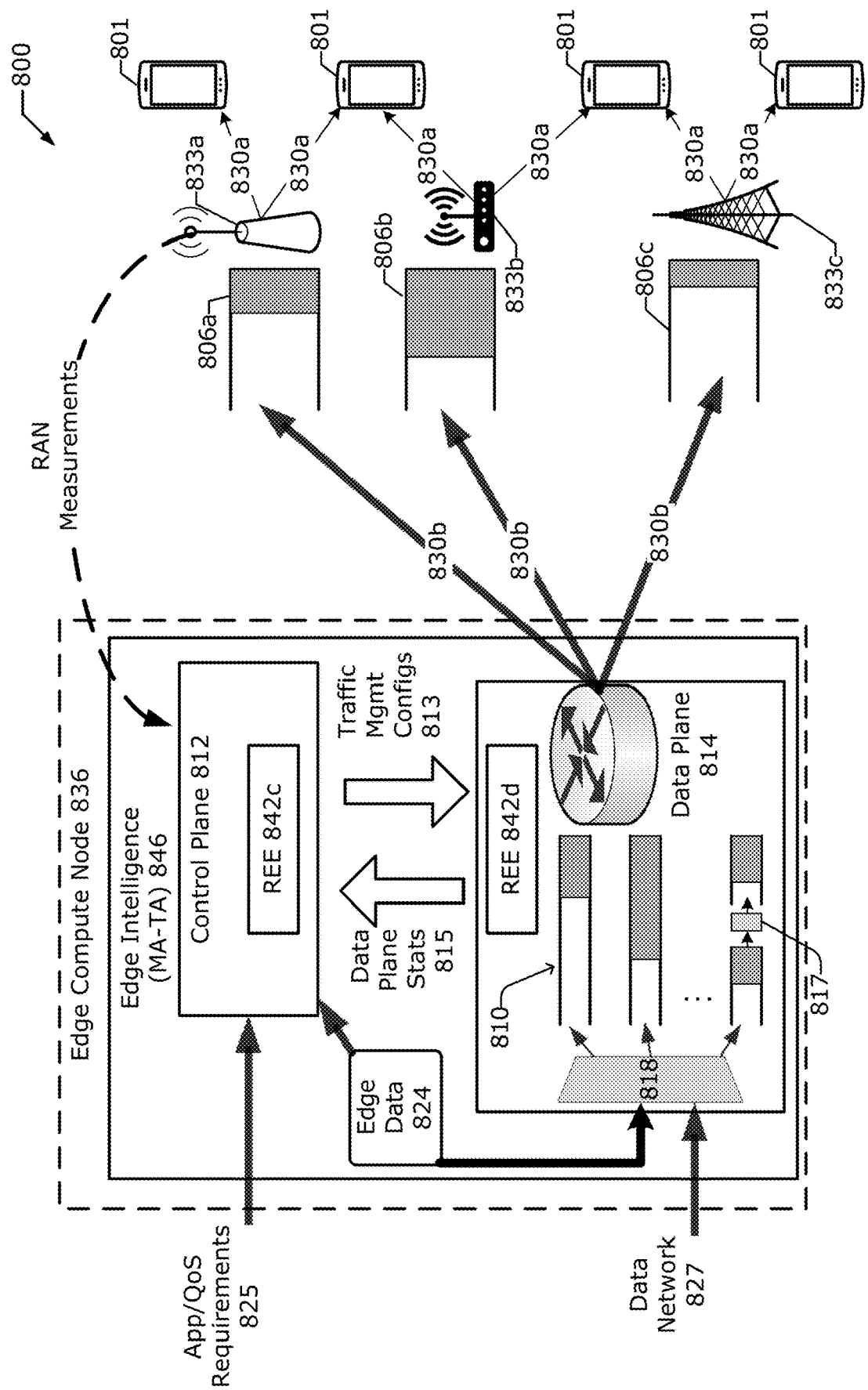
FIG. 8 depicts an example edge-based multi-access traffic management framework.

FIG. 8 depicts an example edge-based MX traffic management framework 800. In this example, compute nodes 801 with multiple radio interfaces can simultaneously establish more than one connection to the edge network (e.g., an edge network including edge node 836, edge cloud, and/or the like). For example, in a network including heterogeneous radio access technologies (RATs) (e.g., LTE, 5G/NR, WiFi, etc.) as last-hop connectivity, UEs 801 with multiple radio interfaces can simultaneously connect to wireless infrastructure 833*a-c* of different RATs such as LTE small-cell base stations (BS) 833*a*, macro-cell BS 5G gNB 833*c*, WLAN access points (AP) 833*b*, etc., as shown in FIG. 8. The UEs 801 may be the same or similar as the UEs 701 discussed previously, and/or UEs 911, 912 discussed infra, and the NANs 833*a-c* may be the same or similar as the NANs 931-933 discussed infra. The edge node 836 and individual UEs 801 can utilize convergence technology (e.g., GMA, etc.), at the data plane to distribute and aggregate traffic over multiple paths. Another example is that UE 801 can establish dual connectivity as specified in 3GPP and the edge intelligence 846 resides in the central unit (CU) (see e.g., [TS37340]).

Drastically increasing demand for wireless data and devices has led to an increasing requirement for both peak rates and area spectral efficiency. This, in turn, has led to an increasingly denser and heterogeneous deployment of wireless infrastructure, where the deployed networks are disparate in various features, such as access technology (RAT), coverage area per access network node, deployed frequency band and bandwidth, and backhaul capabilities. As a result, most of the UEs 801 in a dense wireless network are usually located in overlapping coverage areas of multiple access network nodes of differing RATs. UEs 801 with the ability to aggregate traffic from multiple radio links or RATs (e.g. 5G, LTE, WLAN, WiMAX, Bluetooth®, etc.) can leverage multi-link aggregation to boost their throughput and QoS. The rise of heterogeneous wireless network (HetNet) deployments with mixed topologies and different RATs along with UEs 801 with multiple radio interfaces being commonplace, have opened up opportunities to increase the network throughput and reliability by transmitting and aggregating traffic from multiple RATs.

ECTs can support applications with low latency requirements and/or high QoS requirements (e.g., AR/VR, cloud gaming, and the like) by placing the distributed computing and storage resources in proximity to data providers and consumers. An example edge network 800 is shown by FIG. 8 and may correspond to an edge cloud and/or the edge computing system configurations/frameworks discussed herein.

The framework 800 includes UEs 801, which are computing systems/devices within an edge computing network 800 that offload computational workloads/tasks to edge compute node 836 or otherwise obtain services from the edge computing network and/or a cloud system (see e.g., cloud 944 of FIG. 9). The edge network includes edge compute node 836 (or edge server 836), which is one or more computing systems or servers from which the compute nodes 801 consume services. The edge server 836 may be co-located with one or more NANs 833a, 833b, or 833c (collectively referred to as "NAN 833" or "NANs 833"), which may be the same or similar as any of NANs 730 discussed previously and/or NANs 931, 932, 933 of FIG. 9. Respective connections 830b (also referred to as "backhaul paths 830b") may connect or communicatively couple the edge compute node 836 with one or more NANs 833, and individual connections 830a (also referred to as "access paths 830a" or "fronthaul paths 830a") may connect or communicatively couple individual NANs 833 with one or more UEs 801. Some connections 830a-b may be used for either licensed or unlicensed access and may correspond to connections 703L and/or 703U discussed previously. For purposes of the present disclosure, a "network path 830" or "path 830" may refer to a route between a source node and a destination node (or components thereof), and may include a backhaul path 830b, an access path 830a, or a combination of one or more backhaul paths 830b and one or more access paths 830a. For downlink (DL) traffic the source node may be the edge node 836 and the destination node may be a UE 801, and for uplink (UL) traffic the source node may be a UE 801 and the destination node may be the edge node 836.

The edge compute node 836 is a physical computer system(s) that may include an edge platform and/or virtualization infrastructure, and provides compute, storage, and network resources to edge computing applications. The edge server 836 is disposed at an edge of a corresponding access network (e.g., networks provided by individual NANs 833), and provides computing resources and/or various services (e.g., computational task and/or workload offloading, cloud-computing capabilities, IT services, and other like resources and/or services as discussed herein) in relatively close proximity to network subscribers (e.g., compute nodes 801 also referred to as "UEs," "edge users," and/or the like). The virtualization infrastructure (VI) of the edge server 836 provides virtualized environments and virtualized resources for the edge hosts (e.g., edge server 836), and the edge computing applications may run as VMs and/or application containers on top of the VI.

When a compute node 801 has multiple radio interfaces (or multiple communication chips/circuitries), the compute node 801 can transmit and/or receive data through multiple paths 830. This means that there can be different multi-radio or multi-path convergence points to aggregate and/or distribute traffic between e2e communication link(s). According to various embodiments, when a compute node 801 has multiple radio interfaces, a new multi-radio convergence point can take place at the edge of the network to offer multi-path traffic management for low latency communication as envisioned for 3GPP 5G/NR networks (see e.g., ['834], ['969]). With new intelligence enabled by edge-computing, multi-RAT deployments can be utilized more efficiently by cleverly distributing traffic to multiple network paths 830 based on various metrics and/or measurements.

In some implementations, the edge compute node 836 and UEs 801 can utilize a suitable convergence technology (see e.g., [GMA]), at the data plane to distribute and aggregate traffic over multiple paths 830. Another example is that UEs 801 can establish dual connectivity as specified in 3GPP and the edge intelligence resides in a CU (see e.g., [TS37340]).

Computing power offered by edge compute node 836 can be leveraged to realize intelligent MX traffic management. An intelligent multi-access traffic manager (MA-TM) 846 located at the edge node 836 computes traffic distribution rules (e.g., traffic management configurations 813 in FIG. 8) at the control plane 812, which are provided to the data plane 814 and UEs 801 to inform the data plane 814 and the UEs 801 about how to route packets over the multiple paths 830. Additionally, the MA-TM 846 is the intelligence in charge of performing NC and traffic distribution over multiple paths 830.

The traffic distribution control plane 812 collects feedback from wireless infrastructure (e.g., RAN measurements from one or more NANs 833) and/or directly from users (e.g., UE measurements from one or more UEs 801), incorporates data flow/App/QoS requirements 825 provided by higher layer(s), and gathers telemetry statistics 815 from the data plane 814 to determine how data flows should be routed over the multi-paths 830 in order to meet heterogeneous QoS targets. Additionally or alternatively, the traffic distribution control plane 812 collects performance indicators from one or more network functions (NFs) in a core network (e.g., CN 942 or the like). Edge data 824 and data network data 827 are provided to the data plane 814, filtered by a packet filter 818, and sorted into one or more QoS (data flow) queues 810. An NC engine 817 may also be used to route data from the data flows (queues 810) over the multi-paths 830, and/or may provide various NC services such as those discussed herein.

The edge compute node 836 may correspond to edge compute nodes 936 of FIG. 9 within edge system/network 935 of FIG. 9. According to various embodiments, the MA-TM 846 is enhanced with additional reliability enhancement functionality of a reliability enhancement engine (REE) 842, which includes a control plane REE 842c and a data plane REE 842d. In various implementations, the MA-TM 846 and/or REE 842 can be part of an edge platform of the edge node 836 and/or may be implemented as an edge application (app) operated by the edge node 836. In some implementations, the MA-TM 846 is part of the edge platform and the REE 842 is implemented as an edge app. Additionally or alternatively, both the MA-TM 846 and the REE 842 are implemented as respective edge apps and/or edge services.

In a first example implementation, the edge system/network 800 is implemented using the MEC framework (see e.g., [MEC]). In these implementations, the edge node 836 is a MEC host/server, the MA-TM 846 and/or the REE 842 may be part of a MEC platform and/or may be implemented as a MEC app as discussed previously.

In a second example implementation, the MA-TM 846 and/or the REE 842 can be, or are operated by a Multi-Access Management Services (MAMS) server or a MAMS client (see e.g., Kanugovi et al., "Multi-Access Management Services (MAMS)", Internet Engineering Task Force (IETF), Request for Comments (RFC) 8743 (March 2020) ("[RFC8743]")). In these implementations, the edge node 836 and/or one or more cloud computing nodes/clusters may be the MAMS server. In MAMS implementations, the MA-TM 846 and/or the REE 842 can be implemented as the same or different Network Connection Managers (NCMs) for downstream/DL traffic or as Client Connection Managers (CCMs) for upstream/UL traffic. An NCM is a functional entity that handles MAMS control messages from clients 801, configures the distribution of data packets over available access and core network paths 830, and manages user-plane treatment (e.g., tunneling, encryption, etc.) of the traffic flows (see e.g., [RFC8743]). The CCM is the peer functional element in a client 801 that handles MAMS control-plane procedures, exchanges MAMS signaling messages with the NCM, and configures the network paths 830 at the client 801 for the transport of user data (e.g., network packets, etc.) (see e.g., [RFC8743]).

In a third example implementation, the MA-TM 846 and/or the REE 842 can be part of the O-RAN framework (see e.g., [O-RAN]). In these implementations, the MA-TM 846 and/or the REE 842 can be part of the RAN intelligence controller (RIC) such as the Non-Real Time (RT) RIC or a Near-RT RIC. Additionally or alternatively, in O-RAN implementations, the MA-TM 846 and/or the REE 842 may be implemented as the same or different xApps.

In a fourth example implementation, the MA-TM 846 and/or the REE 842 can be part of a central unit (CU)/distributed unit (DU)-split architecture of an NG-RAN architecture (see e.g., 3GPP TS 38.401 v16.7.0 (2021 Oct. 1) ("[TS38401]") and 3GPP TS 38.300 v16.7.0 (2021 Sep. 27) ("[TS38300]"). In these implementations, the MA-TM 846 and/or the REE 842 resides at the CU for downstream/DL traffic, and for upstream/UL traffic the REE 842 is implemented by a UE 801 or its NAN 833 (e.g., a DU) if NC is not implemented at the UE 801.

In an fifth example implementation, the MA-TM 846 can be part of a 3GPP edge computing architecture (see e.g., ['719], [TS23558], and [TS23501]). In these implementations, the edge node 836 is one or more edge servers, Edge Application Servers (EAS), Edge Enabler Servers (EES), and/or Edge Configuration Server (ECS) in an Edge Data Network (EDN), and the MA-TM 846 and/or the REE 842 may be implemented as a part of the EES or ECS, and/or as the same or different EASs.

Additionally or alternatively, emerging data-driven machine learning (ML) techniques can be used to develop advanced multi-access traffic distribution strategies such as those discussed in ['743].

1.6. Reliability Enhancement Engine (REE) Framework for MA-TM

In various embodiments, the REE 842/MA-TM 846 performs admission control and packet filtering for reliability traffic, calculates code rate and traffic distribution rules, applies NC to reliability flows, routes reliability traffic of the reliability flows according to traffic distribution rules/strategies, and handles multi-access/multipath acknowledgement (ACK) and traffic pacing for reliability traffic and other traffic. The admission control function decides if packets (or a burst of packets) should be permitted to be transmitted or encoded for transmission. The admission control function may utilize a model of the state of system/network resources, knowledge about incoming packets, one or more algorithms to make admission control decisions, and policies for the actions to take upon admission and upon rejection. As discussed in more detail infra, the reliability traffic distribution optimizer (RTDO) may provide this admission control functionality.

The control plane 812 of the REE 842/MA-TM 846 determines the configuration parameters/criteria for reliability enhancement, such as admission control criteria, NC scheme, coding rate, traffic distribution rules, traffic pacing, and/or other like reliability configuration parameters. In order to set up the configurations for reliability enhancement, the REE 842 can collect some or all of the following information for optimization purposes: RAN and/or WLAN measurements, RAN and/or WLAN capabilities indicated by RAN/WLAN configurations, application layer signaling, and/or data plane telemetry.

The RAN/WLAN measurements can be collected by NANs 833 and/or from UEs 801. The RAN/WLAN measurements may include, for example, radio channel/signaling measurements/indicators (e.g., RSRP, RSSI, RSRQ, RCPI, RSNI, ANPI, SNR, SINR, expected peak data rate, and/or any other signal measurements such as any of those discussed herein), packet drop rate, packet loss rate, backhaul delay measurements for individual paths 830b (e.g., the minimum delay of individual paths 830b, average delay of individual paths 830b, and/or can be estimated delay based on past delay measurements), and/or any other measurements/metrics such as any of those discussed herein.

RAN/WLAN configurations may include or indicate various capabilities of UEs 801 and/or NANs 833 such as, for example, transmitter (Tx) node capabilities (e.g., whether a Tx node (e.g., 5G gNB and/or other NAN 833) supports Ultra-Reliable-Low-Latency-Communication (URLLC) enhancements such as lower data rate Modulation-and-Coding-Scheme (MCS) and rate selection at $10^{-5}$ Packet-error-rate target; whether Tx node supports cross-RAT ACK handling as described p), and/or the like. Additionally or alternatively, the RAN/WLAN configurations may include access network QoS configurations (e.g., QoS profile as discussed in [TS38300], QoS info field and/or QoS traffic capability as discussed in [IEE80211], etc.). The QoS configurations may include or indicate various QoS capabilities and/or parameters such as, for example, a minimum QoS guarantee that an access network can provide for a reliability flow, such as minimum guaranteed bit rate configured for the flow, packet-error-rate target for rate selection, and/or other like QoS-related information. Additionally or alternatively, the RAN/WLAN configurations may include IEEE 802.11 configurations including information in a network configuration (e.g., MAC state generic convergence function (MSGCF) link capabilities, MSGCF link parameters, event capabilities, etc.), location configuration information (LCI) report, mesh configuration, configuration profile report, and/or the like. Additionally or alternatively, the RAN/WLAN configurations may include radio resource control (RRC) information from RRC configurations (see e.g., 3GPP TS 38.331 v16.6.0 (2021 Sep. 28) and/or 3GPP TS 36.331 v16.6.0 (2021 Sep. 29)). Other RAN/WLAN configurations may be included in other implementations.

The application layer signaling may include, for example, priority indicators for data flows, QoS requirements of data flows (e.g., reliability target, latency bound, minimum guarantee data rate, maximum burst size, etc.), and/or the like.

The data plane telemetry may include, for example, traffic volume estimate of reliability flows and non-reliability flows, flow path and latency measurements/metrics, packet drop metrics/reports (e.g., dropped packet mirroring and drop reason), traffic congestion metrics/reports (e.g., packet-level snapshots of congested queues/buffers, microburst detection, etc.), platform load/overload and/or application load/overload metrics/reports (see e.g., "Enhanced Utilization Telemetry for Polling Workloads with collected Data Plane Development Kit (DPDK)", Intel® Corp. User Guide, 0820/DN/PTI/PDF, 627392-001US (19 Aug. 2020), available at: https://builders.intel.com/docs/networkbuilders/enhanced-utilization-telemetry-for-polling-workloads-with-collectd-and-the-data-plane-development-kit-dpdk-user-guide.pdf, the contents of which is hereby incorporated by reference in its entirety), Inband Network Telemetry (INT) ingress and/or egress data (see e.g., "In-band Network Telemetry (INT) Dataplane Specification", The P4.org, Applications Working Group, version 2.1 (11 Nov. 2020) and/or "In-band Network Telemetry Detects Network Performance Issues", Intel® White Paper, 1220/RE/WPINT/ PDF, 345568-001 US (2020), available at: https://builders.intel.com/docs/networkbuilders/in-band-network-telemetry-detects-network-performance-issues.pdf (collectively referred to as "[INT]"), the contents of each of which are hereby incorporated by reference in their entireties), and/or the like.

In some implementations, the aforementioned measurements/metrics/signaling can be obtained via suitable APIs. For example, in MEC-based implementations, the aforementioned information may be accessed via the Radio Network Information APIs, Bandwidth Management APIs, and/or any other suitable MEC APIs, such as those mentioned herein (see e.g., [MEC]). In these implementations, the MA-TM 846 can be part of MEC platform or may be implemented as a MEC app. Additionally or alternatively, DPDK mechanisms and/or INT mechanisms (see e.g., [INT]) can be used to collect dataplane telemetry metrics/data. Additionally or alternatively, new signaling can be developed to collect the aforementioned measurements. In these implementations, the new signaling/messages can be proprietary or standardized via ETSI MEC (see e.g., [MEC]), O-RAN (see e.g., [O-RAN]), OpenNESS, 3GPP, and/or the like. In these implementations, new API messages can be defined to pass the new signaling to a traffic management edge app, such as an MA-TM 846 edge app.

The REE 842 can combine some or all the aforementioned signaling (e.g., metrics, measurements, etc.) to derive an estimate of data rate, link erasure probability, and delay profile for delivering the reliability flow over individual path 830. Here, the "delay profile" may refer to an amount of time it takes for a source or transmitter (Tx) to send x number of packets through a path 830 to a destination or receiver (Rx), including possible initial delay. Additionally or alternatively, the delay profile may be include or indicate delay characteristics of different paths 830 at or between radio access convergence points (e.g., convergence points 712, 714, 716, or 718; CU-UP, and/or UPF) and a UE 701, 801. The delay profile may be determined using a delay function $\tau_i(x)$ (see e.g., ['936]). The delay profile is affected by the transmission data rate and possibly some initial delay of the path 830 (e.g., a backhaul delay or the like). The REE 842 can then utilize those estimates to derive traffic distribution rules and configure NC (e.g., NC group size and/or other information discussed infra). One example for reliability provisioning includes the REE 842 deriving a worst-case estimate per path 830 to ensure a reliability target can be met at worst-case scenario(s) (see e.g., delay-optimal reliability traffic distribution optimizer (RTDO). Another example for reliability provisioning includes the REE 842 deriving a feasibility estimate per path 830 to determine a most resource efficient traffic distribution.

For an admitted reliability flow, the control plane 812 provides some or all of the following configuration parameters (e.g., as traffic mgmt configs 813) to the local data plane 814 and/or UEs 801: packet identifier (ID) for individual reliability flows, NC group size of individual reliability flows, and traffic distribution rules. The packet ID for a reliability flow may include one or more of a source network address (e.g., IP address, etc.), destination network address (e.g., IP address, etc.), port number(s) (e.g., ingress ports, egress ports, source ports, destination ports, etc.), QoS flow identifier (QFI), and/or some other identifier or combination of identifiers. The NC group size (k) includes the number of incoming packets to be jointly encoded for delivery to a receiver (Rx).

The traffic distribution rules (also referred to as "traffic distribution strategy") indicate the number of encoded packets belonging to an NC group to be routed over an individual path 830. The traffic distribution rules can be denoted as $\{x_i\}$, where $x_i$ denotes the number of encoded packets belonging to one NC group to be routed over the $i^{th}$ path, and i=1~m where m is the total number of paths 830. The total number of encoded packets is denoted by $n=\Sigma_{i=1}^{m} x_i$, and coding rate=k/n. Additionally or alternatively, the REE control plane 842c can further configure (e.g., in the traffic distribution rules) the set of encoded packets to be sent over certain path(s) i. For example, as described in ['936], when systematic NC is used, the REE 842c can configure all original packets to be sent over the lowest erasure path. Additionally or alternatively, the traffic distribution rules can include specific RATs (and specific channels/links of different RATs) to be used to convey the encoded packets.

The data plane 814 and/or individual UEs 801 process data (reliability) flows according to configurations provided by the control plane 812. The data plane 814 and/or individual UEs 801 may include, or be configured with, a packet processing pipeline for processing the data (reliability) flows. The packet processing pipeline for reliability enhancement starts from packet filtering that identifies packets requiring additional NC via header inspection. For every k incoming packets, the NC engine 817 (also referred to as "NC encoder 817") applies NC upon the group of packets and generates $n=\Sigma_{i=1}^{m} x_i$ total encoded packets. Based on assignment criteria provided by the control plane 812, $x_i$ packets out of the n encoded packets are selected to be routed towards the $i^{th}$ path, for all m paths 830. For purposes of the present disclosure, it may be assumed that all packets belonging to the reliability flow are of the same size (e.g., a maximum transmission unit (MTU), such as 1500 bytes for Ethernet protocol).

In some implementations, the REE data plane 842*d* can include automatic detection of burst size to apply proper NC scheme. For this implementation, control plane 812 can provide additional configuration parameters to data plane 814 and/or individual and/or individual UEs 801 such as, for example, one supportable NC group sizes and/or a burst time spread parameter (W). In some implementations, a reliability flow can be configured with one or more supportable NC group sizes (e.g., $1 \sim k_{max}$). For each NC group size, its corresponding traffic distribution rule can be provided: $\{x_i^{(k)}\}$, $k=1 \sim k_{max}$. Additionally or alternatively, a burst time spread parameter (W) is configured. The burst time spread parameter (W) specifies the maximum arrival time difference between the first packet and the last packet of a burst. When the REE data plane 842*d* is enhanced with automatic burst size detection, the second step of data plane operation can be changed to one or both of the following options:

Option 1 for the second step includes detecting burst size by counting the number of arrival reliability packets within the time window W after arrival of the first packet of a burst. Then, based on incoming data burst size, k, the NC engine 817 selects the corresponding traffic distribution rule, $\{x_i^{(k)}\}$, and generates $n=\Sigma_{i=1}^{m} x_i^{(k)}$ total encoded packets.

Option 2 for the second step is a variant of option 1. In option 2, when systematic code is used for NC, packets arrived within the time window W can be sent immediately (without any encoding) over certain subset of links/paths 830. The particular links/paths 830 used may be specified by the assignment criteria provided by the control plane 812. The assignment criteria may be indicated or specified by the traffic management configurations 813. In one example, the top 1 reliable links, subjected to the availability of those links. Copies of these packets can be retained in the NC engine 817 for generating network coded packets later. Then, based on incoming data burst size k, within the time window W, the NC engine 817 determines the traffic distribution rule $\{x_i^{(k)}\}$, and generates $n-k=\Sigma_{i=1}^{m} x_i^{(k)}-k$ network encoded packets based on original incoming data burst of size k. While calculating the traffic distribution rule $\{x_i^{(k)}\}$, the information packets (or incoming packets) sent during time window W should be accounted for, and $\{v_i^{(k)}\}$ denotes the number of packet being sent during time window W. Additionally or alternatively, the third step of the traffic distribution of data plane operation should be changed to '$x_i^{(k)}-v_i^{(k)}$ encoded packets are selected to be routed towards the $i^{th}$ path, for all m paths (e.g., links/paths 830).

2. EDGE COMPUTING SYSTEM CONFIGURATIONS AND ARRANGEMENTS

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 9 illustrates an example edge computing environment 900. FIG. 9 specifically illustrates the different layers of communication occurring within the environment 900, starting from endpoint sensors or things layer 910 (e.g., operating in an Internet of Things (IoT) network topology) comprising one or more IoT devices 911 (also referred to as edge endpoints 910 or the like); increasing in sophistication to gateways or intermediate node layer 920 comprising one or more user equipment (UEs) 921a and 921b (also referred to as intermediate nodes 920 or the like), which facilitate the collection and processing of data from endpoints 910; increasing in processing and connectivity sophistication to access node layer 930 (or "edge node layer 930") comprising a plurality of network access nodes (NANs) 931, 932, and 933 (collectively referred to as "NANs 931-933" or the like) and a plurality of edge compute nodes 936a-c (collectively referred to as "edge compute nodes 936" or the like) within an edge computing system 935; and increasing in connectivity and processing sophistication to a backend layer 910 comprising core network (CN) 942 and cloud 944. The processing at the backend layer 910 may be enhanced by network services as performed by one or more remote application (app) servers 950 and/or other cloud services. Some or all of these elements may be equipped with or otherwise implement some or all features and/or functionality discussed herein.

The environment 900 is shown to include end-user devices, such as intermediate nodes 920 and endpoints 910, which are configured to connect to (or communicatively couple with) one or more multiple communication networks (also referred to as "access networks," "radio access networks," or the like) based on different access technologies (or "radio access technologies") for accessing application services. These access networks may include one or more of NANs 931, 932, and/or 933. The NANs 931-933 are arranged to provide network connectivity to the end-user devices via respective links 903, 907 between the individual NANs and the one or more UEs 911, 921.

As examples, the communication networks and/or access technologies may include cellular technology such as LTE, MuLTEfire, and/or NR/5G (e.g., as provided by Radio Access Network (RAN) node 931 and/or RAN nodes 932), WiFi or wireless local area network (WLAN) technologies (e.g., as provided by access point (AP) 933 and/or RAN nodes 932), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 920 include UE 921a and UE 921b (collectively referred to as "UE 921" or "UEs 921"). In this example, the UE 921a is illustrated as a vehicle UE, and UE 921b is illustrated as a smartphone (e.g., handheld touchscreen mobile computing device connectable to one or more cellular networks). However, these UEs 921 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 910 include UEs 911, which may be IoT devices (also referred to as "IoT devices 911"), which are uniquely identifiable embedded computing devices (e.g., within the Internet infrastructure) that comprise a network access layer designed for low-power IoT applications utilizing short-lived UE connections. The IoT devices 911 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 911 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 911 can utilize technologies such as M2M or MTC for exchanging data with an MTC server (e.g., a server 950), an edge server 936 and/or edge computing system 935, or device via a PLMN, ProSe or D2D communication, sensor networks, or IoT networks. The M2M or MTC exchange of data may be a machine-initiated exchange of data.

The IoT devices 911 may execute background applications (e.g., keep-alive messages, status updates, etc.) to facilitate the connections of the IoT network. Where the IoT devices 911 are, or are embedded in, sensor devices, the IoT network may be a WSN. An IoT network describes an interconnecting IoT UEs, such as the IoT devices 911 being connected to one another over respective direct links 905. The IoT devices may include any number of different types of devices, grouped in various combinations (referred to as an "IoT group") that may include IoT devices that provide one or more services for a particular user, customer, organizations, etc. A service provider (e.g., an owner/operator of server 950, CN 942, and/or cloud 944) may deploy the IoT devices in the IoT group to a particular area (e.g., a geolocation, building, etc.) in order to provide the one or more services. In some implementations, the IoT network may be a mesh network of IoT devices 911, which may be termed a fog device, fog system, or fog, operating at the edge of the cloud 944. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 944 to Things (e.g., IoT devices 911). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 930) and/or a central cloud computing service (e.g., cloud 944) for performing heavy computations or computationally burdensome tasks. On the other hand, edge cloud computing consolidates human-operated, voluntary resources, as a cloud. These voluntary resource may include, inter-alia, intermediate nodes 920 and/or endpoints 910, desktop PCs, tablets, smartphones, nano data centers, and the like. In various implementations, resources in the edge cloud may be in one to two-hop proximity to the IoT devices 911, which may result in reducing overhead related to processing data and may reduce network delay.

Additionally or alternatively, the fog may be a consolidation of IoT devices 911 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 944. The fog operating at the edge of the cloud 944 may overlap or be subsumed into an edge network 930 of the cloud 944. The edge network of the cloud 944 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 936 or edge devices). The Fog layer resides on top of the edge layer and is a consolidation of networking devices such as the intermediate nodes 920 and/or endpoints 910 of FIG. 9.

Data may be captured, stored/recorded, and communicated among the IoT devices 911 or, for example, among the intermediate nodes 920 and/or endpoints 910 that have direct links 905 with one another as shown by FIG. 9. Analysis of the traffic flow and control schemes may be implemented by aggregators that are in communication with the IoT devices 911 and each other through a mesh network. The aggregators may be a type of IoT device 911 and/or network appliance. In the example of FIG. 9, the aggregators may be edge nodes 930, or one or more designated intermediate nodes 920 and/or endpoints 910. Data may be uploaded to the cloud 944 via the aggregator, and commands can be received from the cloud 944 through gateway devices that are in communication with the IoT devices 911 and the aggregators through the mesh network. Unlike the traditional cloud computing model, in some implementations, the cloud 944 may have little or no computational capabilities and only serves as a repository for archiving data recorded and processed by the fog. In these implementations, the cloud 944 centralized data storage system and provides reliability and access to data by the computing resources in the fog and/or edge devices. Being at the core of the architecture, the Data Store of the cloud 944 is accessible by both Edge and Fog layers of the aforementioned edge-fog network.

As mentioned previously, the access networks provide network connectivity to the end-user devices 920, 910 via respective NANs 931-933. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 931, 932. This virtualized framework allows the freed-up processor cores of the NANs 931, 932 to perform other virtualized applications, such as virtualized applications for various elements discussed herein.

The UEs 921, 911 may utilize respective connections (or channels) 903, each of which comprises a physical communications interface or layer. The connections 903 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 911, 921 and the NANs 931-933 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 911, 921 and NANs 931-933 may operate using LAA, enhanced LAA (eLAA), and/or further eLAA (feLAA) mechanisms. The UEs 921, 911 may further directly exchange communication data via respective direct links 905, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 921, 911 provide radio information to one or more NANs 931-933 and/or one or more edge compute nodes 936 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 921, 911 current location). As examples, the measurements collected by the UEs 921, 911 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per chip to interference power density ratio ($E_c/I_0$), energy per chip to noise power density ratio ($E_c/N_0$), peak-to-average power ratio (PAPR), reference signal received power (RSRP), reference signal received quality (RSRQ), received signal strength indicator (RS SI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the GNSS satellite signal), GNSS carrier phase measurements (e.g., the number of carrier-phase cycles (integer and fractional parts) of the GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2021 Jan. 8) ("[TS38215]"), 3GPP TS 38.314 v16.4.0 (2021 Sep. 30) ("[TS38314]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[TS80211]"), and/or the like. Additionally or alternatively, any of the aforementioned measurements (or combination of measurements) may be collected by one or more NANs 931-933 and provided to the edge compute node(s) 936.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers (HOs) and/or conditional HOs: number of requested, successful, and/or failed HO preparations; number of requested, successful, and/or failed HO resource allocations; number of requested, successful, and/or failed HO executions; mean and/or maximum time of requested HO executions; number of successful and/or failed HO executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 911, 921, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021 Jun. 24) ("[TS28552]"), 3GPP TS 32.425 v17.1.0 (2021 Jun. 24) ("[TS32425]"), and/or the like.

The radio information may be reported in response to a trigger event and/or on a periodic basis. Additionally or alternatively, individual UEs 921, 911 report radio information either at a low periodicity or a high periodicity depending on a data transfer that is to take place, and/or other information about the data transfer. Additionally or alternatively, the edge compute node(s) 936 may request the measurements from the NANs 931-933 at low or high periodicity, or the NANs 931-933 may provide the measurements to the edge compute node(s) 936 at low or high periodicity. Additionally or alternatively, the edge compute node(s) 936 may obtain other relevant data from other edge compute node(s) 936, core network functions (NFs), application functions (AFs), and/or other UEs 911, 921 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., MAMS [RFC8743]), IEEE/WiFi (e.g., [IEEE80211], [WiMAX], [IEEE16090], etc.), and/or any other like standards such as those discussed herein.

The UE 921b is shown to be configured to access an access point (AP) 933 via a connection 907. In this example, the AP 933 is shown to be connected to the Internet without connecting to the CN 942 of the wireless system. The connection 907 can comprise a local wireless connection, such as a connection consistent with any IEEE 802.11 protocol, wherein the AP 933 would comprise a wireless fidelity (WiFi®) router. Additionally or alternatively, the UEs 921 and IoT devices 911 can be configured to communicate using suitable communication signals with each other or with any of the AP 933 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 931 and 932 that enable the connections 903 may be referred to as "RAN nodes" or the like. The RAN nodes 931, 932 may comprise ground stations (e.g., terrestrial access points) or satellite stations providing coverage within a geographic area (e.g., a cell). The RAN nodes 931, 932 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 931 is embodied as a NodeB, evolved NodeB (eNB), or a next generation NodeB (gNB), and the RAN nodes 932 are embodied as relay nodes, distributed units, or Road Side Unites (RSUs). Any other type of NANs can be used.

Any of the RAN nodes 931, 932 can terminate the air interface protocol and can be the first point of contact for the UEs 921 and IoT devices XE111. Additionally or alternatively, any of the RAN nodes 931, 932 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, etc. Additionally or alternatively, the UEs 911, 921 can be configured to communicate using OFDM communication signals with each other or with any of the NANs 931, 932 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 931-932 organize DL transmissions (e.g., from any of the RAN nodes 931, 932 to the UEs 911, 921) and UL transmissions (e.g., from the UEs 911, 921 to RAN nodes 931, 932) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 911, 921 at each transmission time interval (TTI). A TTI is the duration of a transmission on a radio link 903, 905, and is related to the size of the data blocks passed to the radio link layer from higher network layers.

The NANs 931/932 may be configured to communicate with one another via respective interfaces or links (not shown), such as an X2 interface for LTE implementations (e.g., when CN 942 is an Evolved Packet Core (EPC)), an Xn interface for 5G or NR implementations (e.g., when CN 942 is an Fifth Generation Core (5GC)), or the like. The NANs 931 and 932 are also communicatively coupled to CN 942. Additionally or alternatively, the CN 942 may be an evolved packet core (EPC) network, a NextGen Packet Core (NPC) network, a 5G core (5GC), or some other type of CN.

The CN 942 is a network of network elements and/or network functions (NFs) relating to a part of a communications network that is independent of the connection technology used by a terminal or user device. The CN 942 comprises a plurality of network elements/NFs configured to offer various data and telecommunications services to customers/subscribers (e.g., users of UEs 921 and IoT devices 911) who are connected to the CN 942 via a RAN. The components of the CN 942 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 942 may be referred to as a network slice, and a logical instantiation of a portion of the CN 942 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 942 components/functions.

The CN 942 is shown to be communicatively coupled to an application server 950 and a network 950 via an IP communications interface 955. the one or more server(s) 950 comprise one or more physical and/or virtualized systems for providing functionality (or services) to one or more clients (e.g., UEs 921 and IoT devices 911) over a network. The server(s) 950 may include various computer devices with rack computing architecture component(s), tower computing architecture component(s), blade computing architecture component(s), and/or the like. The server(s) 950 may represent a cluster of servers, a server farm, a cloud computing service, or other grouping or pool of servers, which may be located in one or more datacenters. The server(s) 950 may also be connected to, or otherwise associated with one or more data storage devices (not shown). Moreover, the server(s) 950 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 950 offer applications or services that use IP/network resources. As examples, the server(s) 950 may provide traffic management services, cloud analytics, content streaming services, immersive gaming experiences, social networking and/or microblogging services, and/or other like services. In addition, the various services provided by the server(s) 950 may include initiating and controlling software and/or firmware updates for applications or individual components implemented by the UEs 921 and IoT devices 911. The server(s) 950 can also be configured to support one or more communication services (e.g., Voice-over-Internet Protocol (VoIP) sessions, PTT sessions, group communication sessions, social networking services, etc.) for the UEs 921 and IoT devices 911 via the CN 942.

The Radio Access Technologies (RATs) employed by the NANs 931-933, the UEs 921, 911, and the other elements in FIG. 9 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 931-933), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Intl "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 944 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 944 include application capabilities type, infrastructure capabilities type, and platform capabilities type. A cloud capabilities type is a classification of the functionality provided by a cloud service to a cloud service customer (e.g., a user of cloud 944), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 944 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 944 may represent one or more cloud servers, application servers, web servers, and/or some other remote infrastructure. The remote/cloud servers may include any one of a number of services and capabilities such as, for example, any of those discussed herein.

Additionally or alternatively, the cloud 944 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 944 may be a network that comprises computers, network connections among the computers, and software routines to enable communication between the computers over network connections. In this regard, the cloud 944 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 944 may be via a wired or a wireless connection using the various communication protocols discussed infra. More than one network may be involved in a communication session between the illustrated devices. Connection to the cloud 944 may require that the computers execute software routines which enable, for example, the seven layers of the OSI model of computer networking or equivalent in a wireless (cellular) phone network. Cloud 944 may be used to enable relatively long-range communication such as, for example, between the one or more server(s) 950 and one or more UEs 921 and IoT devices 911. Additionally or alternatively, the cloud 944 may represent the Internet, one or more cellular networks, local area networks, or wide area networks including proprietary and/or enterprise networks, TCP/Internet Protocol (IP)-based network, or combinations thereof. In these implementations, the cloud 944 may be associated with network operator who owns or controls equipment and other elements necessary to provide network-related services, such as one or more base stations or access points, one or more servers for routing digital data or telephone calls (e.g., a core network or backbone network), etc. The backbone links 955 may include any number of wired or wireless technologies, and may be part of a LAN, a WAN, or the Internet. In one example, the backbone links 955 are fiber backbone links that couple lower levels of service providers to the Internet, such as the CN 912 and cloud 944.

The edge compute nodes 936 may include or be part of an edge system 935 (or edge network 935). The edge compute nodes 936 may also be referred to as "edge hosts 936" or "edge servers 936." The edge system 935 includes a collection of edge servers 936 and edge management systems (not shown by FIG. 9) necessary to run edge computing applications within an operator network or a subset of an operator network. The edge servers 936 are physical computer systems that may include an edge platform and/or virtualization infrastructure, and provide compute, storage, and network resources to edge computing applications. Each of the edge servers 936 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 920 and/or endpoints 910. The VI of the edge servers 936 provide virtualized environments and virtualized resources for the edge hosts, and the edge computing applications may run as VMs and/or application containers on top of the VI.

In one example implementation, the edge system 935 may operate according to the MEC framework, as discussed in ETSI GS MEC 003 v2.1.1 (2019-01), ETSI GS MEC 009 V2.1.1 (2019-01), ETSI GS MEC 010-1 v1.1.1 (2017-10), ETSI GS MEC 010-2 v2.1.1 (2019-11), ETSI GS MEC 011 V1.1.1 (2017-07); ETSI GS MEC 012 V2.1.1 (2019-12), ETSI GS MEC 013 v2.1.1 (2019-09); ETSI GS MEC 014 V1.1.1 (2018-02); ETSI GS MEC 015 v2.1.1 (2020-06), ETSI GS MEC 016 V2.2.1 (2020-04), ETSI GS MEC 021 V2.1.1 (2020-01), ETSI GS MEC 028 v2.1.1 (2020-06), ETSI GS MEC 029 v2.1.1 (2019-07), ETSI MEC GS 030 v2.1.1 (2020-04), ETSI GS NFV-MAN 001 v1.1.1 (2014-12), U.S. Provisional App. No. 63/003,834 filed Apr. 1, 2020 ("['834]"), and Int'l App. No. PCT/US2020/066969 filed on Dec. 23, 2020 ("['969]") (collectively referred to herein as "[MEC]"), the contents of each of which are hereby incorporated by reference in their entireties.

In another example implementation, the edge system 935 operates according to the O-RAN framework as described in O-RAN Alliance Working Group (WG) 1, "O-RAN Architecture Description" v04.00 (March 2021), O-RAN Alliance WG1, "O-RAN Operations and Maintenance Interface Specification" v04.00 (November 2020), O-RAN Alliance WG1, "O-RAN Operations and Maintenance Architecture Specification" v04.00 (November 2020), O-RAN Alliance WG1, "Near-Real-time RAN Intelligent Controller, E2 Application Protocol (E2AP)" v01.01 (July 2020), O-RAN Alliance WG2, "O-RAN A1 interface: General Aspects and Principles 2.02" v02.02 (March 2021), O-RAN Alliance WG3, "O-RAN Near-Real-time RAN Intelligent Controller Architecture & E2 General Aspects and Principles" v01.01 (July 2020), O-RAN Near-Real-time RAN Intelligent Controller E2 Service Model 1.0 (February 2020), O-RAN WG3, "Near-Real-time RAN Intelligent Controller E2 Service Model (E2SM) KPM v01.00 (February 2020), O-RAN WG3, "O-RAN Near-Real-time RAN Intelligent Controller E2 Service Model (E2SM), RAN Function Network Interface (NI)" v1.0 (February 2020), E2SM RAN Control (E2SM-RC), O-RAN Alliance WG4, O-RAN Fronthaul Management Plane Specification, version 2.0 (July 2019), O-RAN Alliance WG4, "O-RAN Fronthaul Control, User and Synchronization Plane Specification 6.0" v06.00 (March 2021), and O-RAN Alliance WG6, "Cloud Architecture and Deployment Scenarios for O-RAN Virtualized RAN" v02.01 (July 2020) (collectively referred to as "[O-RAN]") the contents of each of which are hereby incorporated by reference in their entireties. In another example implementation, the edge system 935 operates according to the $3^{rd}$ Generation Partnership Project (3GPP) System Aspects Working Group 6 (SA6) Architecture for enabling Edge Applications (referred to as "3GPP edge computing") as discussed in 3GPP TS 23.558 v17.1.0 (2021 Sep. 24) ("[TS23558]"), 3GPP TS 23.501 v17.3.0 (2021 Dec. 23) ("[TS23501]"), and U.S. application Ser. No. 17/484,719 filed on 24 Sep. 2021 ("['719]") (collectively referred to as "[SA6Edge]"), the contents of each of which is hereby incorporated by reference in their entireties.

In another example implementation, the edge system 935 operates according to the Intel® Smart Edge Open framework (formerly known as OpenNESS) as discussed in Intel® Smart Edge Open Developer Guide, version 21.09 (30 Sep. 2021), available at: <https://smart-edge-open.github.io/> ("[ISEO]"), the contents of which are hereby incorporated by reference in its entirety.

It should be understood that the aforementioned edge computing frameworks and services deployment examples are only one illustrative example of edge computing systems/networks 935, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

It should be understood that the aforementioned edge computing frameworks and services deployment examples are only one illustrative example of edge computing systems/networks 935, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 9, each of the NANs 931, 932, and 933 are co-located with edge compute nodes (or "edge servers") 936a, 936b, and 936c, respectively. These implementations may be small-cell clouds (SCCs) where an edge compute node 936 is co-located with a small cell (e.g., pico-cell, femto-cell, etc.), or may be mobile micro clouds (MCCs) where an edge compute node 936 is co-located with a macro-cell (e.g., an eNB, gNB, etc.). The edge compute node 936 may be deployed in a multitude of arrangements other than as shown by FIG. 9. In a first example, multiple NANs 931-933 are co-located or otherwise communicatively coupled with one edge compute node 936. In a second example, the edge servers 936 may be co-located or operated by RNCs, which may be the case for legacy network deployments, such as 3G networks. In a third example, the edge servers 936 may be deployed at cell aggregation sites or at multi-RAT aggregation points that can be located either within an enterprise or used in public coverage areas. In a fourth example, the edge servers 936 may be deployed at the edge of CN 942. These implementations may be used in follow-me clouds (FMC), where cloud services running at distributed data centers follow the UEs 921 as they roam throughout the network.

In any of the implementations discussed herein, the edge servers 936 provide a distributed computing environment for application and service hosting, and also provide storage and processing resources so that data and/or content can be processed in close proximity to subscribers (e.g., users of UEs 921, 911) for faster response times The edge servers 936 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 936 from the UEs 911/921, CN 942, cloud 944, and/or server(s) 950, or vice versa. For example, a device application or client application operating in a UE 921/911 may offload application tasks or workloads to one or more edge servers 936. In another example, an edge server 936 may offload application tasks or workloads to one or more UE 921/911 (e.g., for distributed ML computation or the like).

3. HARDWARE COMPONENTS, CONFIGURATIONS, AND ARRANGEMENTS

The network components of the various devices and/or systems discussed herein may be servers, appliances, network infrastructure, machines, robots, drones, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 11:
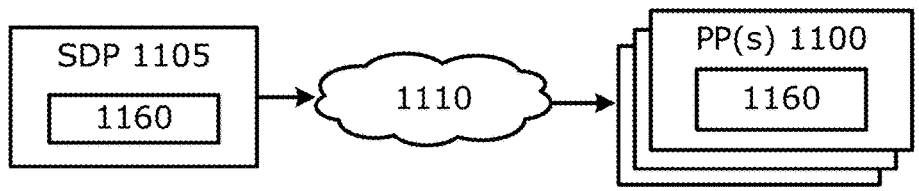
FIG. 11 depicts example components a compute node.

FIG. 11 illustrates an example of components that may be present in a computing node 1150 for implementing the techniques (e.g., operations, processes, methods, and methodologies) described herein. The compute node 1150 provides a closer view of the respective components of node 1100 when implemented as or as part of a computing device (e.g., as a mobile device, a base station, server, gateway, etc.). The compute node 1150 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1150, or as components otherwise incorporated within a chassis of a larger system. In some embodiments, compute node 1150 may correspond to the UEs 701, NANs 731-733, edge compute node 736 of FIG. 7; UEs 801, NANs 833, edge compute node 836; UEs 911, 921a, NANs 931-933, edge compute node(s) 936, CN 942 (or compute node(s) therein), and/or cloud 944 (or compute node(s) therein) of FIG. 9; software distribution platform 1005 and/or processor platform(s) 1000 of FIG. 10; CUs, DUs, and/or remote units (RUs) of a 3GPP-based CU/DU split RAN architecture; MEC hosts/servers and/or MEC platforms in ETSI MEC implementations; 3GPP edge computing; EAS, EES, and/or ECS of a 3GPP edge computing architecture; Non-RT RIC, Near-RT RIC, and/or E2 nodes in O-RAN implementations; and/or any other component, device, and/or system discussed herein. The compute node 1150 may be embodied as a type of device, appliance, computer, or other "thing" capable of communicating with other edge, networking, or endpoint components. For example, compute node 1150 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1150 includes processing circuitry in the form of one or more processors 1152. The processor circuitry 1152 includes circuitry such as, but not limited to one or more processor cores and one or more of cache memory, low drop-out voltage regulators (LDOs), interrupt controllers, serial interfaces such as SPI, $I^2C$ or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1152 may include one or more hardware accelerators (e.g., same or similar to acceleration circuitry 1164), which may be microprocessors, programmable processing devices (e.g., FPGA, ASIC, etc.), or the like. The one or more accelerators may include, for example, computer vision and/or deep learning accelerators. In some implementations, the processor circuitry 1152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1152 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1152 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1152 may work in coordination with each other to execute many types of operations and instructions within and on behalf of the compute node 1150.

The processors (or cores) 1152 may be coupled with or may include memory/storage and may be configured to execute instructions stored in the memory/storage to enable various applications or operating systems to run on the platform 1150. The processors (or cores) 1152 is configured to operate application software to provide a specific service to a user of the platform 1150. Additionally or alternatively, the processor(s) 1152 may be a special-purpose processor(s)/controller(s) configured (or configurable) to operate according to the elements, features, and implementations discussed herein.

As examples, the processor(s) 1152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1152 may be a part of a system on a chip (SoC), System-in-Package (SiP), a multi-chip package (MCP), and/or the like, in which the processor(s) 1152 and other components are formed into a single integrated circuit, or a single package, such as the Edison™ or Galileo™ SoC boards from Intel® Corporation. Other examples of the processor(s) 1152 are mentioned elsewhere in the present disclosure.

The processor(s) 1152 may communicate with system memory 1154 over an interconnect (IX) 1156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs.

To provide for persistent storage of information such as data, applications, operating systems and so forth, a storage 1158 may also couple to the processor 1152 via the IX 1156. In an example, the storage 1158 may be implemented via a solid-state disk drive (SSDD) and/or high-speed electrically erasable memory (commonly referred to as "flash memory"). Other devices that may be used for the storage 1158 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1154 and/or storage circuitry 1158 may also incorporate three-dimensional (3D) cross-point (XPOINT) memories from Intel® and Micron®.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components of edge computing device 1150 may communicate over an interconnect (IX) 1156. The IX 1156 may represent any suitable type of connection or interface such as, for example, metal or metal alloys (e.g., copper, aluminum, etc.), fiber, and/or the like. The IX 1156 may include any number of IX, fabric, and/or interface technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, HyperTransport IXs, NVLink provided by NVIDIA®, a Time-Trigger Protocol (TTP) system, a FlexRay system, PROFI- BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1156 may be a proprietary bus, for example, used in a SoC based system.

The IX 1156 couples the processor 1152 to communication circuitry 1166 for communications with other devices, such as a remote server (not shown) and/or the connected edge devices 1162. The communication circuitry 1166 is a hardware element, or collection of hardware elements, used to communicate over one or more networks (e.g., cloud 1163) and/or with other devices (e.g., edge devices 1162).

The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the compute node 1150 may communicate with close devices, e.g., within about 10 meters, using a local transceiver based on BLE, or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may be included to communicate with devices or services in the edge cloud 1163 via local or wide area network protocols. The wireless network transceiver 1166 may be an LPWA transceiver that follows the IEEE 802.15.4, or IEEE 802.15.4g standards, among others. The compute node 1163 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP specifications, such as LTE and 5G/NR communication systems, discussed in further detail at the end of the present disclosure. A network interface controller (NIC) 1168 may be included to provide a wired communication to nodes of the edge cloud 1163 or to other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The compute node 1150 may include or be coupled to acceleration circuitry 1164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1164 may comprise logic blocks or logic fabric and other interconnected resources that may be programmed (configured) to perform various functions, such as the procedures, methods, functions, etc. discussed herein. In such implementations, the acceleration circuitry 1164 may also include memory cells (e.g., EPROM, EEPROM, flash memory, static memory (e.g., SRAM, anti-fuses, etc.) used to store logic blocks, logic fabric, data, etc. in LUTs and the like.

The IX 1156 also couples the processor 1152 to a sensor hub or external interface 1170 that is used to connect additional devices or subsystems. The additional/external devices may include sensors 1172, actuators 1174, and positioning circuitry 1175.

The sensor circuitry 1172 includes devices, modules, or subsystems whose purpose is to detect events or changes in its environment and send the information (sensor data) about the detected events to some other a device, module, subsystem, etc. Examples of such sensors 1172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1150); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1174, allow platform 1150 to change its state, position, and/or orientation, or move or control a mechanism or system. The actuators 1174 comprise electrical and/or mechanical devices for moving or controlling a mechanism or system, and converts energy (e.g., electric current or moving air and/or liquid) into some kind of motion. The actuators 1174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1150 may be configured to operate one or more actuators 1174 based on one or more captured events and/or instructions or control signals received from a service provider and/or various client systems.

The positioning circuitry 1175 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1175 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1175 may include a Micro-Technology for Positioning, Navigation, and Timing (Micro-PNT) IC that uses a primary timing clock to perform position tracking/estimation without GNSS assistance. The positioning circuitry 1175 may also be part of, or interact with, the communication circuitry 1166 to communicate with the nodes and components of the positioning network. The positioning circuitry 1175 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1175 is, or includes an INS, which is a system or device that uses sensor circuitry 1172 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1150 without the need for external references.

In some optional examples, various input/output (I/O) devices may be present within or connected to, the compute node 1150, which are referred to as input circuitry 1186 and output circuitry 1184 in FIG. 11. The input circuitry 1186 and output circuitry 1184 include one or more user interfaces designed to enable user interaction with the platform 1150 and/or peripheral component interfaces designed to enable peripheral component interaction with the platform 1150. Input circuitry 1186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1184 may be included to show information or otherwise convey information, such as sensor readings, actuator position(s), or other like information. Data and/or graphics may be displayed on one or more user interface components of the output circuitry 1184. Output circuitry 1184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1150. The output circuitry 1184 may also include speakers or other audio emitting devices, printer(s), and/or the like. Additionally or alternatively, the sensor circuitry 1172 may be used as the input circuitry 1184 (e.g., an image capture device, motion capture device, or the like) and one or more actuators 1174 may be used as the output device circuitry 1184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the compute node 1150, although, in examples in which the compute node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the compute node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1178 may communicate the information on the battery 1176 to the processor 1152 over the IX 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the compute node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the compute node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1183 in the form of software, firmware, or hardware commands to implement the techniques described herein. Although such instructions 1182, 1183 are shown as code blocks included in the memory 1154 and the storage 1158, any of the code blocks 1182, 1183 may be replaced with hardwired circuits, for example, built into an application specific integrated circuit (ASIC) or programmed into an FPGA, or the like.

In an example, the instructions 1181, 1182, 1183 provided via the memory 1154, the storage 1158, or the processor 1152 may be embodied as a non-transitory machine-readable medium (NTMRM) 1160 including code to direct the processor 1152 to perform electronic operations in the compute node 1150. The processor 1152 may access the NTMRM 1160 over the IX 1156. For instance, the NTMRM 1160 may be embodied by devices described for the storage 1158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1181, 1182, 1183) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1181, 1182, 1183 for carrying out operations of the present disclosure may also be written in any combination of the programming languages discussed herein. The program code may execute entirely on the system 1150, partly on the system 1150, as a stand-alone software package, partly on the system 1150 and partly on a remote computer or entirely on the remote computer or server. In the latter scenario, the remote computer may be connected to the system 1150 through any type of network, including a LAN or WAN, or the connection may be made to an external computer (e.g., through the Internet using an Internet Service Provider (ISP)).

In an example, the instructions 1181, 1182, 1183 on the processor circuitry 1152 (separately, or in combination with the instructions 1181, 1182, 1183) may configure execution or operation of a trusted execution environment (TEE) 1190. The TEE 1190 operates as a protected area accessible to the processor circuitry 1102 to enable secure access to data and secure execution of instructions. In some embodiments, the TEE 1190 may be a physical hardware device that is separate from other components of the system 1150 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1190 may be implemented as secure enclaves, which are isolated regions of code and/or data within the processor and/or memory/storage circuitry of the system 1150. Only code executed within a secure enclave may access data within the same secure enclave, and the secure enclave may only be accessible using the secure application (which may be implemented by an application processor or a tamper-resistant microcontroller). Various implementations of the TEE 1190, and an accompanying secure area in the processor circuitry 1152 or the memory circuitry 1154 and/or storage circuitry 1158 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1100 through the TEE 1190 and the processor circuitry 1152. Additionally or alternatively, the memory circuitry 1154 and/or storage circuitry 1158 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1104 and/or storage circuitry 1108 may be divided into one or more trusted memory regions for storing applications or software modules of the TEE 1190.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 11 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 11 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

Figure 10:
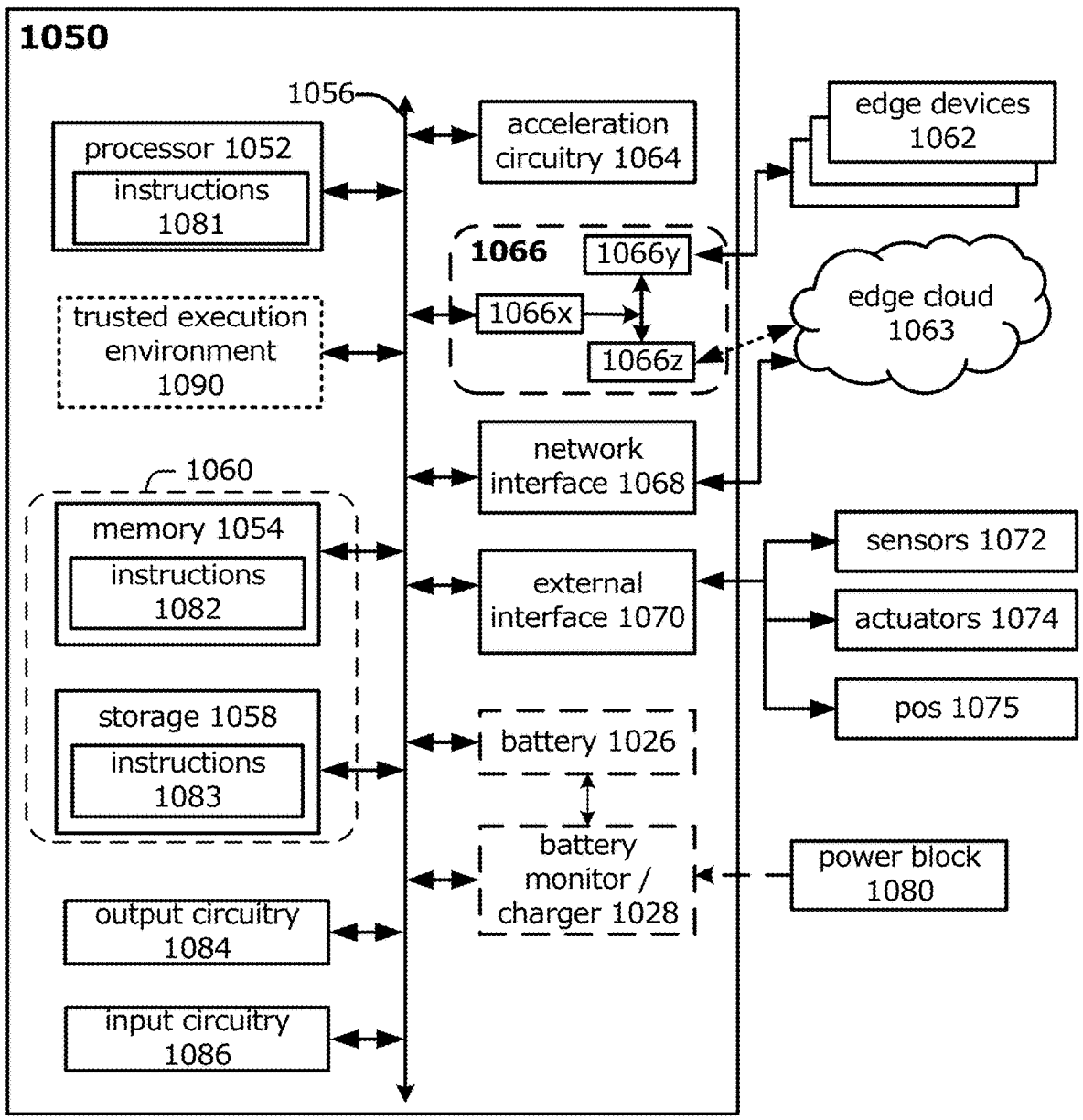
FIG. 10 illustrates an example software distribution platform.

FIG. 10 illustrates an example software (SW) distribution platform (SDP) 1005 to distribute software 1060, such as the example computer readable instructions 1181, 1182, 1183 of FIG. 11, to one or more devices, such as example processor platform(s) (pp) 1000, connected edge devices 1162 (see e.g., FIG. 11), and/or any of the other computing systems/devices discussed herein. The SDP 1005 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1162 of FIG. 11). The SDP 1005 (or components thereof) may be located in a cloud (e.g., data center, etc.), a local area network, an edge network, a wide area network, on the Internet, and/or any other location communicatively coupled with the pp 1000.

The pp 1000 and/or connected edge devices 1162 connected edge devices 1162 may include customers, clients, managing devices (e.g., servers), third parties (e.g., customers of an entity owning and/or operating the SDP 1005), IoT devices, and the like. The pp 1000/connected edge devices 1162 may operate in commercial and/or home automation environments. In some examples, a third party is a developer, a seller, and/or a licensor of software such as the example computer readable media 1181, 1182, 1183 of FIG. 11. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 1000/connected edge devices 1162 can be physically located in different geographic locations, legal jurisdictions, etc.

In FIG. 10, the SDP 1005 includes one or more servers (referred to as "servers 1005") and one or more storage devices (referred to as "storage 1005"). The storage 1005 store the computer readable instructions 1060, which may correspond to the instructions 1181, 1182, 1183 of FIG. 11. The servers 1005 are in communication with a network 1010, which may correspond to any one or more of the Internet and/or any of the example networks as described herein. The servers 1005 are responsive to requests to transmit the software to a requesting party as part of a commercial transaction. Payment for the delivery, sale and/or license of the software may be handled by the servers 1005 and/or via a third-party payment entity. The servers 1005 enable purchasers and/or licensors to download the computer readable instructions 1060 from the SDP 1005.

The servers 1005 are communicatively connected to one or more security domains and/or security devices through which requests and transmissions of the example computer readable instructions 1060 must pass. Additionally or alternatively, the servers 1005 periodically offer, transmit, and/or force updates to the software 1060 to ensure improvements, patches, updates, etc. are distributed and applied to the software at the end user devices. The computer readable instructions 1060 are stored on storage 1005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1060 stored in the SDP 1005 are in a first format when transmitted to the pp 1000. Additionally or alternatively, the first format is an executable binary in which particular types of the pp 1000 can execute. Additionally or alternatively, the first format is uncompiled code that requires one or more preparation tasks to transform the first format to a second format to enable execution on the pp 1000. For example, the receiving pp 1000 may need to compile the computer readable instructions 1060 in the first format to generate executable code in a second format that is capable of being executed on the pp 1000. Additionally or alternatively, the first format is interpreted code that, upon reaching the pp 1000, is interpreted by an interpreter to facilitate execution of instructions. Additionally or alternatively, different components of the computer readable instructions 1182 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

4. EXAMPLE IMPLEMENTATIONS

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a method for providing resilient network slicing, comprising: collecting performance metrics related to a communication network from one or more data sources within the communication network, wherein the communication environment includes a set of network slices, wherein each network slice of the set of network slices is a logical network that provides one or more network capabilities; determining a network slice configuration for an individual network slice of the set of network slices based on an analysis of the collected performance metrics in view of a service level agreement (SLA) with a service consumer, wherein the determined network slice configuration includes of at least one of an assignment of one or more dedicated network elements to the individual network slice, a network access network (NAN) configuration for the individual network slice, and an assignment of dedicated or prioritized radio resources for the individual network slice; and sending the network slice configuration to a NAN in the communication network, the network slice configuration to cause the NAN to reconfigure one or more network parameters to implement the individual network slice according to the network slice configuration.

Example 2 includes the method of example 1, wherein the assignment of the one or more dedicated network elements to the individual network slice includes an exclusive reservation of one or more radio unit (RUs), one or more distributed units (DUs), one or more centralized unit (CU) user plane (UP) functions, one or more CU control plane (CP) functions, or one or more core network NFs.

Example 3 includes the method of examples 1-2, wherein the NAN configuration for the individual network slice includes at least one of a bandwidth part configuration or a beam configuration.

Example 4 includes the method of examples 1-3, wherein the assignment of the dedicated or prioritized radio resources includes a set resource blocks (RBs) or channel access time periods.

Example 5 includes the method of examples 1-4, wherein the network slice configuration includes an identifier of a backup NAN.

Example 6 includes the method of example 5, including: determining the backup NAN for an individual user equipment (UE); sending a backup request message to request the backup NAN, the backup request message requesting the backup NAN to provide backup services to the individual UE; receiving a backup response message from the backup NAN including an acceptance or rejection of the backup request message.

Example 7 includes the method of example 6, wherein the backup response message includes a backup configuration to provide the backup services to the individual UE.

Example 8 includes the method of examples 6-7, including: generating a backup configuration message for the individual UE; and sending the backup configuration message to the individual UE via a serving NAN currently serving the individual UE.

Example 9 includes the method of example 8, wherein the backup NAN belongs to a same access network as the serving NAN or the backup NAN is part of a different access network than an access network to which the serving NAN belongs.

Example 10 includes the method of examples 8-9, wherein the backup NAN implements a same radio access technology (RAT) or a same sub-RAT as the serving NAN.

Example 11 includes the method of examples 8-9, wherein the backup NAN implements a different radio access technology (RAT) or a different sub-RAT as the serving NAN.

Example 12 includes the method of examples 7-11, wherein the backup configuration includes handover parameters for the backup NAN to act as a target NAN for a handover when one or more HO trigger conditions occur.

Example 13 includes the method of examples 7-11, wherein the backup configuration includes a secondary cell parameters or dual connectivity (DC) parameters for the backup NAN to serve as a secondary anchor NAN for DC.

Example 14 includes the method of examples 1-13, wherein the network slice configuration includes a reliability enhancement configuration for at least one traffic flow belonging to the individual network slice.

Example 15 includes the method of example 14, wherein the reliability enhancement configuration includes information for communicating the at least one traffic flow with a specified packet error rate (PER) when selecting modulation-and-coding scheme for transmission.

Example 16 includes the method of examples 14-15, wherein the reliability enhancement configuration includes information for configuring the at least one traffic flow to be sent with packet duplication via carrier aggregation.

Example 17 includes the method of examples 1-16, including: determining, based on the collected performance metrics, a reliability target, a network coding (NC) group size, and per path characteristics for each network path of a set of network paths in the communication environment; determining a network coding rate and a traffic distribution strategy based on the per path characteristics, the NC group size, and the reliability target; generating an NC group from a set of incoming packets by applying NC to packets in the set of incoming packets to produce the set of network coded packets in the NC group, wherein the NC group comprises a set of network coded packets to achieve the reliability target; and routing individual subsets from the NC group to respective network paths of the set of network paths according to the traffic distribution strategy.

Example 18 includes the method of example 17, wherein: the traffic distribution strategy specifies a number of network coded packets in the individual subsets to be routed over the respective network paths; the per path characteristics include an erasure probability for transmitting packets over individual network paths of the set of network paths, and delay characteristics indicating an expected time required for sending a number of packets over the individual network paths of the set of network paths; and the reliability target is a probability that a receiver will be able to decode the set of packets.

Example 19 includes the method of example 18, including: when the NAN implements a frequency division multiplexing (FDM) RAT, determining a portion of radio resources to be reserved for the individual network slice based on a traffic load of the respective network paths, the number of network coded packets in the individual subsets to be routed over the respective network paths, a data rate for the respective network paths, and an over-provisioning factor.

Example 20 includes the method of example 18, including: when the NAN implements a time division multiplexing (TDM) RAT, determining a time period for accessing the respective network paths to be reserved the individual network slice based on a data burst size, the number of network coded packets in the individual subsets to be routed over the respective network paths, a data rate for the respective network paths, an over-provisioning factor, and a predefined periodicity.

Example 21 includes the method of examples 1-20, wherein the collected performance metrics include one or more of data transmission reliability metrics, service continuity reliability metrics, network condition metrics, and UE condition metrics.

Example 22 includes the method of example 21, including determining the network slice configuration for the individual network slice using a Reinforcement Learning (RL) framework.

Example 23 includes the method of example 22, wherein determining the network slice configuration for the individual network slice using the RL framework includes: determining a state of the environment based on the collected performance metrics; operating a RL model (RLM) for determining one or more actions based on the determined state, wherein the determined one or more actions include respective network slice configurations for corresponding network slices in the set of network slices; operating a reward function to calculate a reward value based on the collected performance metrics; and updating the RLM based on the calculated reward value.

Example 24 includes the method of example 23, wherein the collected performance metrics for calculating the reward value include the data transmission reliability metrics and the service continuity reliability metrics.

Example 25 includes the method of examples 23-24, wherein the reward function is a utility function of a network quality of service (QoS) target.

Example 26 includes the method of example 25, wherein inputs to the utility function include one or more QoS parameters, wherein the one or more QoS parameters include one or more of packet delay, packet loss rate, packet drop rate, physical (PHY) rate; goodput; UE throughput, cell throughput, jitter, alpha fairness, channel quality indicator (CQI) related measurements, Modulation Coding Scheme (MCS) related measurements, physical resource block (PRB) utilization, radio utilization level per NAN, and data volume.

Example 27 includes the method of examples 21-26, wherein the data transmission reliability metrics include one or more of a transport block error rate, a packet loss rate, and a packet drop rate.

Example 28 includes the method of examples 21-27, wherein the service continuity reliability metrics include one or more of a radio link failure (RLF) rate, an HO failure (HOF) rate, one or more signal measurements prior to an RLF, and one or more signal measurements prior to an HOF.

Example 29 includes the method of example 28, wherein the one or more signal measurements include one or more of reference signal received power (RSRP), reference signal received quality (RSRQ), and signal-to-interference-and-noise (SINR) level.

Example 30 includes the method of examples 21-29, wherein the network condition metrics include one or more of a radio resource utilization level, a number of radio resource control (RRC) connections, a number of RRC connection failures, a number of protocol data unit (PDU) sessions, a PDU session establishment failure rate, a total data volume, a data volume measurement per slice and per quality of service (QoS) class traffic loading, an average latency, a latency per slice, and a latency per QoS class.

Example 31 includes the method of examples 21-30, wherein the UE condition metrics include one or more of RSRP measurements, RSRQ measurements, received signal strength indication (RSSI) measurements, channel quality indicator (CQI) measurements, and SINR measurements.

Example 32 includes the method of examples 1-31, including: collecting slicing capability information from respective NANs in the communication network, wherein at least one NAN in the communication network operates according to a different radio access technology (RAT) than other NANs in the communication network; generating a service level agreement (SLA) from a negotiation with a network slice consumer based on the collected slicing capability information, wherein the network slice configuration is based on the SLA; and deploying the individual network slice to the respective NANs to operate the individual network slice according to the determined network slice configuration.

Example 33 includes the method of example 32, wherein the slicing capability information includes a maximum number of network slices that the respective NANs can support.

Example 34 includes the method of examples 32-33, wherein the slicing capability information includes a resource isolation level of the respective NANs and one or more resource isolation methods supported by the respective NANs.

Example 35 includes the method of example 34, wherein the resource isolation level of the respective NANs include one or more of whether the respective NANs can allocate dedicated resource that can only be used exclusively for a slice, whether the respective NANs can reserve resource that a network slice has higher priority to access, and whether the respective NANs can restrict the maximum amount of resource that a network slice can use.

Example 36 includes the method of examples 34-35, wherein the resource isolation methods include time-domain resource reservation, frequency-domain resource reservation, or no isolation support.

Example 37 includes the method of examples 32-36, wherein the slicing capability information includes QoS support of the respective NANs.

Example 38 includes the method of examples 32-37, wherein the slicing capability information includes support of deterministic data transmission for time sensitive traffic of the respective NANs.

Example 39 includes the method of examples 32-38, wherein the collected performance metrics include one or more of a channel utilization level, an average wait time for contention-based channel access, and a busy or idle ratio of one or more frequency bands or frequency spectrum.

Example 40 6includes the method of examples 32-39, wherein the network slice configuration specifies one or more traffic types to be transmitted over more than one RAT simultaneously.

Example 41 includes the method of examples 32-40, wherein the network slice configuration specifies one or more traffic types to be transmitted only using a specific type of RAT.

Example 42 includes the method of examples 32-41, wherein the network slice configuration specifies one or more traffic types to be sent during one or more dedicated time slots.

Example 43 includes the method of examples 32-42, wherein the network slice configuration specifies one or more traffic types to be transmitted using bandwidth or a frequency spectrum designated for a specified type of RAT.

Example 44 includes the method of examples 32-43, wherein the network slice configuration specifies one or more traffic types to be scheduled for transmission using a specified contention window setting.

Example 45 includes the method of examples 1-44, wherein the one or more data sources include one or more of one or more UEs and one or more NANs.

Example 46 includes the method of examples 1-45, wherein the SLA includes one or more service level objectives (SLOs), wherein the one or more SLOs specify one or more of times, locations, costs, and performance for providing services associated with the individual network slice.

Example 47 includes the method of examples 46, wherein each SLO of the one or more SLOs includes a set of service level indicators (SLIs), wherein the set of SLIs include one or more of availability, throughput, frequency, response time, latency, jitter QoS, Quality of Experience (QoE), error rate, durability, and correctness.

Example 48 includes the method of example 47, including: determining whether a currently deployed network slice complies with the one or more SLOs based on the set of SLIs; and determining the network slice configuration based on whether the currently deployed network slice complies with the one or more SLOs.

Example 49 includes the method of examples 1-48, wherein the SLA includes priority levels for respective traffic classes, types of service to be provided, a service's desired performance level and its reliability and responsiveness, monitoring processes and service level reporting, and response and issue resolution timing Example 50 includes a method of operating a network slice manager, the method comprising: collecting performance metrics related to a communication network from one or more data sources within the communication network, wherein the communication environment includes a set of network slices, wherein each network slice of the set of network slices is a logical network that provides one or more network capabilities; determining, based on the collected performance metrics, a reliability target, a network coding (NC) group size, and per path characteristics for each network path of a set of network paths in the communication environment; determining a network coding rate and a traffic distribution strategy based on the per path characteristics, the NC group size, and the reliability target; determining a network slice configuration for an individual network slice of the set of network slices based on an analysis of the collected performance metrics, the network coding rate, and the traffic distribution strategy in view of a service level agreement (SLA) with a service consumer; and causing the network slice configuration to be deployed or provisioned to a NAN in the communication network, the network slice configuration to cause the NAN to reconfigure one or more network parameters to implement the individual network slice according to the network slice configuration.

Example 51 includes the method of example 50, wherein the determined network slice configuration includes of at least one of an assignment of one or more dedicated network elements to the individual network slice, a network access network (NAN) configuration for the individual network slice, and an assignment of dedicated or prioritized radio resources for the individual network slice.

Example 52 includes the method of examples 50-51, wherein the traffic distribution strategy specifies a number of network coded packets in the individual subsets to be routed over the respective network paths; the per path characteristics include an erasure probability for transmitting packets over individual network paths of the set of network paths, and delay characteristics indicating an expected time required for sending a number of packets over the individual network paths of the set of network paths; and the reliability target is a probability that a receiver will be able to decode the set of packets.

Example 53 includes the method of examples 50-52, including: when the NAN implements a frequency division multiplexing (FDM) radio access technology (RAT), determine a portion of radio resources to be reserved for the individual network slice based on a traffic load of the respective network paths, the number of network coded packets in the individual subsets to be routed over the respective network paths, a data rate for the respective network paths, and an over-provisioning factor; and/or when the NAN implements a time division multiplexing (TDM) RAT, determine a time period for accessing the respective network paths to be reserved the individual network slice based on a data burst size, the number of network coded packets in the individual subsets to be routed over the respective network paths, a data rate for the respective network paths, an over-provisioning factor, and a predefined periodicity.

Example 54 includes the method of examples 50-53, including performing the method of any one or more of examples 1-49.

Example 55 includes a method of operating a network slice manager, the method comprising: collecting slicing capability information from respective network access nodes (NANs) in a communication network including a set of network slices, wherein each network slice of the set of network slices is a logical network that provides one or more network capabilities; collecting performance metrics related to the communication network the respective NANs; generating a service level agreement (SLA) from a negotiation with a network slice consumer based on the collected slicing capability information, wherein the network slice configuration is based on the SLA; generating a network slice configuration for an individual network slice of the set of network slices based on an analysis of the collected performance metrics in view of the SLA; and deploying or provisioning the network slice configuration to the respective NANs in the communication network to operate the individual network slice according to the determined network slice configuration.

Example 56 includes the method of example 55, wherein the network slice configuration is to cause the respective NANs to reconfigure respective network parameters to implement the individual network slice according to the network slice configuration, and the network slice configuration specifies one of more of: one or more traffic types to be transmitted over more than one RAT simultaneously; one or more traffic types to be transmitted only using a specific type of RAT; one or more traffic types to be sent during one or more dedicated time slots; one or more traffic types to be transmitted using bandwidth or a frequency spectrum designated for a specified type of RAT; and one or more traffic types to be scheduled for transmission using a specified contention window setting.

Example 57.0 includes the method of examples 55-56, wherein the at least one NAN in the communication network operates according to a different RAT than other NANs in the communication network.

Example 57.2 includes the method of examples 55-57.0, wherein the at least one NAN in the communication network operates according to a different sub-RAT than other NANs in the communication network.

Example 58 includes the method of examples 55-57.2, wherein the slicing capability information includes one or more of: a maximum number of network slices that the respective NANs can support; a resource isolation level of the respective NANs; one or more resource isolation methods supported by the respective NANs, wherein the resource isolation methods include time-domain resource reservation, frequency-domain resource reservation, or no isolation support; QoS support capabilities of the respective NANs; and deterministic data transmission capabilities for time sensitive traffic of the respective NANs.

Example 59 includes the method of examples 55-58, including determining, based on the collected performance metrics, a reliability target, a network coding (NC) group size, and per path characteristics for each network path of a set of network paths in the communication environment; determining a network coding rate and a traffic distribution strategy based on the per path characteristics, the NC group size, and the reliability target; and determining the network slice configuration for the individual network slice of the set of network slices based on an analysis of the collected performance metrics, the network coding rate, and the traffic distribution strategy in view of the SLA.

Example 59 includes the method of examples 50-58, including performing the method of any one or more of examples 1-49.

Example 60 includes the method of examples 1-49, wherein the method is performed by a network slice manager (NSM).

Example 61 includes the method of example 60, wherein the NSM is part of a multi-access traffic manager (MA-TM).

Example 62 includes the method of examples 60-61, wherein the NSM and the MA-TM are implemented as respective edge applications (apps) of an edge compute node.

Example 63 includes the method of examples 60-61, wherein the MA-TM is part of an edge platform of an edge compute node, and the NSM is an edge app operated by the edge compute node.

Example 64 includes the method of examples 62-63, wherein the edge compute node is a Multi-Access Edge Computing (MEC) server of a MEC framework, and the NSM is implemented as a MEC app configured to be operated by a MEC platform of the MEC server.

Example 65 includes the method of examples 62-63, wherein the edge compute node is a Multi-Access Management Services (MAMS) server or a MAMS client of a MAMS framework, and the NSM is implemented as a Network Connection Manager (NCM) configured to be operated by the MAMS server or a Client Connection Manager (CCM) configured to be operated by the MAMS client.

Example 66 includes the method of examples 62-63, wherein the edge compute node is a near-real time (RT) Radio Access Network (RAN) intelligent controller (RIC) of an Open RAN Alliance (O-RAN) framework, and the NSM is implemented as an xApp configured to be operated by the RIC.

Example 67 includes the method of examples 62-63, wherein the edge compute node is a non-RT RIC of an O-RAN framework, and the NSM is implemented as an rApp configured to be operated by the RIC Example 68 includes the method of examples 62-63, wherein the edge compute node is a central unit (CU) of a CU/distributed unit (DU)-split architecture of a next generation (NG)-RAN architecture of a third generation partnership project (3GPP) cellular network, and the NSM is implemented as a network function (NF) configured to be operated by the CU.

Example 69 includes the method of examples 62-63, wherein the edge compute node is an Edge Enabler Server (EES) or an Edge Configuration Server (ECS) of a 3GPP edge computing architecture, and the NSM is implemented as an Edge Application Servers (EAS) configured to be operated by the EES or the ECS.

Example 70 includes one or more computer readable media comprising instructions, wherein execution of the instructions by processor circuitry is to cause the processor circuitry to perform the method of any one of examples 1-69 and/or any other aspect discussed herein.

Example 71 includes a computer program comprising the instructions of example 70. Example 72 includes a n Application Programming Interface defining functions, methods, variables, data structures, and/or protocols for the computer program of example 71. Example 73 includes a n apparatus comprising circuitry loaded with the instructions of example 70. Example 74 includes a n apparatus comprising circuitry operable to run the instructions of example 70. Example 75 includes a n integrated circuit comprising one or more of the processor circuitry of example 70 and the one or more computer readable media of example 70. Example 76 includes a computing system comprising the one or more computer readable media and the processor circuitry of example 70. Example 77 includes a n apparatus comprising means for executing the instructions of example 70. Example 78 includes a signal generated as a result of executing the instructions of example 70. Example 79 includes a data unit generated as a result of executing the instructions of example 70, wherein the data unit is a datagram, network packet, data frame, data segment, a Protocol Data Unit (PDU), a Service Data Unit (SDU), a message, or a database object. Example 80 includes a signal encoded with the data unit of example 79. Example 81 includes an electromagnetic signal carrying the instructions of example 70. Example 82 includes an apparatus comprising means for performing the method of any one or more of examples 1-69.

5. TERMINOLOGY

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an Si interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "IAB-node" at least in some embodiments refers to a RAN node that supports new radio (NR) access links to user equipment (UEs) and NR backhaul links to parent nodes and child nodes. The term "IAB-donor" at least in some embodiments refers to a RAN node (e.g., a gNB) that provides network access to UEs via a network of backhaul and access links.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers (TSPs) have traditionally located switching equipment for one or multiple types of access networks. The CO can be physically designed to house telecommunications infrastructure equipment or compute, data storage, and network resources. The CO need not, however, be a designated location by a TSP. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of HOs, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" at least in some embodiments refers to the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" at least in some embodiments refers to the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) at least in some embodiments refers to the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" or "VNF" at least in some embodiments refers to a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "network function" at least in some embodiments refers to a processing function in a network, which has defined functional behavior and defined interfaces.

The term "management function" at least in some embodiments refers to a logical entity playing the roles of a service consumer and/or a service producer. The term "management service" at least in some embodiments refers to a set of offered management capabilities.

The term "slice" at least in some embodiments refers to a set of characteristics and behaviors that separate one instance, traffic, data flow, application, application instance, link or connection, RAT, device, system, entity, element, etc. from another instance, traffic, data flow, application, application instance, link or connection, RAT, device, system, entity, element, etc., or separate one type of instance, etc., from another instance, etc.

The term "network slice" at least in some embodiments refers to a logical network that provides specific network capabilities and network characteristics and/or supports various service properties for network slice service consumers. Additionally or alternatively, the term "network slice" at least in some embodiments refers to a logical network topology connecting a number of endpoints using a set of shared or dedicated network resources that are used to satisfy specific service level objectives(SLOs) and/or service level agreements (SLAs).

The term "network slicing" at least in some embodiments refers to methods, processes, techniques, and technologies used to create one or multiple unique logical and virtualized networks over a common multi-domain infrastructure.

The term "access network slice", "radio access network slice", or "RAN slice" at least in some embodiments refers to a part of a network slice that provides resources in a RAN to fulfill one or more application and/or service requirements (e.g., SLAs, etc.).

The term "network slice instance" at least in some embodiments refers to a set of Network Function instances and the required resources (e.g. compute, storage and networking resources) which form a deployed network slice. Additionally or alternatively, the term "network slice instance" at least in some embodiments refers to a representation of a service view of a network slice.

The term "network instance" at least in some embodiments refers to information identifying a domain.

The term "service consumer" at least in some embodiments refers to an entity that consumes one or more services.

The term "service producer" at least in some embodiments refers to an entity that offers, serves, or otherwise provides one or more services.

The term "service provider" at least in some embodiments refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some embodiments, SLAs may specify, for example, particular aspects of the service to be provided including quality, availability, responsibilities, metrics by which service is measured, as well as remedies or penalties should agreed-on service levels not be achieved. The term "SAML service provider" at least in some embodiments refers to a system and/or entity that receives and accepts authentication assertions in conjunction with a single sign-on (SSO) profile of the Security Assertion Markup Language (SAML) and/or some other security mechanism(s).

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network. Examples of RATs include the technologies mentioned infra with respect to the term "communication protocol". At least in some embodiments, the term "radio access technology" or "RAT" different implementations of the same communication protocol such as, for example, two cellular networks operating in different frequency ranges or frequency bands (sometimes referred to herein as "sub-RATs" or the like).

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "RAT type" at least in some embodiments refers to a transmission technology and/or communication protocol used in a (radio) access network such as, for example, new radio (NR), Long Term Evolution (LTE), narrowband IoT (NB-IOT), untrusted non-3GPP, trusted non-3GPP, trusted IEEE 802.11, non-3GPP access, MuLTEfire, WiMAX, wireline, wireline-cable, wireline broadband forum (wireline-BBF), and/or any of the other communication protocols discussed previously.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Additionally or alternatively, the term "reliability" at least in some embodiments refers to the probability that a product, system, or service will perform its intended function adequately for a specified period of time, or will operate in a defined environment with a low probability of failure. Additionally or alternatively, the term "reliability" in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "redundancy" at least in some embodiments refers to duplication of components or functions of a system, device, entity, or element to increase the reliability of the system, device, entity, or element. Additionally or alternatively, the term "redundancy" or "network redundancy" at least in some embodiments refers to the use of redundant physical or virtual hardware and/or interconnections. An example of network redundancy includes deploying a pair of network appliances with duplicated cabling connecting to the inside and/or outside a specific network, placing multiple appliances in active states, and the like.

The term "resilience" at least in some embodiments refers to the ability of a system, device, entity, or element to absorb and/or avoid damage or degradation without suffering complete or partial failure. Additionally or alternatively, the term "resilience" at least in some embodiments refers to a system, device, entity, or element to that maintains state awareness and/or an accepted level of operational normalcy in response to disturbances, including threats of an unexpected and malicious nature. Additionally or alternatively, the term "resilience", "network resilience", or "networking resilience" at least in some embodiments refers to a network, system, device, entity, or element to provide and/or implement a level of quality of service (QoS) and/or quality of experience (QoE), provide and/or implement traffic routing and/or rerouting over one or multiple paths, duplication of hardware components and/or physical links, provide and/or implement virtualized duplication (e.g., duplication NFs, VNFs, virtual machines (VMs), containers, etc.), provide and/or implement self-recovery mechanisms, and/or the like.

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computing" at least in some embodiments refers to computation resources that are geographically distributed within the vicinity of one or more localized networks' terminations.

The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS" at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS" at least in some embodiments refers to mechanisms that provide traffic-forwarding treatment based on flow-specific traffic classification. In some implementations, the term "Quality of Service" or "QoS" can be used interchangeably with the term "Class of Service" or "CoS".

The term "Class of Service" or "CoS" at least in some embodiments refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some embodiments refers to the finest granularity for QoS forwarding treatment in a network. The term "5G QoS flow" at least in some embodiments refers to the finest granularity for QoS forwarding treatment in a 5G System (5GS). Traffic mapped to the same QoS flow (or 5G QoS flow) receive the same forwarding treatment.

The term "reliability flow" at least in some embodiments refers to the finest granularity for reliability forwarding treatment in a network, where traffic mapped to the same reliability flow receive the same reliability treatment. Additionally or alternatively, the term "reliability flow" at least in some embodiments refers to the a reliability treatment assigned to packets of a data flow The term "reliability forwarding treatment" or "reliability treatment" refers to the manner in which packets belonging to a data flow are handled to provide a certain level of reliability to that data flow including, for example, a probability of success of packet delivery, QoS or Quality of Experience (QoE) over a period of time (or unit of time), admission control capabilities, a particular coding scheme, and/or coding rate for arrival data bursts.

The term "forwarding treatment" at least in some embodiments refers to the precedence, preferences, and/or prioritization a packet belonging to a particular data flow receives in relation to other traffic of other data flows. Additionally or alternatively, the term "forwarding treatment" at least in some embodiments refers to one or more parameters, characteristics, and/or configurations to be applied to packets belonging to a data flow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "admission control" at least in some embodiments refers to a function or process that decides if new packets, messages, work, tasks, etc., entering a system should be admitted to enter the system or not. Additionally or alternatively, the term "admission control" at least in some embodiments refers to a validation process where a check is performed before a connection is established to see if current resources are sufficient for the proposed connection.

The term "QoS Identifier" at least in some embodiments refers to a scalar that is used as a reference to a specific QoS forwarding behavior (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "channel coding" at least in some embodiments refers to processes and/or techniques to add redundancy to messages or packets in order to make those messages or packets more robust against noise, channel interference, limited channel bandwidth, and/or other errors. For purposes of the present disclosure, the term "channel coding" can be used interchangeably with the terms "forward error correction" or "FEC"; "error correction coding", "error correction code", or "ECC"; and/or "network coding" or "NC".

The term "network coding" at least in some embodiments refers to processes and/or techniques in which transmitted data is encoded and decoded to improve network performance.

The term "code rate" at least in some embodiments refers to the proportion of a data stream or flow that is useful or non-redundant (e.g., for a code rate of k/n, for every k bits of useful information, the (en)coder generates a total of n bits of data, of which n-k are redundant).

The term "systematic code" at least in some embodiments refers to any error correction code in which the input data is embedded in the encoded output. The term "non-systematic code" at least in some embodiments refers to any error correction code in which the input data is not embedded in the encoded output.

The term "interleaving" at least in some embodiments refers to a process to rearrange code symbols so as to spread bursts of errors over multiple codewords that can be corrected by ECCs.

The term "code word" or "codeword" at least in some embodiments refers to an element of a code or protocol, which is assembled in accordance with specific rules of the code or protocol. The term "PDU Connectivity Service" at least in some embodiments refers to a service that provides exchange of protocol data units (PDUs) between a UE and a data network (DN). The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "access traffic steering" or "traffic steering" at least in some embodiments refers to a procedure that selects an access network for a new data flow and transfers the traffic of one or more data flows over the selected access network. Access traffic steering is applicable between one 3GPP access and one non-3GPP access.

The term "access traffic switching" or "traffic switching" at least in some embodiments refers to a procedure that moves some or all traffic of an ongoing data flow from at least one access network to at least one other access network in a way that maintains the continuity of the data flow.

The term "access traffic splitting" or "traffic splitting" at least in some embodiments refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "subnetwork" or "subnet" at least in some embodiments refers to a logical subdivision of a network, such as an IP network. The practice of dividing a network into two or more networks is called "subnetting."

The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "localized network" at least in some embodiments refers to a local network that covers a limited number of connected vehicles in a certain area or region.

The term "local data integration platform" at least in some embodiments refers to a platform, device, system, network, or element(s) that integrate local data by utilizing a combination of localized network(s) and distributed computation.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wireless link between a transmitter and a receiver.

The term "delay" at least in some embodiments refers to a time interval between two events. Additionally or alternatively, the term "delay" at least in some embodiments refers to a time interval between the propagation of a signal and its reception.

The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized.

The term "processing delay" at least in some embodiments refers to an amount of time taken to process a packet in a network node.

The term "transmission delay" at least in some embodiments refers to an amount of time needed (or necessary) to push a packet (or all bits of a packet) into a transmission medium.

The term "propagation delay" at least in some embodiments refers to amount of time it takes a signal's header to travel from a sender to a receiver.

The term "network delay" at least in some embodiments refers to the delay of an a data unit within a network (e.g., an IP packet within an IP network).

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted.

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "packet drop rate" at least in some embodiments refers to a share of packets that were not sent to the target due to high traffic load or traffic management and should be seen as a part of the packet loss rate.

The term "packet loss rate" at least in some embodiments refers to a share of packets that could not be received by the target, including packets dropped, packets lost in transmission and packets received in wrong format.

The term "latency" at least in some embodiments refers to the amount of time it takes to transfer a first/initial data unit in a data burst from one point to another.

The term "throughput" or "network throughput" at least in some embodiments refers to a rate of production or the rate at which something is processed. Additionally or alternatively, the term "throughput" or "network throughput" at least in some embodiments refers to a rate of successful message (date) delivery over a communication channel.

The term "goodput" at least in some embodiments refers to a number of useful information bits delivered by the network to a certain destination per unit of time.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "software agent" at least in some embodiments refers to a computer program that acts for a user or other program in a relationship of agency.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some embodiments refers to the discovery, interpretation, and communication of meaningful patterns in data.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit", a "protocol data unit" or "PDU", a "service data unit" or "SDU", a frame, a packet, and/or the like.

The term "information element" at least in some embodiments refers to a structural element containing one or more fields.

The term "field" at least in some embodiments refers to individual contents of an information element, or a data element that contains content.

The term "data element" or "DE" at least in some embodiments refers to a data type that contains one single data.

The term "data frame" or "DF" at least in some embodiments refers to a data type that contains more than one data element in a predefined order.

The term "data element" at least in some embodiments refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some embodiments refers to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" at least in some embodiments refers to a markup construct including a name-value pair that exists within a start tag or empty element tag. Attributes contain data related to its element and/or control the element's behavior.

The term "reference" at least in some embodiments refers to data useable to locate other data and may be implemented a variety of ways (e.g., a pointer, an index, a handle, a key, an identifier, a hyperlink, etc.).

The term "translation" at least in some embodiments refers to the process of converting or otherwise changing data from a first form, shape, configuration, structure, arrangement, embodiment, description, etc. into a second form, shape, configuration, structure, arrangement, embodiment, description, etc.; at least in some embodiments there may be two different types of translation: transcoding and transformation.

The term "transcoding" at least in some embodiments refers to taking information/data in one format (e.g., a packed binary format) and translating the same information/data into another format in the same sequence. Additionally or alternatively, the term "transcoding" at least in some embodiments refers to taking the same information, in the same sequence, and packaging the information (e.g., bits or bytes) differently.

The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

The term "stream" or "streaming" refers to a manner of processing in which an object is not represented by a complete logical data structure of nodes occupying memory proportional to a size of that object, but are processed "on the fly" as a sequence of events.

In this context, the term "logical data structure," "logical structure," or the like may be any organization or collection of data values and/or data elements, the relationships among the data values/elements, and/or the functions or operations that can be applied to the data values/elements provided. A "logical data structure" may be an aggregate, tree (e.g., abstract syntax tree or the like), graph (e.g., a directed acyclic graph (DAG)), finite automaton, finite state machine (FSM), or other like data structure including at least one parentless node (or root node) together with zero or more descendant nodes, plus all the attributes and namespaces of the parentless and descendant nodes.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "accuracy" at least in some embodiments refers to the closeness of one or more measurements to a specific value.

The term "artificial intelligence" or "AI" at least in some embodiments refers to any intelligence demonstrated by machines, in contrast to the natural intelligence displayed by humans and other animals. Additionally or alternatively, the term "artificial intelligence" or "AI" at least in some embodiments refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), Linear Dynamical System (LDS), Switching LDS (SLDS), Optical NNs (ONNs), an NN for reinforcement learning (RL) and/or deep RL (DRL), and/or the like.

The term "Bayesian optimization" at least in some embodiments refers to a sequential design strategy for global optimization of black-box functions that does not assume any functional forms.

The term "epoch" at least in some embodiments refers to one cycle through a full training dataset. Additionally or alternatively, the term "epoch" at least in some embodiments refers to a full training pass over an entire training dataset such that each training example has been seen once; here, an epoch represents N/batch size training iterations, where N is the total number of examples.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in spacetime). Additionally or alternatively, the term "event" at least in some embodiments refers to a notable occurrence at a particular point in time.

The term "experiment" in probability theory, at least in some embodiments refers to any procedure that can be repeated and has a well-defined set of outcomes, known as a sample space.

The term "feature" at least in some embodiments refers to an individual measureable property, quantifiable property, or characteristic of a phenomenon being observed. Additionally or alternatively, the term "feature" at least in some embodiments refers to an input variable used in making predictions. At least in some embodiments, features may be represented using numbers/numerals (e.g., integers), strings, variables, ordinals, real-values, categories, and/or the like.

The term "feature extraction" at least in some embodiments refers to a process of dimensionality reduction by which an initial set of raw data is reduced to more manageable groups for processing. Additionally or alternatively, the term "feature extraction" at least in some embodiments refers to retrieving intermediate feature representations calculated by an unsupervised model or a pre-trained model for use in another model as an input. Feature extraction is sometimes used as a synonym of "feature engineering."

The term "feature map" at least in some embodiments refers to a function that takes feature vectors (or feature tensors) in one space and transforms them into feature vectors (or feature tensors) in another space. Additionally or alternatively, the term "feature map" at least in some embodiments refers to a function that maps a data vector (or tensor) to feature space. Additionally or alternatively, the term "feature map" at least in some embodiments refers to a function that applies the output of one filter applied to a previous layer. In some embodiments, the term "feature map" may also be referred to as an "activation map".

The term "feature vector" at least in some embodiments, in the context of ML, refers to a set of features and/or a list of feature values representing an example passed into a model. Additionally or alternatively, the term "feature vector" at least in some embodiments, in the context of ML, refers to a vector that includes a tuple of one or more features.

The term "inference engine" at least in some embodiments refers to a component of a computing system that applies logical rules to a knowledge base to deduce new information.

The term "intelligent agent" at least in some embodiments refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "iteration" at least in some embodiments refers to the repetition of a process in order to generate a sequence of outcomes, wherein each repetition of the process is a single iteration, and the outcome of each iteration is the starting point of the next iteration. Additionally or alternatively, the term "iteration" at least in some embodiments refers to a single update of a model's weights during training.

The term "loss function" or "cost function" at least in some embodiments refers to an event or values of one or more variables onto a real number that represents some "cost" associated with the event. A value calculated by a loss function may be referred to as a "loss" or "error". Additionally or alternatively, the term "loss function" or "cost function" at least in some embodiments refers to a function used to determine the error or loss between the output of an algorithm and a target value. Additionally or alternatively, the term "loss function" or "cost function" at least in some embodiments refers to a function are used in optimization problems with the goal of minimizing a loss or error.

The term "mathematical model" at least in some embodiments refer to a system of postulates, data, and inferences presented as a mathematical description of an entity or state of affairs including governing equations, assumptions, and constraints.

The term "machine learning" or "ML" at least in some embodiments refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. Furthermore, the term "AI/ML application" or the like at least in some embodiments refers to an application that contains some AI/ML models and application-level descriptions. ML techniques generally fall into the following main types of learning problem categories: supervised learning, unsupervised learning, and reinforcement learning.

The term "matrix" at least in some embodiments refers to a rectangular array of numbers, symbols, or expressions, arranged in rows and columns, which may be used to represent an object or a property of such an object.

The term "nondeterministic polynomial time" or "NP" at least in some embodiments refers to a class of computational decision problems for which any given yes-solution can be verified as a solution in polynomial time by a deterministic Turing machine (or solvable by a non-deterministic Turing machine in polynomial time). The term "NP-hard" at least in some embodiments refers to a class of problems which are at least as hard as the hardest problems in NP; problems that are NP-hard do not have to be elements of NP and may not even be decidable. The term "NP-complete" at least in some embodiments refers to a class of decision problems that contains the hardest problems in NP; each NP-complete problem is in NP.

The term "objective function" at least in some embodiments refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event.

The term "probability distribution" at least in some embodiments refers to a function that gives the probabilities of occurrence of different possible outcomes for an experiment or event. Additionally or alternatively, the term "probability distribution" at least in some embodiments refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, etc. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, etc.), continuous distributions (e.g., Bates distribution, beta, continuous uniform, normal distribution, Gaussian distribution, bell curve, joint normal, gamma, chi-squared, non-central chi-squared, exponential, Cauchy, lognormal, logit-normal, F distribution, t distribution, Dirac delta function, Pareto distribution, Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Polya-Gamma distribution, etc.), and/or joint distributions (e.g., Dirichlet distribution, Ewens's sampling formula, multinomial distribution, multivariate normal distribution, multivariate t-distribution, Wishart distribution, matrix normal distribution, matrix t distribution, etc.).

The term "probability density function" or "PDF" at least in some embodiments refers to a function whose value at any given sample (or point) in a sample space can be interpreted as providing a relative likelihood that the value of the random variable would be close to that sample. Additionally or alternatively, the term "probability density function" or "PDF" at least in some embodiments refers to a probability of a random variable falling within a particular range of values. Additionally or alternatively, the term "probability density function" or "PDF" at least in some embodiments refers to a value at two different samples can be used to infer, in any particular draw of the random variable, how much more likely it is that the random variable would be close to one sample compared to the other sample.

The term "precision" at least in some embodiments refers to the closeness of the two or more measurements to each other. The term "precision" may also be referred to as "positive predictive value".

The term "sample space" in probability theory (also referred to as a "sample description space" or "possibility space") of an experiment or random trial at least in some embodiments refers to a set of all possible outcomes or results of that experiment.

The term "search space", in the context of optimization, at least in some embodiments refers to an a domain of a function to be optimized. Additionally or alternatively, the term "search space", in the context of search algorithms, at least in some embodiments refers to a feasible region defining a set of all possible solutions. Additionally or alternatively, the term "search space" at least in some embodiments refers to a subset of all hypotheses that are consistent with the observed training examples. Additionally or alternatively, the term "search space" at least in some embodiments refers to a version space, which may be developed via machine learning.

The term "stochastic" at least in some embodiments refers to a property of being described by a random probability distribution. Although the terms "stochasticity" and "randomness" are distinct in that the former refers to a modeling approach and the latter refers to phenomena themselves, for purposes of the present disclosure these two terms may be used synonymously unless the context indicates otherwise.

The term "vector" at least in some embodiments refers to a one-dimensional array data structure. Additionally or alternatively, the term "vector" at least in some embodiments refers to a tuple of one or more values called scalars.

The term "service level agreement" or "SLA" at least in some embodiments refers to a level of service expected from a service provider. At least in some embodiments, an SLA may represent an entire agreement between a service provider and a service consumer that specifies one or more services is to be provided, how the one or more services are to be provided or otherwise supported, times, locations, costs, performance, priorities for different traffic classes and/or QoS classes (e.g., highest priority for first responders, lower priorities for non-critical data flows, etc.), and responsibilities of the parties involved.

The term "service level objective" or "SLO" at least in some embodiments refers to one or more measurable characteristics, metrics, or other aspects of an SLA such as, for example, availability, throughput, frequency, response time, latency, QoS, QoE, and/or other like performance metrics/measurements. At least in some embodiments, a set of SLOs may define an expected service (or an service level expectation (SLE)) between the service provider and the service consumer and may vary depending on the service's urgency, resources, and/or budget.

The term "service level indicator" or "SLI" at least in some embodiments refers to a measure of a service level provided by a service provider to a service consumer. At least in some embodiments, SLIs form the basis of SLOs, which in turn, form the basis of SLAs. Examples of SLIs include latency (including end-to-end latency), throughout, availability, error rate, durability, correctness, and/or other like performance metrics/measurements. At least in some embodiments, term "service level indicator" or "SLI" can be referred to as "SLA metrics" or the like.

The term "service level expectation" or "SLE" at least in some embodiments refers to an unmeasurable service-related request, but may still be explicitly or implicitly provided in an SLA even if there is little or no way of determining whether the SLE is being met. At least in some embodiments, an SLO may include a set of SLIs that produce, define, or specify an SLO achievement value. As an example, an availability SLO may depend on multiple components, each of which may have a QoS availability measurement. The combination of QoS measures into an SLO achievement value may depend on the nature and/or architecture of the service.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An apparatus for providing resilient network slicing, the apparatus comprising:
    memory circuitry; and
    processor circuitry connected to the memory circuitry, the processor circuitry to execute instructions of a network slice manager, which, when executed are to cause the processor circuitry to:
    collect performance metrics related to a communication network from one or more data sources within the communication network, wherein the communication environment includes a set of network slices, wherein each network slice of the set of network slices is a logical network that provides one or more network capabilities;
    determine a network slice configuration for an individual network slice of the set of network slices based on an analysis of the collected performance metrics in view of a service level agreement (SLA) with a service consumer, wherein the determined network slice configuration includes of at least one of an assignment of one or more dedicated network elements to the individual network slice, a network access network (NAN) configuration for the individual network slice, and an assignment of dedicated or prioritized radio resources for the individual network slice; and
    cause the network slice configuration to be deployed or provisioned to a NAN in the communication network, the network slice configuration to cause the NAN to reconfigure one or more network parameters to implement the individual network slice according to the network slice configuration.

2. The apparatus of claim 1, wherein:
    the assignment of the one or more dedicated network elements to the individual network slice includes an exclusive reservation of one or more radio unit (RUs), one or more distributed units (DUs), one or more centralized unit (CU) user plane (UP) functions, one or more CU control plane (CP) functions, or one or more core network NFs;
    the NAN configuration for the individual network slice includes at least one of a bandwidth part configuration or a beam configuration; and
    the assignment of the dedicated or prioritized radio resources includes a set resource blocks (RBs) or channel access time periods.

3. The apparatus of claim 2, wherein the network slice configuration includes an identifier of a backup NAN, and execution of the instructions is to cause the processor circuitry to:
    determine the backup NAN for an individual user equipment (UE);
    cause a backup request message to be sent to the backup NAN to request the backup NAN, the backup request message requesting the backup NAN to provide backup services to the individual UE;
    receive a backup response message from the backup NAN including an acceptance or rejection of the backup request message, wherein the backup response message includes a backup configuration to provide the backup services to the individual UE.

4. The apparatus of claim 3, wherein execution of the instructions is to cause the processor circuitry to:
    generate a backup configuration message for the individual UE; and
    cause the backup configuration message to be sent to the individual UE via a serving NAN currently serving the individual UE.

5. The apparatus of claim 4, wherein the backup NAN belongs to a same access network as the serving NAN or the backup NAN is part of a different access network than an access network to which the serving NAN belongs.

6. The apparatus of claim 5, wherein the backup NAN implements a same radio access technology (RAT), a same sub-RAT as the serving NAN, a different radio access technology (RAT), or a different sub-RAT as the serving NAN.

7. The apparatus of claim 3, wherein the backup configuration includes one of:
    handover parameters for the backup NAN to act as a target NAN for a handover when one or more HO trigger conditions occur, or a secondary cell parameters or dual connectivity (DC) parameters for the backup NAN to serve as a secondary anchor NAN for DC.

8. The apparatus of claim 1, wherein the network slice configuration includes a reliability enhancement configuration for at least one traffic flow belonging to the individual network slice, and the reliability enhancement configuration includes one or more of:
    information for communicating the at least one traffic flow with a specified packet error rate (PER) when selecting modulation-and-coding scheme for transmission; and
    information for configuring the at least one traffic flow to be sent with packet duplication via carrier aggregation.

9. The apparatus of claim 1 wherein the instructions of the network slice manager are part of an edge application and the apparatus is disposed in an edge compute node.

10. The apparatus of claim 9, wherein:
    the edge compute node is a Multi-Access Edge Computing (MEC) server of a MEC framework, and the NSM is implemented as a MEC app configured to be operated by a MEC platform of the MEC server;
    the edge compute node is a Multi-Access Management Services (MAMS) server or a MAMS client of a MAMS framework, and the NSM is implemented as a Network Connection Manager (NCM) configured to be operated by the MAMS server or a Client Connection Manager (CCM) configured to be operated by the MAMS client;
    the edge compute node is a near-real time (RT) Radio Access Network (RAN) intelligent controller (RIC) of an Open RAN Alliance (O-RAN) framework, and the NSM is implemented as an xApp configured to be operated by the RIC;
    the edge compute node is a non-RT RIC of an O-RAN framework, and the NSM is implemented as an rApp configured to be operated by the RIC;
    the edge compute node is a central unit (CU) of a CU/distributed unit (DU)-split architecture of a next generation (NG)-RAN architecture of a third generation partnership project (3GPP) cellular network, and the NSM is implemented as a network function (NF) configured to be operated by the CU; or the edge compute node is an Edge Enabler Server (EES) or an Edge Configuration Server (ECS) of a 3GPP edge computing architecture, and the NSM is implemented as an Edge Application Servers (EAS) configured to be operated by the EES or the ECS.

11. One or more non-transitory computer-readable media (NTCRM) comprising instructions of a network slice manager, wherein execution of the instructions is by one or more processors of a compute node is to cause the compute node to:

collect performance metrics related to a communication network from one or more data sources within the communication network, wherein the communication environment includes a set of network slices, wherein each network slice of the set of network slices is a logical network that provides one or more network capabilities;

determine, based on the collected performance metrics, a reliability target, a network coding (NC) group size, and per path characteristics for each network path of a set of network paths in the communication environment;

determine a network coding rate and a traffic distribution strategy based on the per path characteristics, the NC group size, and the reliability target;

determine a network slice configuration for an individual network slice of the set of network slices based on an analysis of the collected performance metrics, the network coding rate, and the traffic distribution strategy in view of a service level agreement (SLA) with a service consumer; and cause the network slice configuration to be deployed or provisioned to a NAN in the communication network, the network slice configuration to cause the NAN to reconfigure one or more network parameters to implement the individual network slice according to the network slice configuration.

12. The one or more NTCRM of claim 11, wherein the determined network slice configuration includes of at least one of an assignment of one or more dedicated network elements to the individual network slice, a network access network (NAN) configuration for the individual network slice, and an assignment of dedicated or prioritized radio resources for the individual network slice.

13. The one or more NTCRM of claim 11, wherein:
the traffic distribution strategy specifies a number of network coded packets in the individual subsets to be routed over the respective network paths;
the per path characteristics include an erasure probability for transmitting packets over individual network paths of the set of network paths, and delay characteristics indicating an expected time required for sending a number of packets over the individual network paths of the set of network paths; and
the reliability target is a probability that a receiver will be able to decode the set of packets.

14. The one or more NTCRM of claim 11, wherein, to determine the network slice configuration, execution of the instructions are to cause the compute node to:
when the NAN implements a frequency division multiplexing (FDM) radio access technology (RAT), determine a portion of radio resources to be reserved for the individual network slice based on a traffic load of the respective network paths, the number of network coded packets in the individual subsets to be routed over the respective network paths, a data rate for the respective network paths, and an over-provisioning factor; or
when the NAN implements a time division multiplexing (TDM) RAT, determine a time period for accessing the respective network paths to be reserved the individual network slice based on a data burst size, the number of network coded packets in the individual subsets to be routed over the respective network paths, a data rate for the respective network paths, an over-provisioning factor, and a predefined periodicity.

15. The one or more NTCRM of claim 11, wherein the collected performance metrics include data transmission reliability metric, and the data transmission reliability metrics include one or more of a transport block error rate, a packet loss rate, and a packet drop rate.

16. The one or more NTCRM of claim 11, wherein the collected performance metrics include service continuity reliability metrics, and the service continuity reliability metrics include one or more of a radio link failure (RLF), an HO failure (HOF) rate, one or more signal measurements prior to an RLF, and one or more signal measurements prior to an HOF, wherein the one or more signal measurements include one or more of reference signal received power (RSRP), reference signal received quality (RSRQ), and signal-to-interference-and-noise (SINR) level.

17. The one or more NTCRM of claim 11, wherein the collected performance metrics include network condition metrics, and the network condition metrics include one or more of a radio resource utilization level, a number of radio resource control (RRC) connections, a number of RRC connection failures, a number of protocol data unit (PDU) sessions, a PDU session establishment failure rate, a total data volume, a data volume measurement per slice and per quality of service (QOS) class traffic loading, an average latency, a latency per slice, and a latency per QoS class.

18. The one or more NTCRM of claim 11, wherein the collected performance metrics include UE condition metrics, and the UE condition metrics include one or more of RSRP measurements, RSRQ measurements, received signal strength indication (RSSI) measurements, channel quality indicator (CQI) measurements, and SINR measurements.

19. The one or more NTCRM of claim 11, wherein execution of the instructions is to cause the compute node to:
determine the network slice configuration for the individual network slice using a Reinforcement Learning (RL) framework.

20. One or more non-transitory computer-readable media (NTCRM) comprising instructions of a network slice manager, wherein execution of the instructions is by one or more processors of a compute node is to cause the compute node to:
collect slicing capability information from respective network access nodes (NANs) in a communication network including a set of network slices, wherein each network slice of the set of network slices is a logical network that provides one or more network capabilities;
collect performance metrics related to the communication network the respective NANS;
generate a service level agreement (SLA) from a negotiation with a network slice consumer based on the collected slicing capability information, wherein the network slice configuration is based on the SLA;

generate a network slice configuration for an individual network slice of the set of network slices based on an analysis of the collected performance metrics in view of the SLA; and deploy or provision the network slice configuration to the respective NANs in the communication network to operate the individual network slice according to the determined network slice configuration.

21. The one or more NTCRM of claim 20, wherein the network slice configuration is to cause the respective NANs to reconfigure respective network parameters to implement the individual network slice according to the network slice configuration, and the network slice configuration specifies one of more of:

one or more traffic types to be transmitted over more than one RAT simultaneously;

one or more traffic types to be transmitted only using a specific type of RAT;

one or more traffic types to be sent during one or more dedicated time slots;

one or more traffic types to be transmitted using bandwidth or a frequency spectrum designated for a specified type of RAT; and one or more traffic types to be scheduled for transmission using a specified contention window setting.

22. The one or more NTCRM of claim 20, wherein at least one NAN in the communication network operates according to a different radio access technology (RAT) than other NANs in the communication network.

23. The one or more NTCRM of claim 20, wherein the determined network slice configuration includes of at least one of an assignment of one or more dedicated network elements to the individual network slice, a network access network (NAN) configuration for the individual network slice, and an assignment of dedicated or prioritized radio resources for the individual network slice.

24. The one or more NTCRM of claim 20, wherein the slicing capability information includes one or more of: a maximum number of network slices that the respective NANs can support; a resource isolation level of the respective NANs; one or more resource isolation methods supported by the respective NANs, wherein the resource isolation methods include time-domain resource reservation, frequency-domain resource reservation, or no isolation support; QoS support capabilities of the respective NANs; and deterministic data transmission capabilities for time sensitive traffic of the respective NANs.

25. The one or more NTCRM of claim 20, wherein the collected performance metrics include one or more of: a channel utilization level, an average wait time for contention-based channel access, a busy or idle ratio of one or more frequency bands or frequency spectrum, a transport block error rate, a packet loss rate, a packet drop rate, a radio link failure (RLF) rate, a handover failure (HOF) rate, one or more signal measurements prior to an RLF, one or more signal measurements prior to an HOF, a radio resource utilization level, a number of radio resource control (RRC) connections, a number of RRC connection failures, a number of protocol data unit (PDU) sessions, a PDU session establishment failure rate, a total data volume, a data volume measurement per slice and per quality of service (QOS) class traffic loading, an average latency, a latency per slice, and a latency per QoS class, and signal measurements measured by one or more user equipment (UEs).

* * * * *